(12) United States Patent
Katae

(10) Patent No.: US 9,767,193 B2
(45) Date of Patent: Sep. 19, 2017

(54) GENERATION APPARATUS AND METHOD

(71) Applicant: FUJITSU LIMITED, Kawasaki-shi, Kanagawa (JP)

(72) Inventor: Nobuyuki Katae, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/068,698

(22) Filed: Mar. 14, 2016

(65) Prior Publication Data

US 2016/0283588 A1 Sep. 29, 2016

(30) Foreign Application Priority Data

Mar. 27, 2015 (JP) ................. 2015-067516
Jan. 21, 2016 (JP) ................. 2016-010102

(51) Int. Cl.
*G06F 17/21* (2006.01)
*G06F 17/22* (2006.01)
*G06F 17/30* (2006.01)
*G06F 17/27* (2006.01)

(52) U.S. Cl.
CPC ...... *G06F 17/30719* (2013.01); *G06F 17/271* (2013.01); *G06F 17/2785* (2013.01); *G06F 17/2223* (2013.01)

(58) Field of Classification Search
CPC .................. G06F 17/30719; G06F 17/2745
See application file for complete search history.

(56) References Cited

U.S. PATENT DOCUMENTS

| | | | | | |
|---|---|---|---|---|---|
| 5,838,323 | A | * | 11/1998 | Rose | G06F 17/27 707/E17.094 |
| 5,978,820 | A | * | 11/1999 | Mase | G06F 17/30719 707/E17.094 |
| 6,334,132 | B1 | * | 12/2001 | Weeks | G06F 17/30719 707/723 |
| 6,493,663 | B1 | * | 12/2002 | Ueda | G06F 17/271 704/9 |
| 7,017,113 | B2 | * | 3/2006 | Bourbakis | G06F 17/3089 707/E17.116 |
| 7,398,203 | B2 | * | 7/2008 | Corston-Oliver | G06F 17/271 704/1 |

(Continued)

FOREIGN PATENT DOCUMENTS

| | | |
|---|---|---|
| JP | 2001-84248 | 3/2001 |
| JP | 2001-202367 | 7/2001 |

(Continued)

*Primary Examiner* — Brian Albertalli
(74) *Attorney, Agent, or Firm* — Oblon, McClelland, Maier & Neustadt, L.L.P.

(57) ABSTRACT

A generation apparatus that generates a contracted sentence in which one part of a plurality of words included in a sentence is removed, the generation apparatus includes a memory configured to store a first index for determining whether two words are left as a pair in the contracted sentence, for each characteristic between the two words being connected to each other in the sentence through a grammatical or conceptual relation, and a processor coupled to the memory and configured to generate the contracted sentence by removing the one part of the plurality of words based on the first index corresponding to every pair of two words connected to each other with the grammatical or conceptual relation, and output the contracted sentence.

20 Claims, 71 Drawing Sheets

(56) References Cited

U.S. PATENT DOCUMENTS

| | | | |
|---|---|---|---|
| 7,509,572 B1* | 3/2009 | Melander | G06F 17/2247 704/9 |
| 8,818,803 B2* | 8/2014 | Weber | G06F 17/21 386/231 |
| 9,336,186 B1* | 5/2016 | Filippova | G06F 17/2264 |
| 2002/0046018 A1* | 4/2002 | Marcu | G06F 17/271 704/9 |
| 2002/0052901 A1* | 5/2002 | Guo | G06F 17/27 715/247 |
| 2002/0103836 A1* | 8/2002 | Fein | G06F 17/241 |
| 2002/0138528 A1* | 9/2002 | Gong | G06F 17/27 715/254 |
| 2004/0153309 A1* | 8/2004 | Lin | G06F 17/27 704/9 |
| 2004/0225651 A1* | 11/2004 | Musgrove | G06Q 30/0253 |
| 2004/0236805 A1* | 11/2004 | Gordon | G06F 17/30719 |
| 2011/0264443 A1* | 10/2011 | Takamatsu | G06F 17/3061 704/9 |
| 2014/0195897 A1* | 7/2014 | Balinsky | G06F 17/30719 715/254 |
| 2014/0289260 A1* | 9/2014 | Simske | G06F 17/30616 707/748 |

FOREIGN PATENT DOCUMENTS

| | | |
|---|---|---|
| JP | 2005-92616 | 4/2005 |
| JP | 2005-332081 | 12/2005 |
| JP | 2010-128677 | 6/2010 |
| JP | 2010-140468 | 6/2010 |
| JP | 2014-225158 | 12/2014 |

* cited by examiner

FIG. 3

| NODE-PAIR ATTRIBUTE | | CONNECTION PROBABILITY (IN LOGARITHM) |
|---|---|---|
| | | |
| | | |
| FROM NODE INCLUDES PARTICLE "が" | YES | -0.12 |
| | NO | -0.32 |
| FROM NODE INCLUDES PARTICLE "を" | YES | -0.09 |
| | NO | -0.30 |
| FROM NODE INCLUDES COMMON NOUN | YES | -0.48 |
| | NO | -0.31 |
| FROM NODE INCLUDES PROPER NOUN | YES | -0.30 |
| | NO | -0.29 |
| ... | | |
| | | |
| TO NODE INCLUDES VERB | YES | -0.43 |
| | NO | -0.28 |
| TO NODE INCLUDES ADJECTIVE | YES | -0.23 |
| | NO | -0.31 |
| TO NODE INCLUDES COMMON NOUN | YES | -0.99 |
| | NO | -0.30 |
| TO NODE INCLUDES PROPER NOUN | YES | -1.23 |
| | NO | -0.33 |
| ... | | |
| | | |

| NODE-PAIR ATTRIBUTE | | CONNECTION PROBABILITY (IN LOGARITHM) |
|---|---|---|
| ... | | |
| FROM NODE INCLUDES PARTICLE "が" | YES | -0.12 |
| | NO | -0.32 |
| FROM NODE INCLUDES PARTICLE "を" | YES | -0.09 |
| | NO | -0.30 |
| FROM NODE INCLUDES COMMON NOUN | YES | -0.48 |
| | NO | -0.31 |
| FROM NODE INCLUDES PROPER NOUN | YES | -0.30 |
| | NO | -0.29 |
| ... | | |
| TO NODE INCLUDES VERB | YES | -0.43 |
| | NO | -0.28 |
| TO NODE INCLUDES ADJECTIVE | YES | -0.23 |
| | NO | -0.31 |
| TO NODE INCLUDES COMMON NOUN | YES | -0.99 |
| | NO | -0.30 |
| TO NODE INCLUDES PROPER NOUN | YES | -1.23 |
| | NO | -0.33 |
| ... | | |

... -0.12-0.30-0.48-0.29-0.28-0.23-0.30-0.33 ... =-2.33

IN THE CASE WHERE THRESHOLD OF CONNECTION PROBABILITY PRODUCT IS -4.0

CONTRACTED SENTENCE : 「お弁当を持って公園にハイキングに行った。
(We went hiking at a park with a lunch.)」

FIG. 15

| NODE-PAIR ATTRIBUTE | | CONNECTION PROBABILITY (IN LOGARITHM) |
|---|---|---|
| RELATION TYPE BETWEEN NODES IS | AGENT | -0.07 |
| | ACTION TARGET | -0.05 |
| | ADJECTIVAL TARGET | -0.03 |
| | REASON | -1.42 |
| | ACCESSORY | -0.98 |
| | AIM | -0.53 |
| | PURPOSE | -0.07 |
| | ... | ... |
| TO NODE INCLUDES PARTICLE "を" | YES | -0.09 |
| | NO | -0.30 |
| TO NODE INCLUDES PARTICLE "が" | YES | -0.12 |
| | NO | -0.32 |
| TO NODE INCLUDES PARTICLE "に" | YES | -0.09 |
| | NO | -0.30 |
| ... | | |
| | | |
| FROM NODE INCLUDES PARTICLE "が" | YES | -0.12 |
| | NO | -0.32 |
| FROM NODE INCLUDES PARTICLE "を" | YES | -0.09 |
| | NO | -0.30 |
| ... | | |
| | | |

| NODE-PAIR ATTRIBUTE | | CONNECTION PROBABILITY (IN LOGARITHM) |
|---|---|---|
| RELATION TYPE BETWEEN NODES IS | AGENT | -0.07 |
| | ACTION TARGET | -0.05 |
| | ADJECTIVAL TARGET | -0.03 |
| | REASON | -1.42 |
| | ACCESSORY | -0.98 |
| | AIM | -0.53 |
| | PURPOSE | -0.07 |
| | ... | ... |
| TO NODE INCLUDES PARTICLE "を" | YES | -0.09 |
| | NO | -0.30 |
| TO NODE INCLUDES PARTICLE "が" | YES | -0.12 |
| | NO | -0.32 |
| TO NODE INCLUDES PARTICLE "に" | YES | -0.09 |
| | NO | -0.30 |
| ... | | |
| FROM NODE INCLUDES PARTICLE "が" | YES | -0.12 |
| | NO | -0.32 |
| FROM NODE INCLUDES PARTICLE "を" | YES | -0.09 |
| | NO | -0.30 |
| ... | | |

CONNECTION PROBABILITY
PRODUCT ARRAY

| |
|---|
| -1.04 |
| -1.77 |
| -1.99 |
| -2.20 |
| -3.77 |
| -3.88 |
| -4.89 |
| -5.25 |
| -5.45 |

CONTRACTED SENTENCE CANDIDATE :「行った。(went)」⇒ NOT STORED; IDENTICAL TO CONTRACTED SENTENCE CANDIDATE PREVIOUSLY STORED IN BUFFER

CONNECTION PROBABILITY PRODUCT ARRAY

| |
|---|
| -1.04 |
| -1.77 | ← THRESHOLD
| -1.99 |
| -2.20 |
| -3.77 |
| -3.88 |
| -4.89 |
| -5.25 |
| -5.45 |

FIG. 26

| CONTRACTED SENTENCE CANDIDATE | CONTRACTED SENTENCE LENGTH (IN BYTES) |
|---|---|
| 行った。 | 8 |
| 公園に行った。 | 14 |
| 公園にハイキングに行った。 | 26 |
| お弁当を持って公園にハイキングに行った。 | 40 |
| 天気がよかったので、お弁当を持って公園にハイキングに行った。 | 60 |
| 天気がとてもよかったので、お弁当を持って公園にハイキングに行った。 | 66 |
| 天気がとてもよかったので、お弁当を持って緑の多い公園にハイキングに行った。 | 74 |

FIG. 29

| NODE-PAIR ATTRIBUTE | | CONNECTION PROBABILITY (IN LOGARITHM) |
|---|---|---|
| ... | | |
| | | |
| FROM NODE INCLUDES PARTICLE "が" | YES | -0.12 |
| | NO | -0.32 |
| FROM NODE INCLUDES PARTICLE "を" | YES | -0.09 |
| | NO | -0.30 |
| FROM NODE INCLUDES COMMON NOUN | YES | -0.48 |
| | NO | -0.31 |
| FROM NODE INCLUDES PROPER NOUN | YES | -0.30 |
| | NO | -0.29 |
| ... | | |
| | | |
| TO NODE INCLUDES VERB | YES | -0.43 |
| | NO | -0.28 |
| TO NODE INCLUDES ADJECTIVE | YES | -0.23 |
| | NO | -0.31 |
| TO NODE INCLUDES COMMON NOUN | YES | -0.99 |
| | NO | -0.30 |
| TO NODE INCLUDES PROPER NOUN | YES | -1.23 |
| | NO | -0.33 |
| ... | | |
| | | |

FIG. 30

| INFLECTION | NODE-PAIR ATTRIBUTE | OCCURRENCE PROBABILITY (IN LOGARITHM) |
|---|---|---|
| 取る (TAKE) | CASE NODE FOR INFLECTION INCLUDES PARTICLE "が" | -0.17 |
| | CASE NODE FOR INFLECTION INCLUDES PARTICLE "を" | -0.05 |
| | CASE NODE FOR INFLECTION INCLUDES PARTICLE "ために" | -1.42 |
| | CASE NODE FOR INFLECTION INCLUDES PARTICLE "に" | -0.98 |
| | ... | ... |
| なる (BECOME) | CASE NODE FOR INFLECTION INCLUDES PARTICLE "が" | -0.16 |
| | CASE NODE FOR INFLECTION INCLUDES PARTICLE "を" | -1.95 |
| | CASE NODE FOR INFLECTION INCLUDES PARTICLE "ために" | -1.32 |
| | CASE NODE FOR INFLECTION INCLUDES PARTICLE "に" | -0.48 |
| | ... | ... |

| NODE-PAIR ATTRIBUTE | | CONNECTION PROBABILITY (IN LOGARITHM) |
|---|---|---|
| RELATION TYPE BETWEEN NODES IS | AGENT | -0.07 |
| | ACTION TARGET | -0.05 |
| | ADJECTIVAL TARGET | -0.03 |
| | REASON | -1.42 |
| | ACCESSORY | -0.98 |
| | AIM | -0.53 |
| | PURPOSE | -0.07 |
| | ... | ... |
| TO NODE INCLUDES PARTICLE "を" | YES | -0.09 |
| | NO | -0.30 |
| TO NODE INCLUDES PARTICLE "が" | YES | -0.12 |
| | NO | -0.32 |
| TO NODE INCLUDES PARTICLE "は" | YES | -0.09 |
| | NO | -0.30 |
| ... | | |
| FROM NODE INCLUDES PARTICLE "が" | YES | -0.12 |
| | NO | -0.32 |
| FROM NODE INCLUDES PARTICLE "を" | YES | -0.09 |
| | NO | -0.30 |
| ... | | |

| INFLECTION | NODE-PAIR ATTRIBUTE | OCCURRENCE PROBABILITY (IN LOGARITHM) |
|---|---|---|
| 取る (TAKE) | RELATION TYPE BETWEEN NODES IS AGENT | -0.17 |
| | RELATION TYPE BETWEEN NODES IS ACTION TARGET | -0.05 |
| | RELATION TYPE BETWEEN NODES IS REASON | -1.42 |
| | RELATION TYPE BETWEEN NODES IS ACCESSORY | -0.98 |
| | RELATION TYPE BETWEEN NODES IS AIM | -0.83 |
| | RELATION TYPE BETWEEN NODES IS PURPOSE | -0.77 |
| | ... | ... |
| なる (BECOME) | RELATION TYPE BETWEEN NODES IS AGENT | -0.16 |
| | RELATION TYPE BETWEEN NODES IS ACTION TARGET | -1.95 |
| | RELATION TYPE BETWEEN NODES IS REASON | -1.32 |
| | RELATION TYPE BETWEEN NODES IS ACCESSORY | -0.48 |
| | RELATION TYPE BETWEEN NODES IS AIM | -0.09 |
| | RELATION TYPE BETWEEN NODES IS PURPOSE | -0.68 |
| | ... | ... |
| 卒業する (GRADUATE) | RELATION TYPE BETWEEN NODES IS AGENT | -0.25 |
| | RELATION TYPE BETWEEN NODES IS ACTION TARGET | -0.45 |
| | ... | ... |

| NODE-PAIR ATTRIBUTE | | CONNECTION PROBABILITY (IN LOGARITHM) |
|---|---|---|
| RELATION TYPE BETWEEN NODES IS | AGENT | -0.07 |
| | ACTION TARGET | -0.05 |
| | ADJECTIVAL TARGET | -0.03 |
| | REASON | -1.42 |
| | ACCESSORY | -0.98 |
| | AIM | -0.53 |
| | PURPOSE | -0.07 |
| | ... | ... |
| TO NODE INCLUDES PARTICLE "を" | YES | -0.09 |
| | NO | -0.30 |
| TO NODE INCLUDES PARTICLE "が" | YES | -0.12 |
| | NO | -0.32 |
| TO NODE INCLUDES PARTICLE "は" | YES | -0.09 |
| | NO | -0.30 |
| ... | | |
| FROM NODE INCLUDES PARTICLE "が" | YES | -0.12 |
| | NO | -0.32 |
| FROM NODE INCLUDES PARTICLE "を" | YES | -0.09 |
| | NO | -0.30 |
| ... | | |

| INFLECTION | NODE-PAIR ATTRIBUTE | OCCURRENCE PROBABILITY (IN LOGARITHM) | INDISPENSABLE CONNECTION |
|---|---|---|---|
| 取る (TAKE) | RELATION TYPE BETWEEN NODES IS AGENT | -0.17 | 1 |
|  | RELATION TYPE BETWEEN NODES IS ACTION TARGET | -0.05 | 1 |
|  | RELATION TYPE BETWEEN NODES IS REASON | -1.42 | 0 |
|  | RELATION TYPE BETWEEN NODES IS ACCESSORY | -0.98 | 0 |
|  | RELATION TYPE BETWEEN NODES IS AIM | -0.83 | 0 |
|  | RELATION TYPE BETWEEN NODES IS PURPOSE | -0.77 | 0 |
|  | ... | ... | ... |
| なる (BECOME) | RELATION TYPE BETWEEN NODES IS AGENT | -0.16 | 1 |
|  | RELATION TYPE BETWEEN NODES IS ACTION TARGET | -1.95 | 0 |
|  | RELATION TYPE BETWEEN NODES IS REASON | -1.32 | 0 |
|  | RELATION TYPE BETWEEN NODES IS ACCESSORY | -0.48 | 0 |
|  | RELATION TYPE BETWEEN NODES IS AIM | -0.09 | 1 |
|  | RELATION TYPE BETWEEN NODES IS PURPOSE | -0.68 | 0 |
|  | ... | ... | ... |
| 卒業する (GRADUATE) | RELATION TYPE BETWEEN NODES IS AGENT | -0.25 | 0 |
|  | RELATION TYPE BETWEEN NODES IS ACTION TARGET | -0.45 | 0 |
|  | ... | ... | ... |

FIG. 48

| |
|---|
| -1.42 |
| -1.81 |
| -1.92 |
| -2.11 |
| -3.72 |

FIG. 52

| CONTRACTED SENTENCE CANDIDATE | CONTRACTED SENTENCE LENGTH (IN BYTES) |
|---|---|
| 薬剤師になった。 | 16 |
| 資格を取って薬剤師になった。 | 28 |
| 彼は卒業したあと、資格を取って薬剤師になった。 | 46 |
| 彼は大学を卒業したあと、資格を取って薬剤師になった。 | 52 |
| 彼は大学をかろうじて卒業したあと、資格を取って薬剤師になった。 | 62 |

FIG. 54

| NODE-PAIR ATTRIBUTE | | CONNECTION PROBABILITY (IN LOGARITHM) |
|---|---|---|
| RELATION TYPE IS | AGENT | -0.07 |
| | ACTION TARGET | -0.05 |
| | ADJECTIVAL TARGET | -0.03 |
| | REASON | -1.42 |
| | ACCESSORY | -0.98 |
| | AIM | -0.53 |
| | PURPOSE | -0.07 |
| | ... | ... |
| TO NODE INDICATES "HUMAN" | YES | -0.09 |
| | NO | -0.30 |
| TO NODE INDICATES "TIME" | YES | -0.32 |
| | NO | -0.12 |
| TO IS MODIFIER OF FROM | YES | -0.21 |
| | NO | -0.05 |
| TO IS RELATIVE OF FROM | YES | -0.52 |
| | NO | -0.13 |
| ... | | |

FIG. 55

| INFLECTION | NODE-PAIR ATTRIBUTE | OCCURRENCE PROBABILITY (IN LOGARITHM) 512 |
|---|---|---|
| HAVE | RELATION TYPE BETWEEN NODES IS AGENT | -0.17 |
| | RELATION TYPE BETWEEN NODES IS ACTION TARGET | -0.05 |
| | RELATION TYPE BETWEEN NODES IS REASON | -1.42 |
| | RELATION TYPE BETWEEN NODES IS ACCESSORY | -0.98 |
| | RELATION TYPE BETWEEN NODES IS AIM | -0.83 |
| | RELATION TYPE BETWEEN NODES IS PURPOSE | -0.77 |
| | ... | ... |
| GO | RELATION TYPE BETWEEN NODES IS AGENT | -0.16 |
| | RELATION TYPE BETWEEN NODES IS ACTION TARGET | -1.95 |
| | RELATION TYPE BETWEEN NODES IS REASON | -1.32 |
| | RELATION TYPE BETWEEN NODES IS ACCESSORY | -0.48 |
| | RELATION TYPE BETWEEN NODES IS AIM | -0.09 |
| | RELATION TYPE BETWEEN NODES IS PURPOSE | -0.68 |
| | ... | ... |
| ... | ... | ... |
| | ... | ... |
| DOES NOT CORRESPOND TO EITHER CASE | | -0.50 |

FIG. 56

| WEIGHT A | WEIGHT B | ⌇514 |
|---|---|
| 1.0 | 2.0 |

FIG. 60

Table 520:

| NODE-PAIR ATTRIBUTE | | CONNECTION PROBABILITY (IN LOGARITHM) |
|---|---|---|
| RELATION TYPE IS | AGENT | -0.07 |
| | ACTION TARGET | -0.05 |
| | ADJECTIVAL TARGET | -0.03 |
| | REASON | -1.42 |
| | ACCESSORY | -0.98 |
| | AIM | -0.53 |
| | PURPOSE | -0.07 |
| | ... | ... |
| TO NODE INCLUDES "人" | YES | -0.09 |
| | NO | -0.30 |
| TO NODE INCLUDES "時間" | YES | -0.32 |
| | NO | -0.12 |
| TO IS MODIFIER OF FROM | YES | -0.21 |
| | NO | -0.05 |
| TO IS RELATIVE OF FROM | YES | -0.52 |
| | NO | -0.13 | x = -0.07-0.09-0.12-0.05-0.13 = -0.46

Table 512:

| INFLECTION | NODE-PAIR ATTRIBUTE | CONNECTION PROBABILITY (IN LOGARITHM) |
|---|---|---|
| HAVE | AGENT | -0.17 |
| | ACTION TARGET | -0.05 |
| | REASON | -1.42 |
| | ACCESSORY | -0.98 |
| | AIM | -0.83 |
| | PURPOSE | -0.77 |
| | ... | ... |
| GO | AGENT | -0.16 |
| | ACTION TARGET | -1.95 |
| | REASON | -1.32 |
| | ACCESSORY | -0.48 |
| | AIM | -0.09 |
| | PURPOSE | -0.68 |
| ... | ... | ... |
| DOES NOT CORRESPOND TO EITHER CASE | | -0.50 | y = -0.16 (A)

| |
|---|
| -0.78 |
| -1.50 |
| -1.99 |
| -2.85 |
| -3.88 |
| -4.74 |
| -4.89 |
| -5.25 |
| -5.89 |

FIG. 64

| CONTRACTED SENTENCE CANDIDATE | CONTRACTED SENTENCE LENGTH (IN BYTES) |
|---|---|
| I went | 2 |
| I went to a park. | 5 |
| I went hiking to a park. | 6 |
| I went hiking to a park with box lunch. | 9 |
| I went hiking to a park with box lunch because the weather was good. | 14 |
| I went hiking to a park with box lunch because the weather was very good. | 15 |
| I went hiking to a park which has many trees with box lunch because the weather was very good. | 19 |

FIG. 68

| CONTRACTED SENTENCE CANDIDATE IN COMPARATIVE EXAMPLE | CONTRACTED SENTENCE LENGTH (IN BYTES) |
|---|---|
| なった。 | 8 |
| 薬剤師になった。 | 16 |
| 取って薬剤師になった。 | 22 |
| 彼は卒業したあと、取って薬剤師になった。 | 40 |
| 彼は大学を卒業したあと、資格を取って薬剤師になった。 | 52 |
| 彼は大学をかろうじて卒業したあと、資格を取って薬剤師になった。 | 62 |

GENERATION APPARATUS AND METHOD

CROSS-REFERENCE TO RELATED APPLICATION

This application is based upon and claims the benefit of priority of the prior Japanese Patent Application No. 2015-067516, filed on Mar. 27, 2015, and the prior Japanese Patent Application No. 2016-010102, filed on Jan. 21, 2016, the entire contents of which are incorporated herein by reference.

FIELD

The embodiments discussed herein are related to a technique of generating a contracted sentence.

BACKGROUND

There is a document summarization technique that automatically converts an input document into a short concise document. A typical document summarization technique extracts key sentences from the input document and contracts each of the key sentences thus extracted to generate a summary.

Examples of a method of contracting a sentence include a known method of pruning any unnecessary part of a tree structure (dependency structure, for example) of an input sentence. For example, Japanese Laid-open Patent Publication No. 2010-140468 discloses a technique of generating a contracted sentence candidate by combining phrases included in an input sentence based on a dependency structure of the input sentence provided with morphological analysis and dependency parsing. This technique calculates a generation probability of each candidate based on an importance of a certain word obtained from a corpus and an adjacency probability between certain phrases, and outputs a summary candidate having the highest generation probability of a length that is within a pre-specified length.

SUMMARY

According to an aspect of the invention, a generation apparatus that generates a contracted sentence in which one part of a plurality of words included in a sentence is removed, the generation apparatus includes a memory configured to store a first index for determining whether two words are left as a pair in the contracted sentence, for each characteristic between the two words being connected to each other in the sentence through a grammatical or conceptual relation, and a processor coupled to the memory and configured to generate the contracted sentence by removing the one part of the plurality of words based on the first index corresponding to every pair of two words connected to each other with the grammatical or conceptual relation, and output the contracted sentence.

The object and advantages of the invention will be realized and attained by means of the words and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an exemplary connection probability table according to the first embodiment.

FIG. 9 is a diagram for explaining derivation of a connection probability product.

FIG. 15 is a diagram illustrating an exemplary connection probability table according to the second embodiment.

FIG. 18 is a diagram for explaining derivation of the connection probability product.

FIG. 21 is a diagram illustrating an exemplary connection probability products stored in an array.

FIG. 26 illustrates a list of contracted sentence candidates stored in a buffer.

FIG. 29 is a diagram illustrating an exemplary connection probability table according to the third embodiment;

FIG. 30 is a diagram illustrating an exemplary occurrence probability table according to the third embodiment;

FIG. 38 illustrates an exemplary connection probability table according to the fourth embodiment;

FIG. 40 is an exemplary occurrence probability table according to the fourth embodiment;

FIG. 43 is a diagram for explaining derivation of a connection probability product;

FIG. 45 is an example of an identified result of indispensable connections when a second threshold is set as "−0.2";

FIG. 48 is a diagram illustrating connection probability products stored in an array;

FIG. 52 illustrates a list of contracted sentence candidates stored in a buffer;

FIG. 54 is an exemplary data configuration of a connection probability table when a target language is English;

FIG. 55 is an exemplary data configuration of an occurrence probability table when a target language is English;

FIG. 56 is an exemplary data configuration of a weighted value table;

FIG. 60 is a diagram for explaining derivation of an evaluation value;

FIG. 63 is a diagram illustrating the evaluation values stored in an array;

FIG. 64 illustrates a list of contracted sentence candidates stored in a buffer;

FIG. 68 is a list of contracted sentence candidates generated by the comparative examples.

DESCRIPTION OF EMBODIMENTS

Since the conventional technique calculates the generation probability using the importance of a word and its adjacency probability with the previous and next phrases, a high generation probability may be obtained for an unnatural sentence in which, for example, an indispensable case lacks, and thus this candidate may be adopted as a contracted sentence. In contrast, when a candidate includes a part having a low importance of a word or a low adjacency probability and is a natural sentence, this candidate may have a low generation probability and thus not be adopted as a contracted sentence.

An object of the disclosed technique is to generate a natural contracted sentence.

Exemplary embodiments of the disclosed technique will be described below with reference to the accompanied drawings.

First Embodiment

Figure 1:
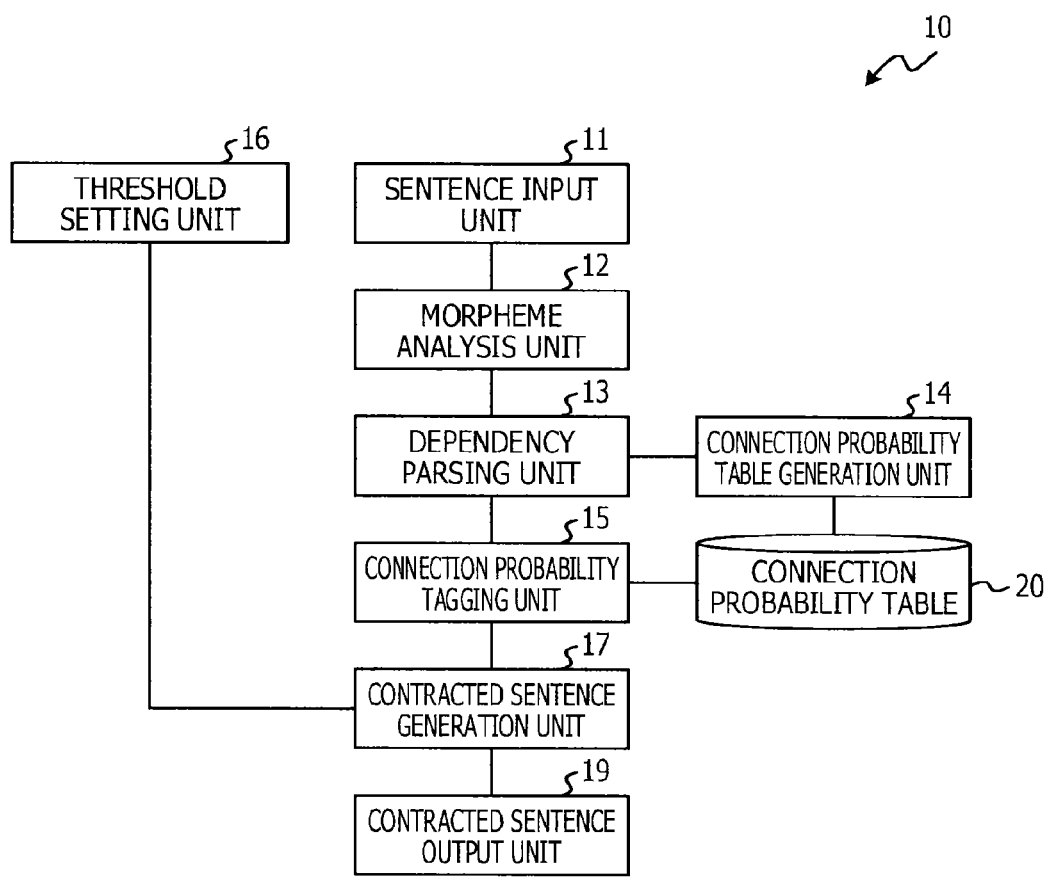
FIG. 1 is a functional block diagram schematically illustrating the configuration of a contracted sentence generation apparatus according to a first embodiment of the disclosed technique.

As illustrated in FIG. 1, a contracted sentence generation apparatus 10 according to a first embodiment includes a sentence input unit 11, a morphological analysis unit 12, a dependency parsing unit 13, a connection probability table generation unit 14, a connection probability tagging unit 15, a threshold setting unit 16, a contracted sentence generation unit 17, and a contracted sentence output unit 19. The contracted sentence generation apparatus 10 stores a connection probability table 20. The morphological analysis unit 12 and the dependency parsing unit 13 are an exemplary analysis unit according to the disclosed technique. The connection probability table generation unit 14 is an exemplary derivation unit according to the disclosed technique. The connection probability tagging unit 15 is an exemplary tagging unit according to the disclosed technique. The contracted sentence generation unit 17 is an exemplary generation unit according to the disclosed technique.

Figure 2:
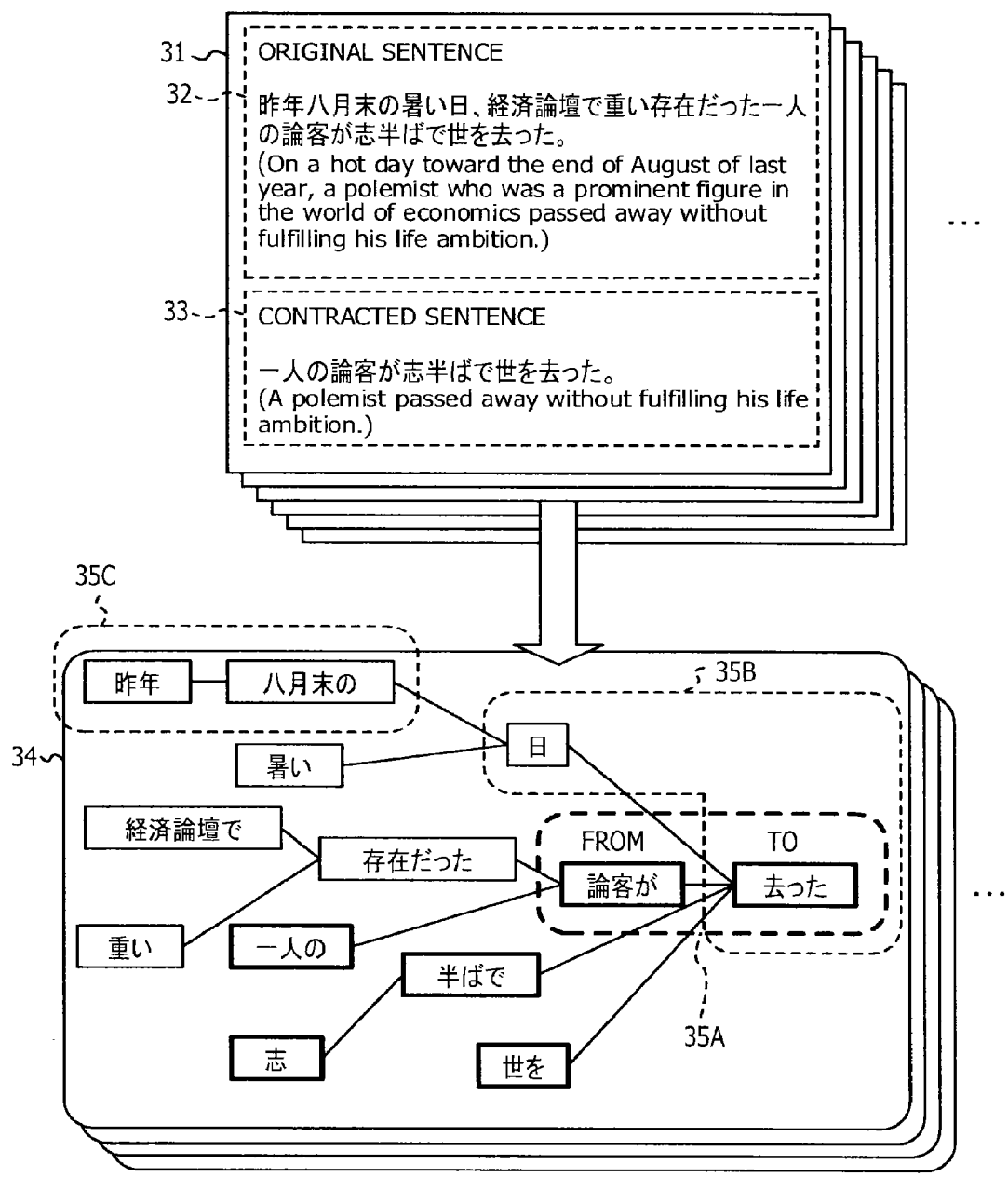
FIG. 2 is a diagram for explaining an example sentence, a tree structure, and a node pair.

The contracted sentence generation apparatus 10 receives more than one example sentence or an input sentence (hereinafter, referred to as a "contraction target sentence") from which a contracted sentence is generated. More specifically, the contracted sentence generation apparatus 10 receives more than one example sentence to generate the connection probability table 20 described later, and receives a contraction target sentence to generate a contracted sentence. As illustrated in FIG. 2, an example sentence 31 is a pair of an original sentence 32 and a contracted sentence 33 obtained by contracting this original sentence. This contracted sentence is manually prepared as a natural contracted sentence, for example, without lack of any indispensable case.

The example sentences 31 or the contraction target sentence may be inputted through an input device such as a keyboard connected to the contracted sentence generation apparatus 10, or may be inputted by reading from a storage medium such as a hard disk drive (HDD), a USB memory, or a CD-ROM, or an external storage device connected through a network. Although the present embodiment describes a case in which the example sentences 31 or the contraction target sentence is inputted as text data, the example sentences 31 or the contraction target sentence may be inputted as voice data and converted into text data through voice recognition.

The sentence input unit 11 receives the example sentences 31 or the contraction target sentence inputted to the contracted sentence generation apparatus 10, and passes the example sentences 31 or the contraction target sentence thus inputted to the morphological analysis unit 12.

The morphological analysis unit 12 breaks down, by referring to a morphological analysis dictionary, an original sentence included in each example sentence 31 or the contraction target sentence into morphemes, to each of which information such as a part-of-speech of the morpheme is tagged.

Based on a result of this morphological analysis, the dependency parsing unit 13 analyzes each phrase in the original sentence 32 or the contraction target sentence through processing such as grouping of a noun and a postposition (particle), if input text is Japanese, and analyzes a dependency relation between phrases according to a dependency rule. This allows the original sentence 32 or the contraction target sentence to be represented in a tree structure in which phrases included in the original sentence 32 or the contraction target sentence are connected based on the dependency relation. FIG. 2 is a diagram illustrating an exemplary tree structure obtained through the dependency parsing of the original sentence 32. In FIG. 2, a node represents a phrase included in the original sentence 32 (or the contraction target sentence), and the nodes corresponding to phrases having the dependency relation are connected with a line, thereby representing a tree structure 34.

The connection probability table generation unit 14 is a function unit that functions when more than one example sentence is inputted to the contracted sentence generation apparatus 10, in other words, when the connection probability table 20 is generated. The connection probability table generation unit 14 derives, based on the example sentences 31, a probability that a connection between phrases included in the tree structure 34 representing the original sentence 32 remains in the contracted sentence 33 that is paired with this original sentence 32, for each attribute of the dependency relation between the phrases.

Specifically, the connection probability table generation unit 14 extracts two nodes connected with a line as a node pair 35 from each tree structure 34. The connection probability table generation unit 14 identifies, of the node pair 35, the node corresponding to a modifying phrase in the original sentence 32 as a FROM node, and the node corresponding to a modified phrase in the original sentence 32 as a TO node. For example, in FIG. 2, of a node pair 35A enclosed by a dashed line, the node corresponding to a phrase "論客が (polemicist)" is identified as the FROM node, and the node corresponding to a phrase "去った (passed away)" is identified as the TO node. Hereinafter, the node corresponding to a phrase "A" is referred to as a node "A". Individual node pairs are collectively referred to as a "node pair 35" when not distinguished in description, and are referred to with reference numerals to which alphabet letters are appended as in a "node pair 35A", a "node pair 35B", . . . , when distinguished.

The connection probability table generation unit 14 derives, for each node-pair attribute, the connection probability of node pairs 35 having an identical attribute among all node pairs 35 included in the tree structure 34 representing the original sentence 32 of every example sentence 31. The connection probability for a node-pair attribute is a probability that a node pair having this attribute remains in a contracted sentence without being pruned. The node-pair attribute is a grammatical characteristic of the node pair 35, and is, for example, information such as whether a morpheme of a particular part-of-speech is included in the phrase corresponding to the FROM node or the TO node. Examples of node-pair attributes include "the FROM node includes a particle "が"", "the FROM node does not include the particle "が"", "the TO node includes a verb", and "the TO node does not include a verb". One node pair 35 may have more than one attribute.

The connection probability table generation unit 14 derives the connection probability of node pairs having an attribute i, by Expression (1) below, for example.

$$\text{Connection Probability of Attribute } i = \text{Number of Node Pairs of Attribute } i \text{ Remaining in Contracted Sentence/Number of Node Pairs of Attribute } i \qquad (1)$$

In Expression (1), "Number of Node Pairs of Attribute i" means the number of node pairs 35 having attribute i among all node pairs 35. "Number of Node Pairs of Attribute i Remaining in Contracted Sentence" means the number of node pairs 35 each having attribute i and including two nodes whose corresponding phrases remain in the contracted sentence 33 obtained by contracting the original sentence 32 including this node pair 35. A higher connection probability is obtained for a larger number of node pairs 35 remaining in the contracted sentence 33, in other words, node pairs 35 whose nodes are not pruned at generation of the contracted sentence 33.

Description will be made of the node pairs 35 remaining in the contracted sentence with reference to FIG. 2. In the tree structure 34 illustrated in FIG. 2, a node remaining in the contracted sentence is illustrated as a node with a bold frame. In FIG. 2, both nodes in the node pair 35A (the FROM node "論客が" and the TO node "去った") enclosed by a dashed line remain in the contracted sentence. In other words, no pruning is provided between the nodes of the node pair 35A. In contrast, in FIG. 2, of the node pair 35B (the FROM node "日" and the TO node "去った") enclosed by a one-dot dashed line, the TO node "去った" remains in the contracted sentence 33, whereas the FROM node "日" does not remain in the contracted sentence. In other words, pruning is provided between the nodes of the node pair 35B (the FROM node "日" and the TO node "去った"). A node pair both of the nodes of which are not included in the contracted sentence 33, such as the node pair 35C enclosed by a two-dot dashed line in FIG. 2, is not to be used for the derivation of the connection probability.

The connection probability table generation unit 14 stores in, for example, the connection probability table 20 illustrated in FIG. 3, the connection probability of node pairs for each attribute derived by, for example, Expression (1) using more than one example sentence 31. In the example of FIG. 3, the value of one connection probability for one node-pair attribute is stored as one entry. In the example of FIG. 3, the connection probability is expressed in logarithm. The connection probability table generation unit 14 stores the generated connection probability table 20 in a predetermined storage region.

The connection probability tagging unit 15, the threshold setting unit 16, the contracted sentence generation unit 17, and the contracted sentence output unit 19, which are described below, are a function unit that functions when the contraction target sentence is inputted to the contracted sentence generation apparatus 10, in other words, when the contracted sentence is generated.

The connection probability tagging unit 15 tags, using the connection probability for each node-pair attribute stored in the connection probability table 20, the connection probability between nodes of the tree structure 34 of the contraction target sentence analyzed by the dependency parsing unit 13. Specifically, similarly to the connection probability table generation unit 14, the connection probability tagging unit 15 extracts two nodes connected with a line as the node pair 35 from the tree structure 34 obtained by analyzing the contraction target sentence, and identifies these two nodes as the FROM node and the TO node. Then, the connection probability tagging unit 15 acquires connection probabilities for all attributes of the node pair 35 from the connection probability table 20, and tags the product of these probabilities as the connection probability product of this node pair 35.

The threshold setting unit 16 sets, to the contracted sentence generation unit 17, a threshold of the connection probability product, which is inputted through an input device or stored in advance in a predetermined storage region.

In the tree structure 34 of the contraction target sentence, the contracted sentence generation unit 17 follows, from a root node, nodes having connection probability products equal to or larger than the threshold set by the threshold setting unit 16, and extracts nodes on a path followed without a stop. A root node in a tree structure representing a dependency structure is the node corresponding to a phrase having no dependency target in a contraction target sentence. The contracted sentence generation unit 17 arranges the phrases corresponding to extracted nodes in an order of appearance in the contraction target sentence to generate a contracted sentence.

The contracted sentence output unit 19 outputs the contracted sentence generated by the contracted sentence generation unit 17, by displaying it on a display apparatus, storing it on the storage medium, and printing it by a printer, for example.

Figure 4:
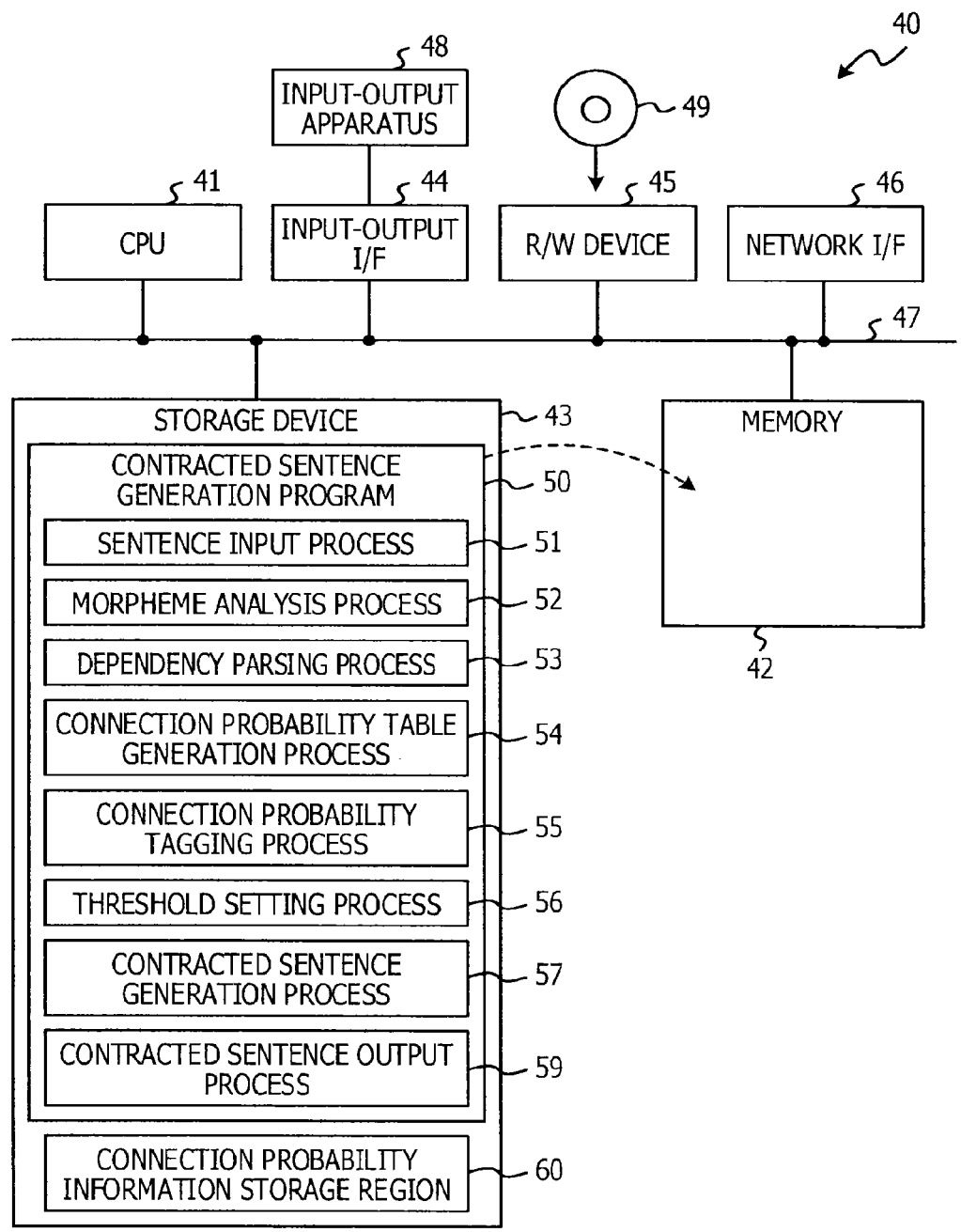
FIG. 4 is a block diagram schematically illustrating the configuration of a computer serving as the contracted sentence generation apparatus according to the first embodiment.

The contracted sentence generation apparatus 10 may be, for example, a computer 40 illustrated in FIG. 4. The computer 40 includes a CPU 41, a memory 42 as a temporary storage region, and a non-volatile storage device 43. The computer 40 further includes an input-output interface (I/F) 44 to which an input-output apparatus 48 such as the display apparatus or the input device is connected. The computer 40 further includes a read/write (R/W) device 45 that controls reading and writing of data on a recording medium 49, and a network I/F 46 connected to a network such as the Internet. The CPU 41, the memory 42, the storage device 43, the input-output I/F 44, the R/W device 45, and the network I/F 46 are connected to each other through a bus 47.

The storage device 43 may be a hard disk drive (HDD), a solid state drive (SSD), or a flash memory, for example. The storage device 43 as a storage medium stores a contracted sentence generation program 50 that causes the computer 40 to function as the contracted sentence generation apparatus 10. The storage device 43 includes a connection probability information storage region 60 in which information included in the connection probability table 20 is stored.

The CPU 41 reads out the contracted sentence generation program 50 from the storage device 43, loads the contracted sentence generation program 50 into the memory 42, and sequentially executes processes included in the contracted sentence generation program 50. The CPU 41 reads out information from the connection probability information storage region 60 to load the connection probability table 20 into the memory 42.

The contracted sentence generation program 50 includes a sentence input process 51, a morphological analysis process 52, a dependency parsing process 53, a connection probability table generation process 54, a connection probability tagging process 55, and a threshold setting process 56. The contracted sentence generation program 50 further includes a contracted sentence generation process 57 and a contracted sentence output process 59.

The CPU 41 executes the sentence input process 51 to serve as the sentence input unit 11 illustrated in FIG. 1. The CPU 41 executes the morphological analysis process 52 to serve as the morphological analysis unit 12 illustrated in FIG. 1. The CPU 41 executes the dependency parsing process 53 to serve as the dependency parsing unit 13 illustrated in FIG. 1. The CPU 41 executes the connection probability table generation process 54 to serve as the connection probability table generation unit 14 illustrated in FIG. 1. The CPU 41 executes the connection probability tagging process 55 to serve as the connection probability tagging unit 15 illustrated in FIG. 1. The CPU 41 executes the threshold setting process 56 to serve as the threshold setting unit 16 illustrated in FIG. 1. The CPU 41 executes the contracted sentence generation process 57 to serve as the contracted sentence generation unit 17 illustrated in FIG. 1. The CPU 41 executes the contracted sentence output process 59 to serve as the contracted sentence output unit 19 illustrated in FIG. 1. In this manner, the computer 40 executes the contracted sentence generation program 50 to serve as the contracted sentence generation apparatus 10.

Functions achieved by the contracted sentence generation program 50 may be achieved by, for example, a semiconductor integrated circuit, more specifically, an application specific integrated circuit (ASIC).

Figure 5:
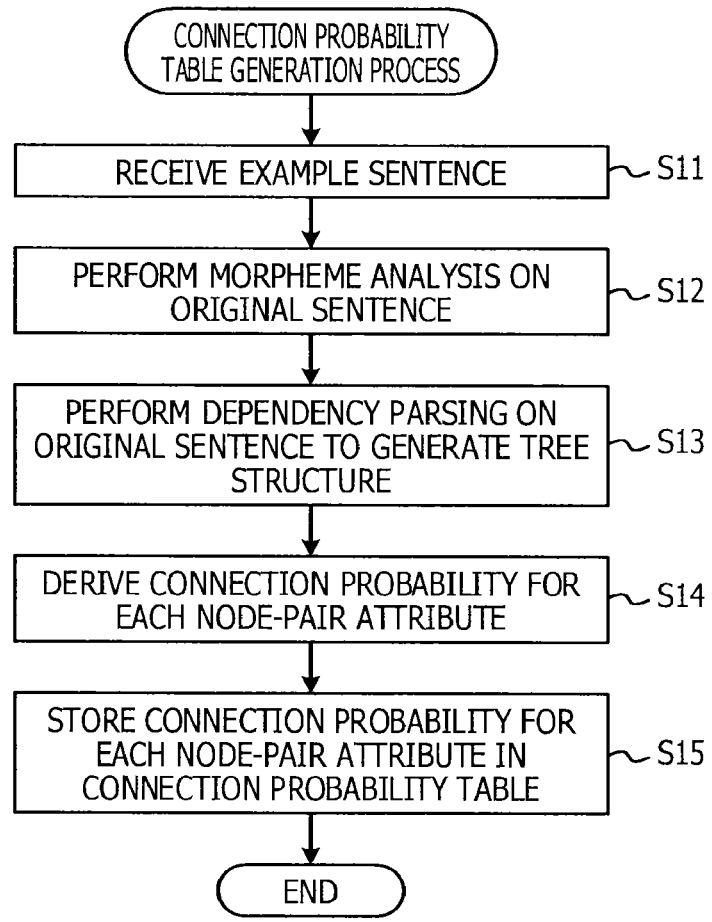
FIG. 5 is a flowchart of an exemplary connection probability table generation process.
Figure 6:
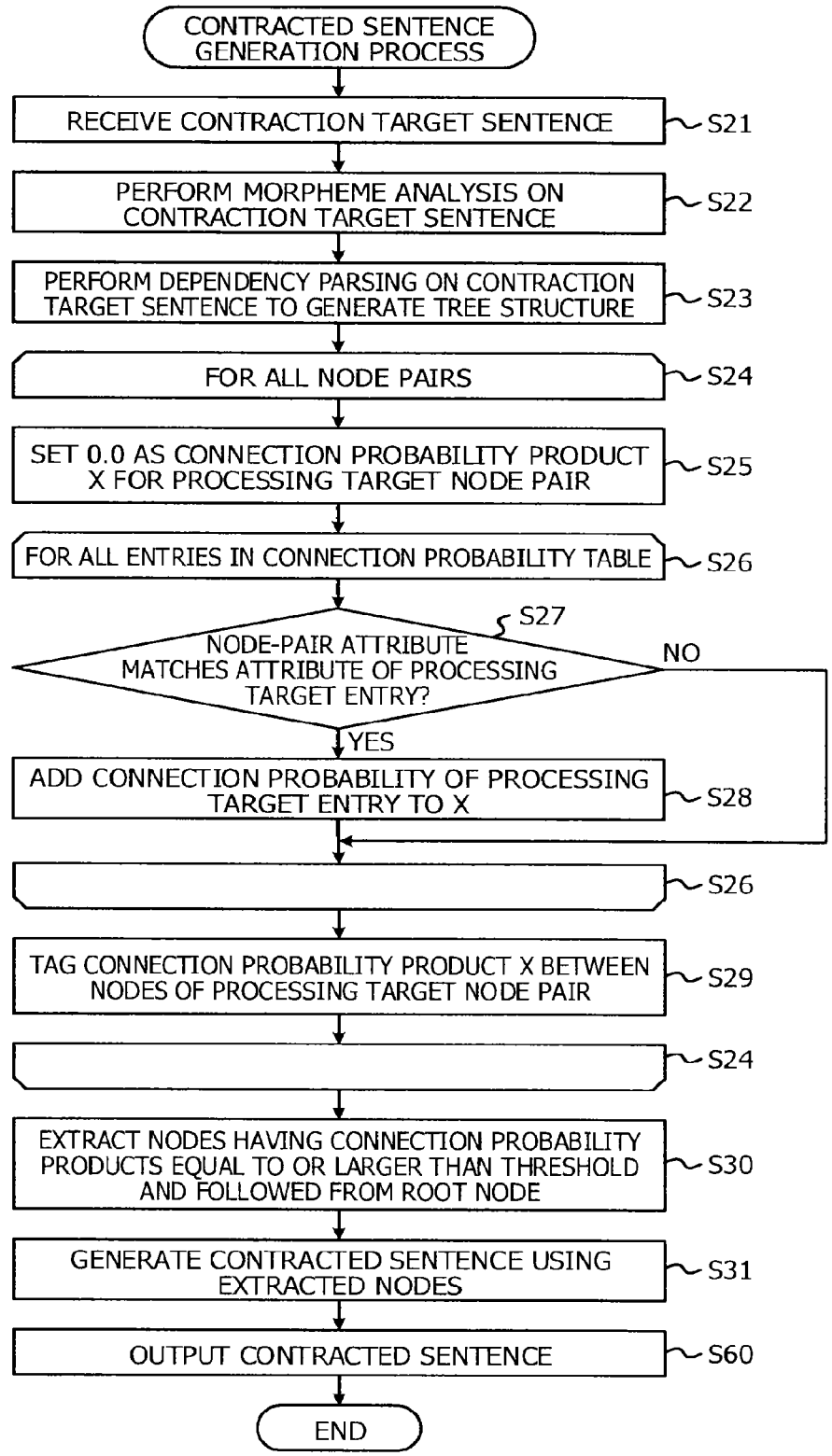
FIG. 6 is a flowchart of an exemplary contracted sentence generation process according to the first embodiment.

Next, an effect of the contracted sentence generation apparatus 10 according to the first embodiment will be described. When more than one example sentence 31 is inputted to the contracted sentence generation apparatus 10 at generation of the connection probability table 20, a connection probability table generation process illustrated in FIG. 5 is executed. When the contraction target sentence is inputted to the contracted sentence generation apparatus 10 at generation of a contracted sentence, a contracted sentence generation process illustrated in FIG. 6 is executed. The contracted sentence generation process executed by the contracted sentence generation apparatus 10 is an exemplary contracted sentence generating method according to the disclosed technique. The processes will be described below.

First, the connection probability table generation process will be described.

At step S11 in the connection probability table generation process illustrated in FIG. 5, the sentence input unit 11 receives more than one input example sentence 31. Next at step S12, the morphological analysis unit 12 performs the morphological analysis on the original sentence 32 included in each example sentence 31. Next at step S13, the dependency parsing unit 13 performs the dependency parsing on each original sentence 32 based on a result of this morphological analysis so as to generate a tree structure 34 representing the dependency relation between phrases in each original sentence 32, as illustrated in FIG. 2.

Next at step S14, the connection probability table generation unit 14 extracts all node pairs 35 from the tree structure 34 of each original sentence 32, and identifies the FROM node and the TO node of each node pair. Then, the connection probability table generation unit 14 derives the connection probability for each node-pair attribute by, for example, Expression (1) above based on an attribute of each node pair 35 and on whether this node pair 35 remains in a contracted sentence or are pruned at contraction.

Next at step S15, the connection probability table generation unit 14 stores the connection probability for each node-pair attribute derived at step S14 above in, for example, the connection probability table 20 as illustrated in FIG. 3, and in a predetermined storage region, which ends the connection probability table generation process.

Next, the contracted sentence generation process will be described.

At step S21 in the contracted sentence generation process illustrated in FIG. 6, the sentence input unit 11 receives the contraction target sentence inputted to the contracted sentence generation apparatus 10. In this example, the sentence input unit 11 receives the contraction target sentence "Since the weather was very good, (we) went hiking at a leafy park with a lunch "天気がとてもよ かったので、お弁当を持っ て緑の多い公 園にハイキン グに行っ た。"".

Figure 7:
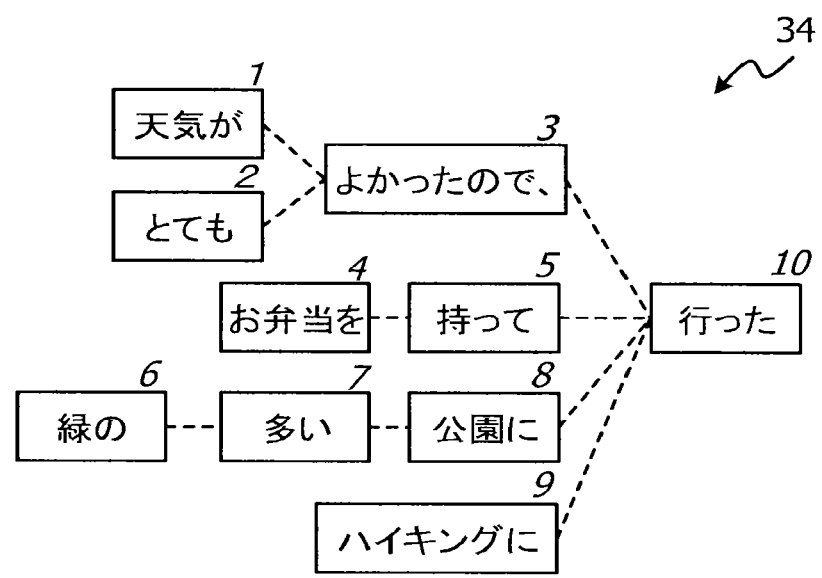
FIG. 7 is a diagram illustrating an exemplary tree structure of a contraction target sentence.

Next at step S22, the morphological analysis unit 12 performs the morphological analysis on the contraction target sentence. Next at step S23, the dependency parsing unit 13 performs the dependency parsing on the contraction target sentence based on a result of this morphological analysis to generate the tree structure 34 representing the dependency relation between phrases in the contraction target sentence. In this example, the tree structure 34 as illustrated in FIG. 7 is generated. A number tagged at top right of each node in the tree structure 34 illustrated in FIG. 7 indicates the order of appearance of the phrase corresponding to the node in the contraction target sentence.

Figure 8:
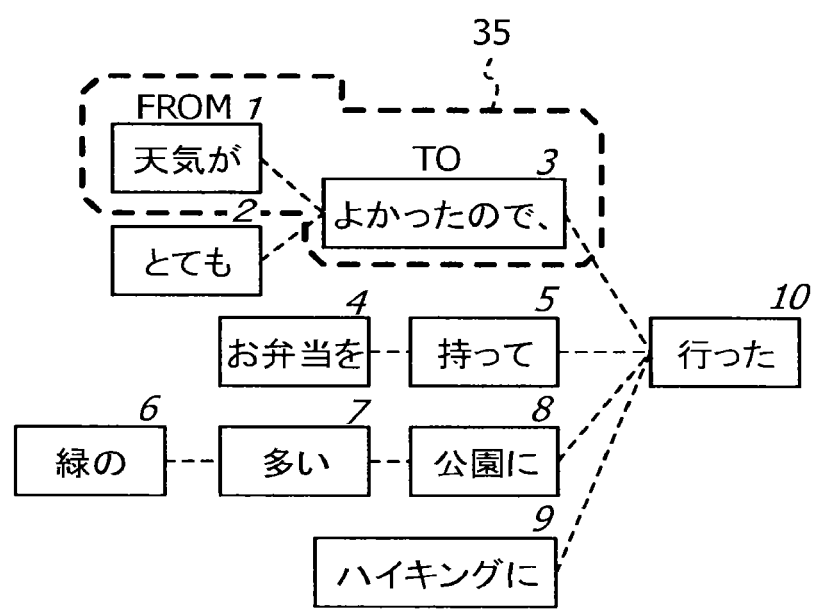
FIG. 8 is a diagram for explaining setting of a node pair.

Next, in loop processing at step S24, the connection probability tagging unit 15 sets each node pair included in the tree structure 34 generated at step S23 above as a processing target, and executes processing at step S25, loop processing at step S26, and processing at step S29. In this example, as illustrated in FIG. 8, the node pair 35 (node 1 "天気が" and node 3 "よかったの で、") enclosed by a dashed line is set as a processing target node pair.

At step S25, the connection probability tagging unit 15 sets "0.0" as the initial value of a variable x representing the connection probability product of the processing target node pair 35.

Next, in the loop processing at step S26, the connection probability tagging unit 15 sets each entry included in the connection probability table 20 as a processing target and executes processing at steps S27 and S28 below.

At step S27, the connection probability tagging unit 15 identifies the FROM node and the TO node based on the order of appearance, in the contraction target sentence, of the phrase corresponding to each node included in the processing target node pair 35. In this example, the node 1 "天気が" is identified as the FROM node, and the node 3 "よかったので" is identified as the TO node. Then, the connection probability tagging unit 15 determines whether an attribute of the processing target node pair 35 matches the attribute of the processing target entry. The flow proceeds to step S28 if the attributes match, or skips processing at step S28 if the attributes do not match. For example, the node-pair attribute of the processing target entry is "the FROM node includes a particle "が"". In this example, since the FROM node 1 "天気が" of the processing target node pair 35 includes the particle "が", it is determined that the attributes match, and then the flow proceeds to step S28.

At step S28, the connection probability of the processing target entry is added to the variable x. In this example, the connection probability "−0.12" of the processing target entry is added to an initial value of "0.0" to yield the variable x of "−0.12". In the present embodiment, the connection probability of the entry having the matching node-pair attribute is added to the variable x since the connection probability is converted to a logarithm, but the connection probability of the matching node-pair attribute entry is multiplied by the variable x when the connection probability is used as an antilogarithm.

When the loop processing at step S26 is completed for all entries included in the connection probability table 20, the flow proceeds to step S29. At this stage, the connection probability product x is obtained as the product (addition in logarithm) of the connection probabilities for node-pair attributes of the processing target node pair 35, as illustrated in FIG. 9. At step S29, the connection probability tagging unit 15 tags x as the connection probability product of two nodes included in the processing target node pair 35.

Figure 10:
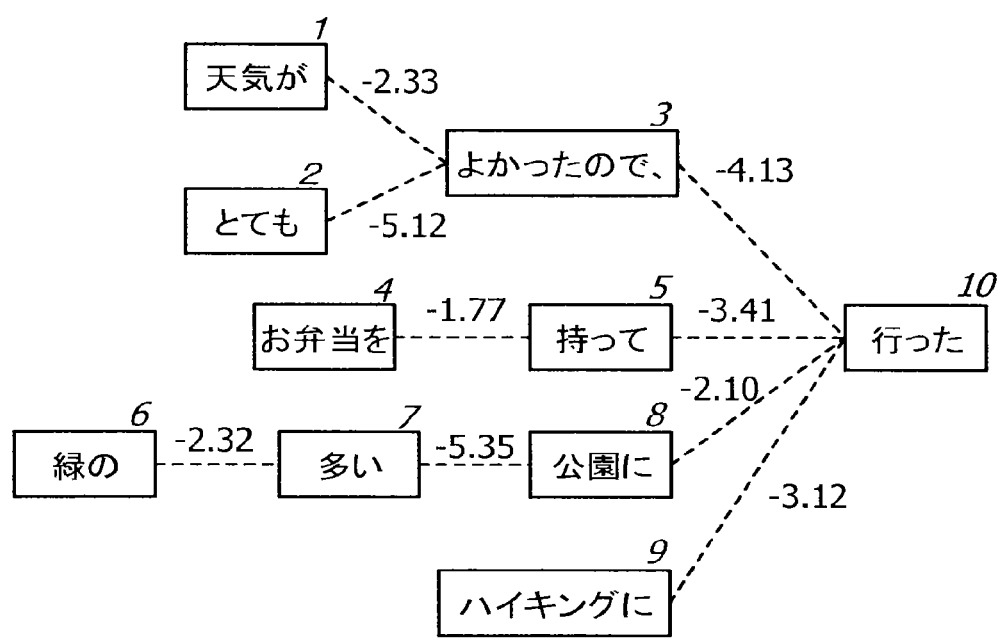
FIG. 10 is a diagram illustrating an exemplary tree structure in which the connection probability product is tagged between nodes.

When the tagging of the connection probability product for all node pairs included in the tree structure 34 generated at step S23 above is completed, the loop processing at step S24 ends. At this stage, as illustrated in FIG. 10, the connection probability product is tagged between nodes included in the tree structure 34. In FIG. 10, a number beside a line connecting nodes is the connection probability product.

Next at step S30, the threshold setting unit 16 sets the threshold of the connection probability product. Then, in the tree structure 34 of the contraction target sentence, the contracted sentence generation unit 17 follows, from a root node, nodes having connection probability products equal to or larger than the threshold thus set, and extracts nodes on a path followed without a stop.

Figure 11:
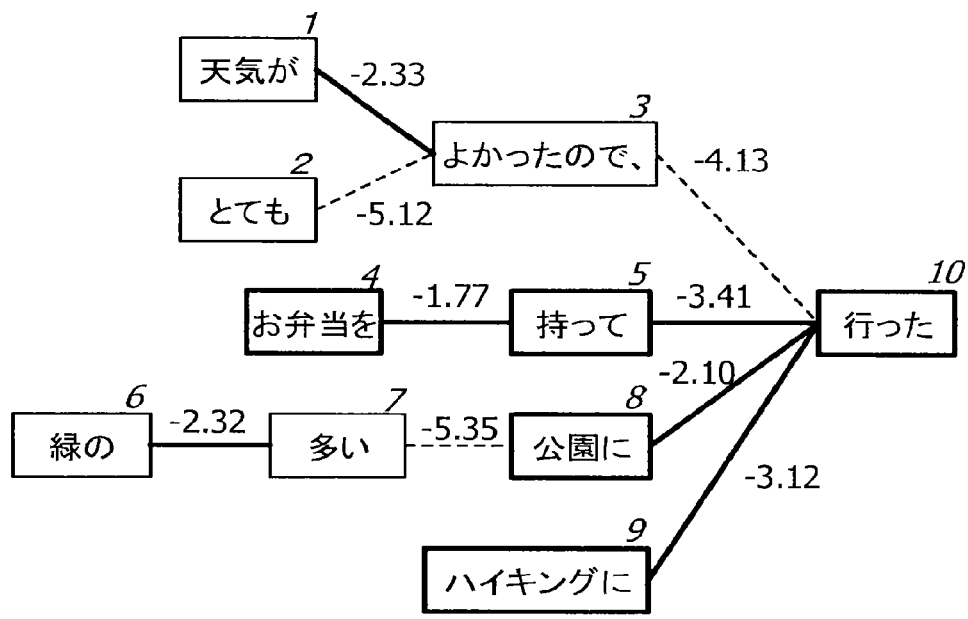
FIG. 11 is a diagram for explaining a contracted sentence generation.

FIG. 11 illustrates an example in which the set threshold is "−4.0". In FIG. 11, a bold solid line is drawn between nodes having a connection probability product equal to or larger than the threshold, and a dashed line is drawn between nodes having a connection probability product less than the threshold. Each path starts at a root node 10 "行った。" and follows a node 5 "持って", a node 8 "公園に", or a node 9 "ハイキングに" having the connection probability products with the root node which are equal to or larger than the threshold. Since the connection probability product of the root node and the node 3 "よかったので" is less than the threshold, the process of following nodes stops at the root node 10 "行った。". Since the connection probability product of the node 5 "持って" and a node 4 "お弁当を" is equal to or larger than the threshold, another path follows from the node 5 "持って" to the node 4 "お弁当 を". In contrast, since the connection probability product of a node 7 "多い" and the node 8 "公園に" connected with each other is less than the threshold, the process of following nodes stops at the node 8 "公園に". Similarly, the process stops at the node 9 "ハイキングに", which is not connected with any node. Accordingly, the root node 10 "行った。", and the node 5 "持って", the node 8 "公園に ", the node 9 "ハイキングに ", and the node 4 "お弁当を" followed from the root node without a stop are extracted.

Next at step S31, the contracted sentence generation unit 17 arranges the phrases corresponding to the nodes extracted at step S30 above in the order of appearance in the contraction target sentence so as to generate a contracted sentence. As illustrated in FIG. 11, in the example with the threshold of "−4.0", a contracted sentence "(we) went hiking at a park with a lunch. "お弁当を持っ て公園にハイ ングに行った。"" is generated. Generating the contracted sentence using the nodes extracted at step S30 above generates a contracted sentence obtained through pruning at a point (between nodes) where the process of following nodes is stopped.

Next at step S60, the contracted sentence output unit 19 outputs the contracted sentence generated at step S31 above, which ends the contracted sentence generation process.

As described above, the contracted sentence generation apparatus 10 according to the first embodiment allows the dependency relation between phrases included in the contraction target sentence to be represented by a tree structure connecting the nodes corresponding to the respective phrases. Then, the contracted sentence generation apparatus 10 tags, between two connected nodes, the connection probability as the probability that the nodes remain in a contracted sentence with no pruning provided between the nodes at generation of the contracted sentence. Then, the contracted sentence generation apparatus 10 generates a contracted sentence based on nodes extracted by following, from a root node, nodes having connection probabilities equal to or larger than the threshold. In this manner, whether to provide pruning between nodes is determined in accordance with the connection probability between the corresponding phrases based on the dependency relation, thereby reducing any pruning that otherwise would result in, for example, lack of an indispensable case, and thus generating a natural contracted sentence.

Second Embodiment

Next, a second embodiment of the disclosed technique will be described. An identical reference numeral is given to any component of a contracted sentence generation apparatus according to the second embodiment, which is the same as that of the contracted sentence generation apparatus 10 according to the first embodiment, and a detailed description thereof will be omitted.

Figure 12:
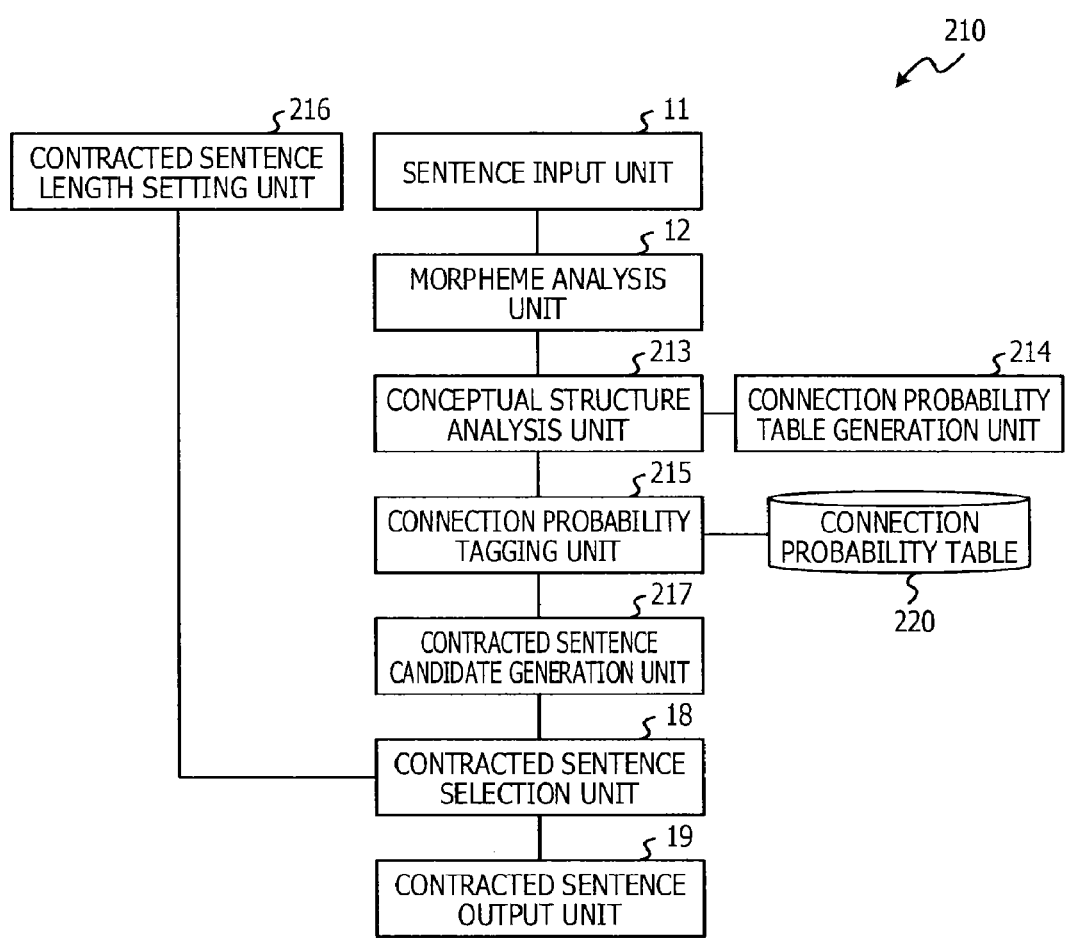
FIG. 12 is a functional block diagram schematically illustrating the configuration of a contracted sentence generation apparatus according to a second embodiment of the disclosed technique.

As illustrated in FIG. 12, a contracted sentence generation apparatus 210 according to the second embodiment includes the sentence input unit 11, the morphological analysis unit 12, a conceptual structure analysis unit 213, a connection probability table generation unit 214, a connection probability tagging unit 215, a contracted sentence length setting unit 216, and a contracted sentence candidate generation unit 217. The contracted sentence generation apparatus 210 further includes a contracted sentence selection unit 18 and the contracted sentence output unit 19. The contracted sentence generation apparatus 210 stores a connection probability table 220. The morphological analysis unit 12 and the conceptual structure analysis unit 213 are an exemplary analysis unit according to the disclosed technique. The connection probability table generation unit 214 is an exemplary derivation unit according to the disclosed technique. The connection probability tagging unit 215 is an exemplary tagging unit according to the disclosed technique. The contracted sentence candidate generation unit 217 and the contracted sentence selection unit 18 are an exemplary generation unit according to the disclosed technique.

The conceptual structure analysis unit 213 analyzes each phrase in the original sentence 32 or the contraction target sentence based on a result of the morphological analysis by the morphological analysis unit 12, identifies a semantic relation between phrases by referring to a lexis conceptual structure dictionary, and analyzes a conceptual structure of the original sentence 32 or the contraction target sentence. This allows the original sentence 32 or the contraction target sentence to be represented by a tree structure connecting phrases included in the original sentence 32 or the contraction target sentence based on the conceptual structure.

Figure 13:
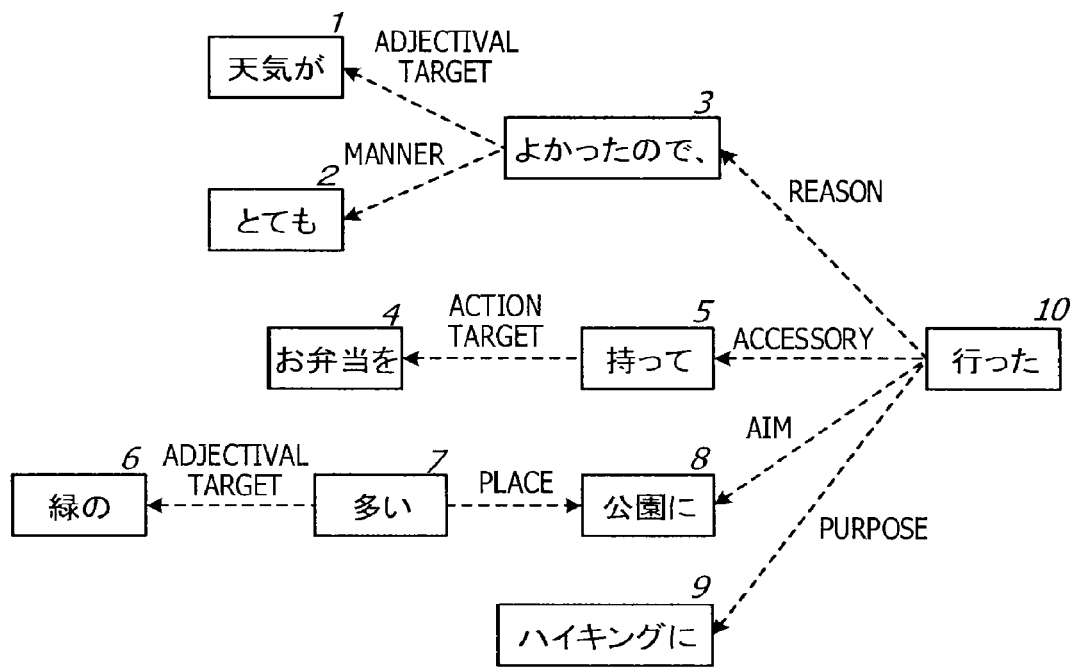
FIG. 13 is a diagram illustrating an exemplary tree structure of a contraction target sentence.

FIG. 13 is a diagram illustrating an exemplary tree structure obtained by analyzing the conceptual structure of the original sentence 32. As illustrated in FIG. 13, a node represents a phrase included in the original sentence 32 (or the contraction target sentence), and an arrow connects the nodes corresponding to phrases having a semantic relation, thereby representing a tree structure 234. In addition, a relation type indicating the type of a relation between the nodes connected by the arrow is tagged between the nodes thus connected. In the example in FIG. 13, the relation type of the node 1 "天気が" and the node 3 "よかったので" is indicated as an "adjectival target". The direction of the arrow between nodes represents the relation between the nodes, and the arrow in this example indicates that the node 1 "天気が" at the end point of the arrow is the "adjectival target" of the node 3 "よかったので、" at the start point of the arrow.

Similarly to the connection probability table generation unit 14 according to the first embodiment, the connection probability table generation unit 214 derives the connection probability for each node-pair attribute. In the following, any difference from the connection probability table generation unit 14 according to the first embodiment will be described.

The connection probability table generation unit 214 according to the second embodiment additionally uses the relation type between nodes in the conceptual structure as a node-pair attribute to generate the connection probability table 220. The connection probability table generation unit 214 identifies, of the node pair 35 of two nodes connected by an arrow, the node at the start point of the arrow as the FROM node, and the node at the end point of the arrow as the TO node.

Figure 14:
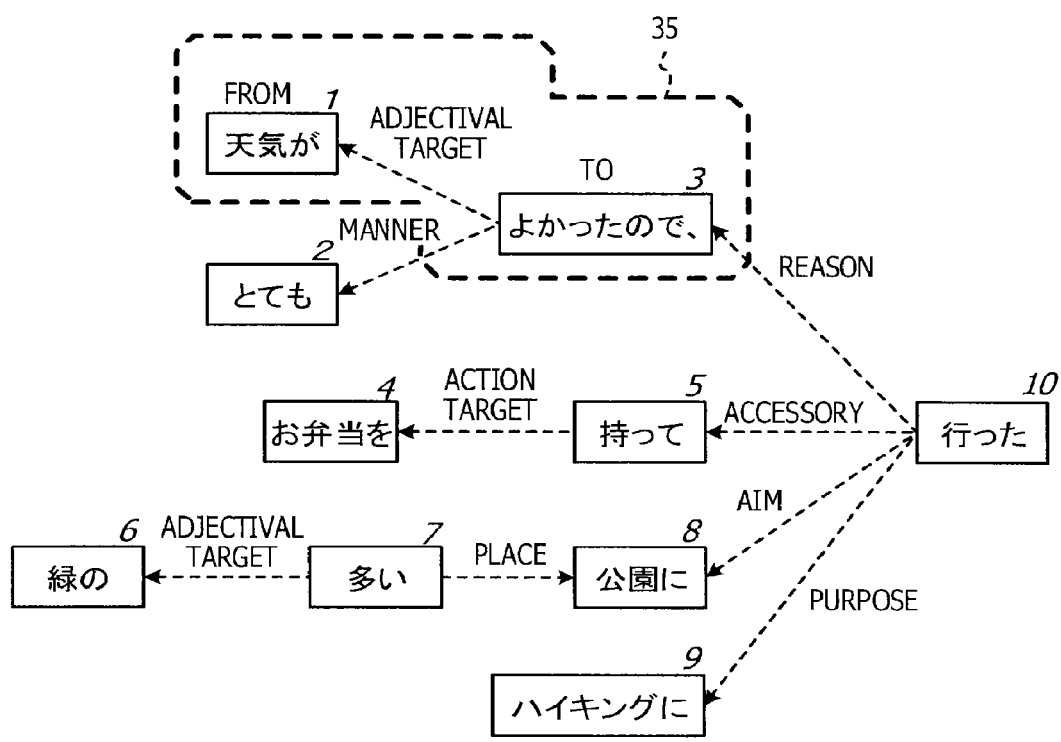
FIG. 14 is a diagram for explaining setting of a node pair.

FIG. 14 is a diagram for explaining setting of a node pair. For example, of a node pair 35 enclosed by a dashed line in FIG. 14, the node 3 "よ かったので、" is identified as the FROM node, and the node 1 "天気が" is identified as the TO node.

FIG. 15 is a diagram illustrating an exemplary connection probability table 220 generated by the connection probability table generation unit 214 according to the second embodiment. The same method as that of the first embodiment is applied to derive the connection probability for each node-pair attribute.

The connection probability tagging unit 215 tags, using the connection probability for each node-pair attribute stored in the connection probability table 220, the connection probability product between nodes in the tree structure 234 of the contraction target sentence analyzed by the conceptual structure analysis unit 213. The connection probability tagging unit 215 differs from the connection probability tagging unit 15 of the first embodiment in that the FROM node and the TO node are each identified depending on which of the start point and end point of the arrow of the node pair 35 a node is placed at, and the connection probability in accordance with the relation type between the nodes is reflected on the connection probability product tagged between the nodes. Except for this difference, the connection probability tagging unit 215 is the same as the connection probability tagging unit 15 according to the first embodiment.

The contracted sentence length setting unit 216 sets, to the contracted sentence selection unit 18, a desired contracted sentence length inputted through the input device or stored in advance in a predetermined storage region. The contracted sentence length is the length of a contracted sentence and may be set as the number of characters or bytes of the contracted sentence. The ratio (contraction ratio) of the length of the contracted sentence to the length of the contraction target sentence may be set in place of the contracted sentence length.

The contracted sentence candidate generation unit 217 sets different thresholds and generates a contracted sentence candidate for each threshold thus set. A method of generating the contracted sentence candidate is the same as the method of generating the contracted sentence by the contracted sentence generation unit 17 according to the first embodiment. The different thresholds may be each, for example, the connection probability product tagged to the node pair 35 included in the tree structure 234 of the contraction target sentence. In this case, the contracted sentence candidate generation unit 217 sorts the connection probability products tagged to the node pairs 35 in descending order and sequentially sets the connection probability product having a larger value to be the threshold so as to generate the contracted sentence candidate in accordance with the threshold. A root node for extracting nodes to be included in the contracted sentence candidate is a node not placed at the end point of any arrow in the tree structure 234. The contracted sentence candidate generation unit 217 stores each contracted sentence candidate thus generated and the contracted sentence length of the contracted sentence candidate in a buffer.

The contracted sentence selection unit 18 selects, from among the contracted sentence candidates stored in the buffer, the contracted sentence candidate having the largest contracted sentence length within the contracted sentence length set by the contracted sentence length setting unit 216. The contracted sentence selection unit 18 passes the contracted sentence candidate thus selected to the contracted sentence output unit 19 as a contracted sentence to be outputted.

Figure 16:
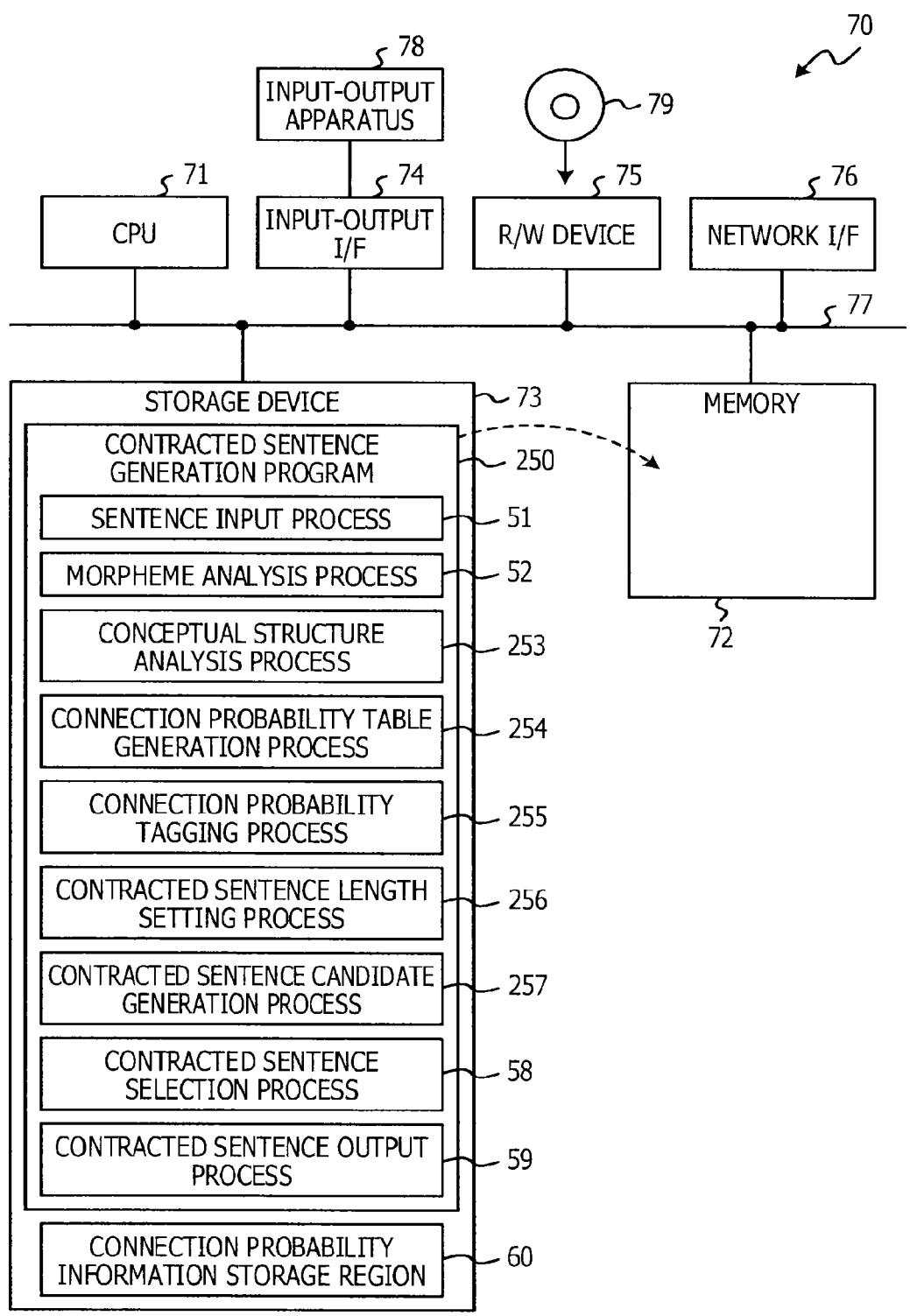
FIG. 16 is a block diagram schematically illustrating the configuration of a computer serving as the contracted sentence generation apparatus according to the second embodiment.

The contracted sentence generation apparatus 210 may be, for example, a computer 70 illustrated in FIG. 16. The computer 70 includes a CPU 71, a memory 72, and a non-volatile storage device 73. The computer 70 further includes an input-output I/F 74 to which an input-output apparatus 78 is connected, a R/W device 75 that controls reading and writing of data on a recording medium 79, and a network I/F 76. The CPU 71, the memory 72, the storage device 73, the input-output I/F 74, the R/W device 75, and the network I/F 76 are connected to each other through a bus 77.

The storage device 73 may be a HDD, a SSD, or a flash memory, for example. The storage device 73 as a storage medium stores a contracted sentence generation program 250 that causes the computer 70 to function as the contracted sentence generation apparatus 210. The storage device 73 includes the connection probability information storage region 60 in which information included in the connection probability table 220 is stored.

The CPU 71 reads out the contracted sentence generation program 250 from the storage device 73, loads the contracted sentence generation program 250 into the memory 72, and sequentially executes processes included in the contracted sentence generation program 250. The CPU 71 reads out information from the connection probability information storage region 60 to load the connection probability table 220 into the memory 72.

The contracted sentence generation program 250 includes the sentence input process 51, the morphological analysis process 52, a conceptual structure analysis process 253, a connection probability table generation process 254, a connection probability tagging process 255, and a contracted sentence length setting process 256. The contracted sentence generation program 250 further includes a contracted sentence candidate generation process 257, a contracted sentence selection process 58, and the contracted sentence output process 59.

The CPU 71 executes the conceptual structure analysis process 253 to serve as the conceptual structure analysis unit 213 illustrated in FIG. 12. The CPU 71 executes the connection probability table generation process 254 to serve as the connection probability table generation unit 214 illustrated in FIG. 12. The CPU 71 executes the connection probability tagging process 255 to serve as the connection probability tagging unit 215 illustrated in FIG. 12. The CPU 71 executes the contracted sentence length setting process 256 to serve as the contracted sentence length setting unit 216 illustrated in FIG. 12. The CPU 71 executes the contracted sentence candidate generation process 257 to serve as the contracted sentence candidate generation unit 217 illustrated in FIG. 12. The CPU 71 executes the contracted sentence selection process 58 to serve as the contracted sentence selection unit 18 illustrated in FIG. 12. Other processes are the same as those of the contracted sentence generation program 50 according to the first embodiment. In this manner, the computer 70 executes the contracted sentence generation program 250 to serve as the contracted sentence generation apparatus 210.

Functions achieved by the contracted sentence generation program 250 may be achieved by, for example, a semiconductor integrated circuit, or more specifically, an ASIC.

Figure 17:
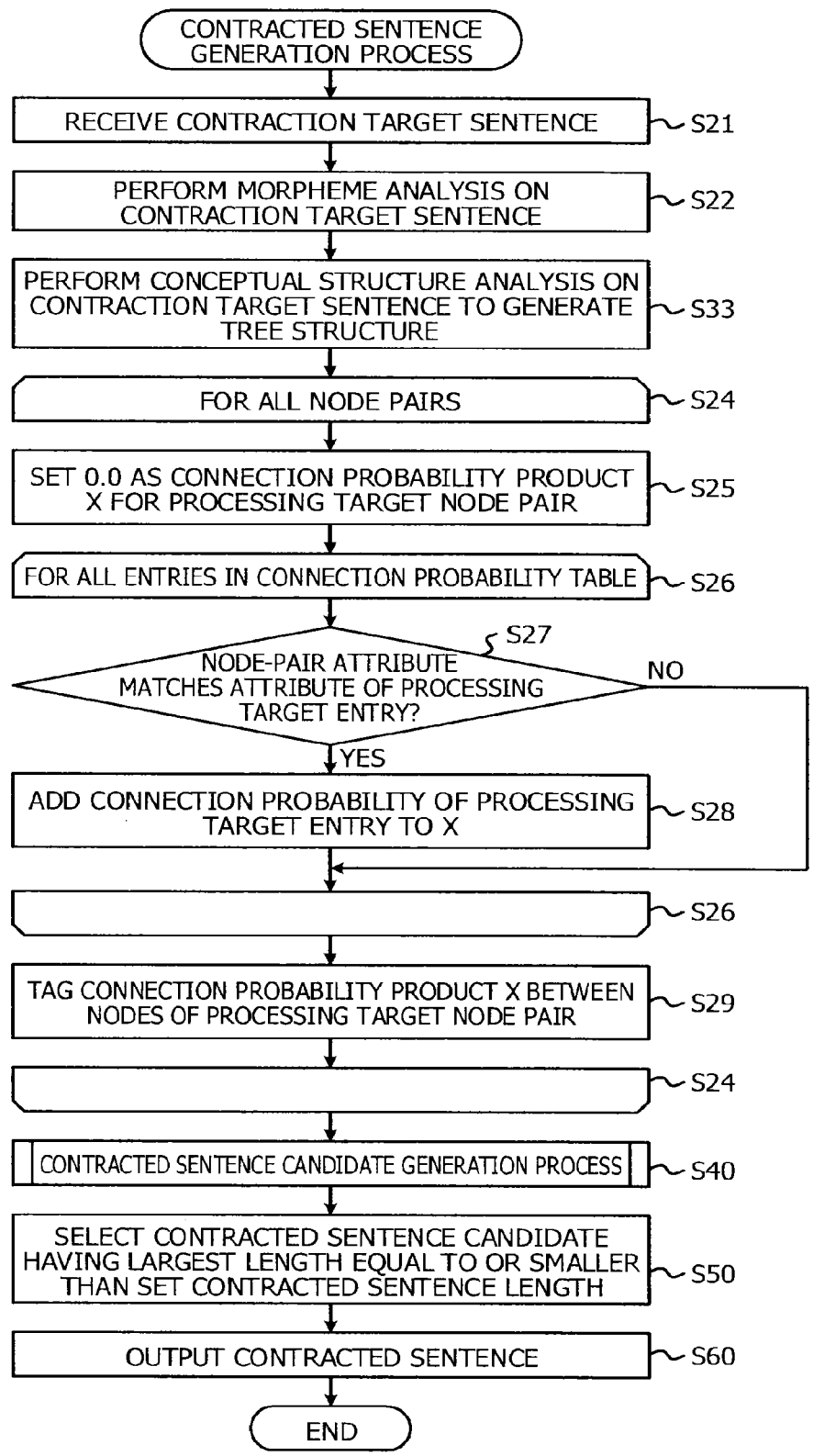
FIG. 17 is a flowchart of an exemplary contracted sentence generation process according to the second embodiment.

Next, an effect of the contracted sentence generation apparatus 210 according to the second embodiment will be described. When more than one example sentence 31 is inputted to the contracted sentence generation apparatus 210 at generation of the connection probability table 220, the connection probability table generation process illustrated in FIG. 5 is executed. When the contraction target sentence is inputted to the contracted sentence generation apparatus 210 at generation of the contracted sentence, a contracted sentence generation process illustrated in FIG. 17 is executed.

The contracted sentence generation process executed by the contracted sentence generation apparatus 210 is an exemplary contracted sentence generating method according to the disclosed technique. The processes will be described below.

When the connection probability table 220 according to the second embodiment is generated, the connection probability table generation process illustrated in FIG. 5 is executed similarly to the first embodiment. However, the connection probability table generation process according to the second embodiment is different from the process according to the first embodiment in the following points.

At step S13, the conceptual structure analysis unit 213 generates the tree structure 234 obtained by analyzing the conceptual structure of each original sentence 32.

At step S14, the FROM node and the TO node of a node pair are each identified based on which of the start point and end point of the arrow connecting two nodes included in the node pair a node is placed at. The relation type between nodes obtained by the conceptual structure analysis is also used as a node-pair attribute to derive the connection probability for each node-pair attribute.

Next, the contracted sentence generation process will be described. An identical reference numeral is given to any step of the same processing as that in the contracted sentence generation process according to the first embodiment, and a detailed description thereof will be omitted.

At step S21 in the contracted sentence generation process illustrated in FIG. 17, the sentence input unit 11 receives the contraction target sentence inputted to the contracted sentence generation apparatus 10. In this example, the sentence input unit 11 receives the contraction target sentence of "Since the weather was very good, (we) went hiking at a leafy park with a lunch "天気がとても よかったので、 お弁当を持っ て緑の多い公園 にハイキン グに行っ た。"".

Next at step S22, the morphological analysis unit 12 performs the morphological analysis on the contraction target sentence. Next at step S33, the conceptual structure analysis unit 213 analyzes the conceptual structure of the contraction target sentence based on a result of this morphological analysis to generate the tree structure 234 representing the conceptual structure of the contraction target sentence. In this example, the tree structure 234 as illustrated in FIG. 13 is generated.

Next, in the loop processing at step S24, the connection probability tagging unit 215 sets each node pair included in the tree structure 234 generated at step S33 above as a processing target, and executes the processing at step S25, the loop processing at step S26, and the processing at step S29. In this example, as illustrated in FIG. 14, a node pair 35 (the node 1 "天気が" and the node 3 "よかったので、") enclosed by a dashed line is set as the processing target node pair 35.

At step S25, the connection probability tagging unit 215 sets "0.0" as the initial value of the variable x representing the connection probability product of the processing target node pair 35.

Next, in the loop processing at step S26, the connection probability tagging unit 215 sets each entry included in the connection probability table 220 as a processing target and executes processing at steps S27 and S28.

At step S27, the connection probability tagging unit 215 identifies the FROM node and the TO node based on the direction of an arrow connecting two nodes included in the processing target node pair 35. In this example, the node 1 "天気が" is identified as the TO node, and the node 3 "よかったので、" is identified as the FROM node. Then, the connection probability tagging unit 215 determines whether a node-pair attribute of the processing target matches the attribute of the processing target entry. The flow proceeds to step S28 if the attributes match, or skips processing at step S28 if the attributes do not match. For example, the node-pair attribute of the processing target entry is "the relation type between nodes is "adjectival target"". In this example, since "adjectival target" is tagged to the processing target node pair 35 as a relation type, it is determined that the attributes match, and then the flow proceeds to step S28. At step S28, the connection probability of the processing target entry is added to the variable x.

When the loop processing at step S26 is completed for all entries included in the connection probability table 220, the flow proceeds to step S29. At this stage, the connection probability product x is obtained as the product (addition in logarithm) of the connection probabilities for node-pair attributes of the processing target node pair 35, as illustrated in FIG. 18. At step S29, the connection probability tagging unit 215 tags x as the connection probability between two nodes included in the processing target node pair 35.

Figure 19:
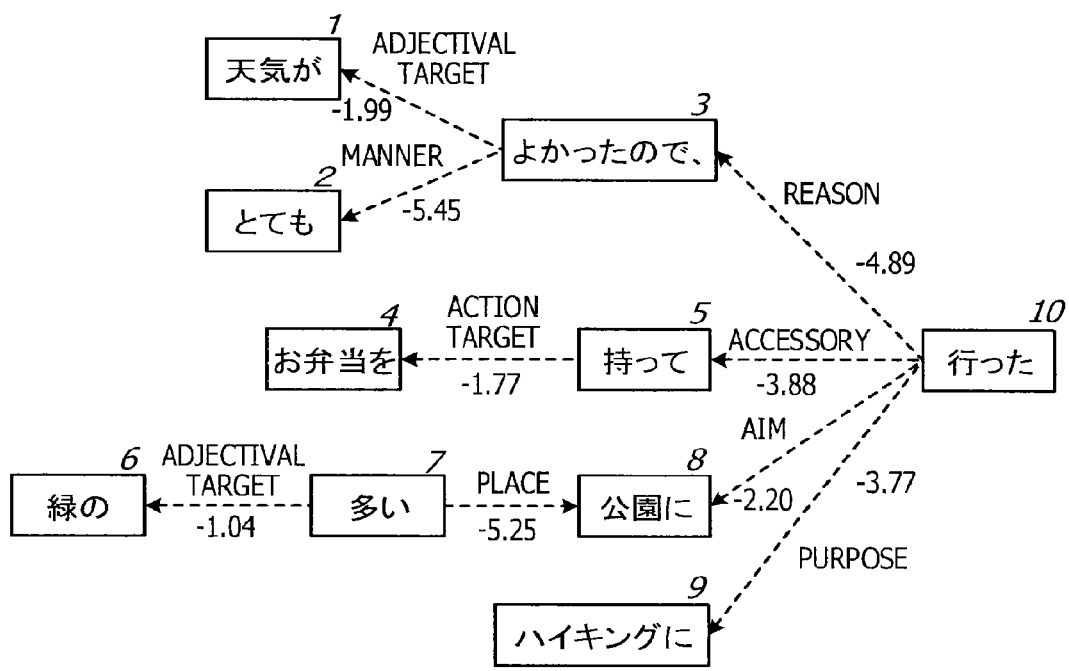
FIG. 19 is a diagram illustrating an exemplary tree structure in which the connection probability product is tagged between nodes.

When the tagging of the connection probability is completed for all node pairs 35 included in the tree structure 234 generated at step S33 above, the loop processing at step S24 ends. At this stage, as illustrated in FIG. 19, the connection probability product is tagged between nodes included in the tree structure 234. In FIG. 19, a number beside an arrow connecting nodes is the connection probability product.

Figure 20:
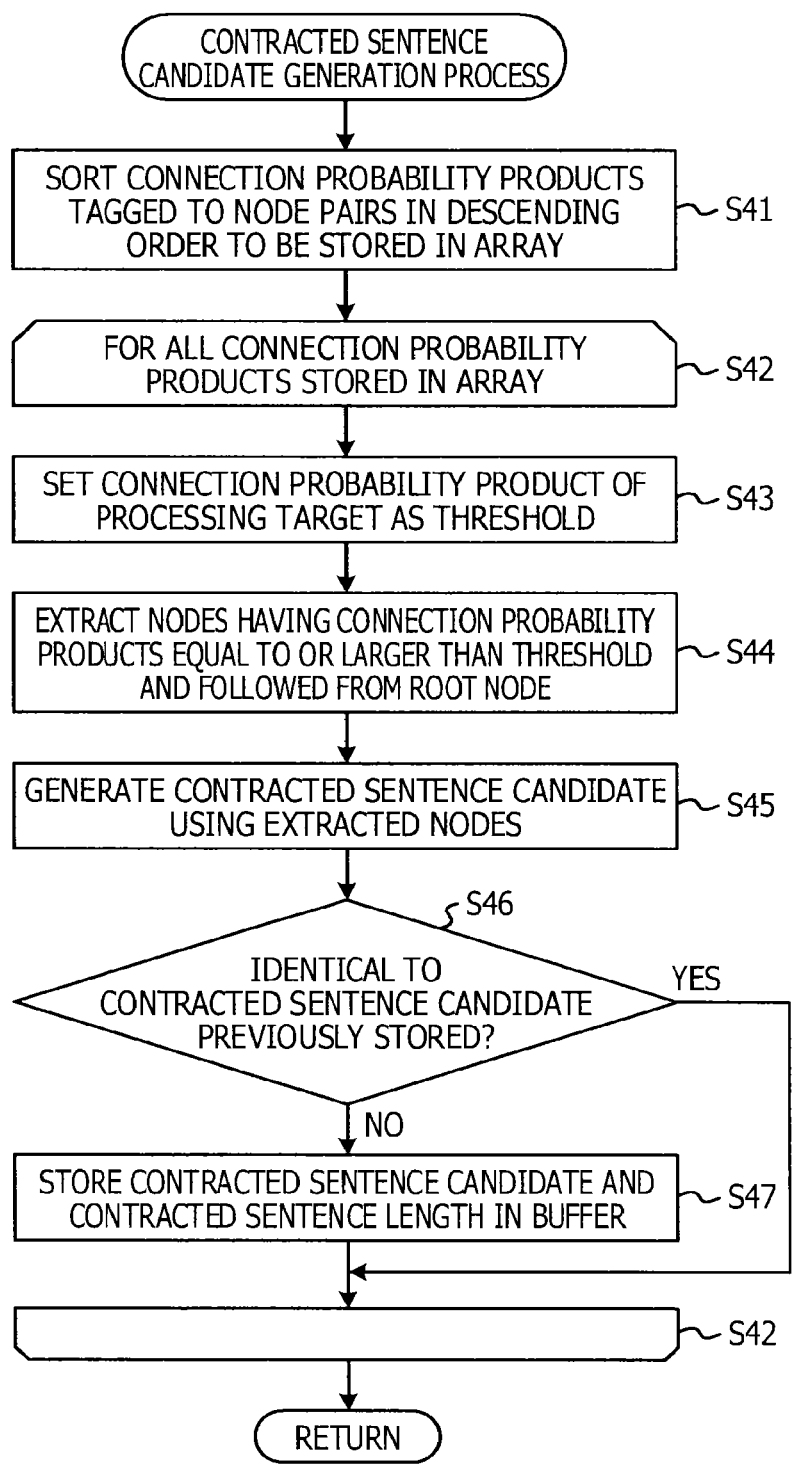
FIG. 20 is a flowchart of an exemplary contracted sentence candidate generation process.

Next at step S40, the contracted sentence candidate generation process illustrated in detail in FIG. 20 is executed.

At step S41 in the contracted sentence candidate generation process illustrated in FIG. 20, the contracted sentence candidate generation unit 217 sorts the connection probability products tagged to the node pairs 35 included in the tree structure 234 of the contraction target sentence in descending order, and stores the connection probability products thus sorted in an array as illustrated in FIG. 21.

Figure 22:
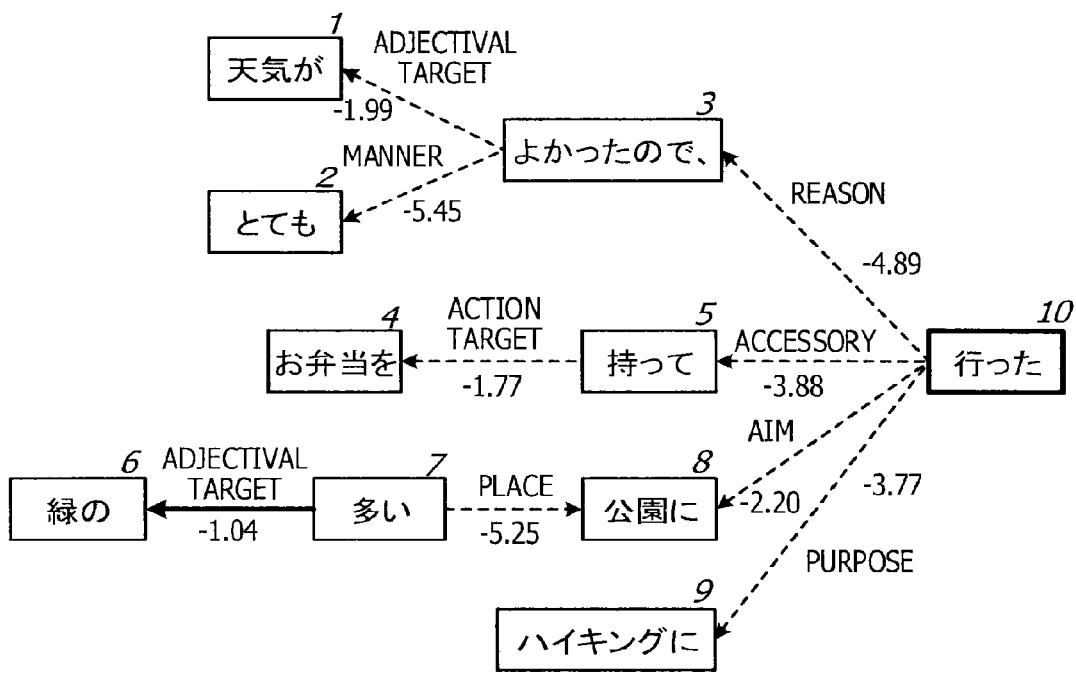
FIG. 22 is a diagram for explaining a contracted sentence candidate generation.

Next, in loop processing at step S42, the contracted sentence candidate generation unit 217 sets each connection probability product stored in the array as a processing target, and executes processing at steps S43 to S47. In this example, as illustrated in FIG. 22, the connection probability product "−1.04" is set as the processing target. In FIG. 22, a bold solid arrow is drawn between nodes having a connection probability product equal to or larger than the threshold, and a dashed line is drawn between nodes having a connection probability product less than the threshold.

At step S43, the contracted sentence candidate generation unit 217 sets the connection probability product of the processing target to be the threshold of the connection probability product. Next, at steps S44 and S45, the contracted sentence candidate generation unit 217 performs the same processing as that of steps S30 and S31 in the contracted sentence generation process (FIG. 6) according to the first embodiment so as to generate a contracted sentence candidate in accordance with the threshold set at step S43.

Next at step S46, the contracted sentence candidate generation unit 217 determines whether the contracted sentence candidate generated at step S45 above is identical to any contracted sentence candidate stored in advance in the buffer. If these contracted sentence candidates are not identical, the flow proceeds to step S47. At step S47, the contracted sentence candidate generation unit 217 stores the contracted sentence candidate thus generated and the contracted sentence length of this contracted sentence candidate in the buffer. In contrast, if the contracted sentence candidate thus generated is identical to any contracted sentence candidate stored in advance in the buffer, the flow skips this processing at step S47.

For example, in the example in FIG. 22, since none of the nodes connected to the root node 10 "行った。" has the connection probability product of the nodes equal to or larger than the threshold, only the root node 10 "行った 。" is extracted to generate the contracted sentence candidate. The buffer, which is empty at this stage, stores the contracted sentence candidate (went. "行った。") thus generated. FIG. 22 illustrates an extracted node with a bold frame.

Figure 23:
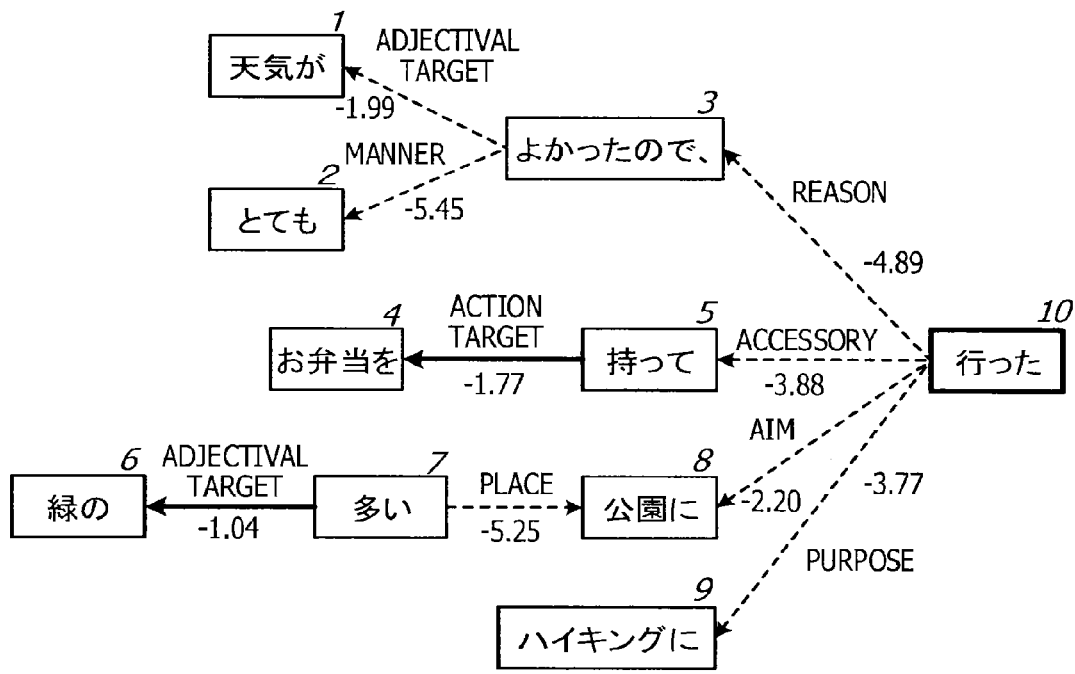
FIG. 23 is a diagram for explaining the contracted sentence candidate generation.

When the flow returns to step S43, the contracted sentence candidate generation unit 217 sets the next largest connection probability product among the connection probability products stored in the array to be the threshold. For example, as illustrated in FIG. 23, the threshold of the connection probability product is set to "−1.77". In this example, since the phrase "行った。" in the root node is generated, which is identical to the contracted sentence candidate stored in advance in the buffer, a positive determination is made at step S46, and the flow again returns to step S43 without storing the contracted sentence candidate thus generated in the buffer.

Next at step S43, the contracted sentence candidate generation unit 217 sets "−1.99" as the threshold of the connection probability product, and the phrase in the root node is generated as the contracted sentence candidate (went. "行った。") like in FIG. 23. Accordingly, a positive determination is made at step S46, and the flow again returns to step S43 without storing the contracted sentence candidate thus generated in the buffer.

Figure 24:
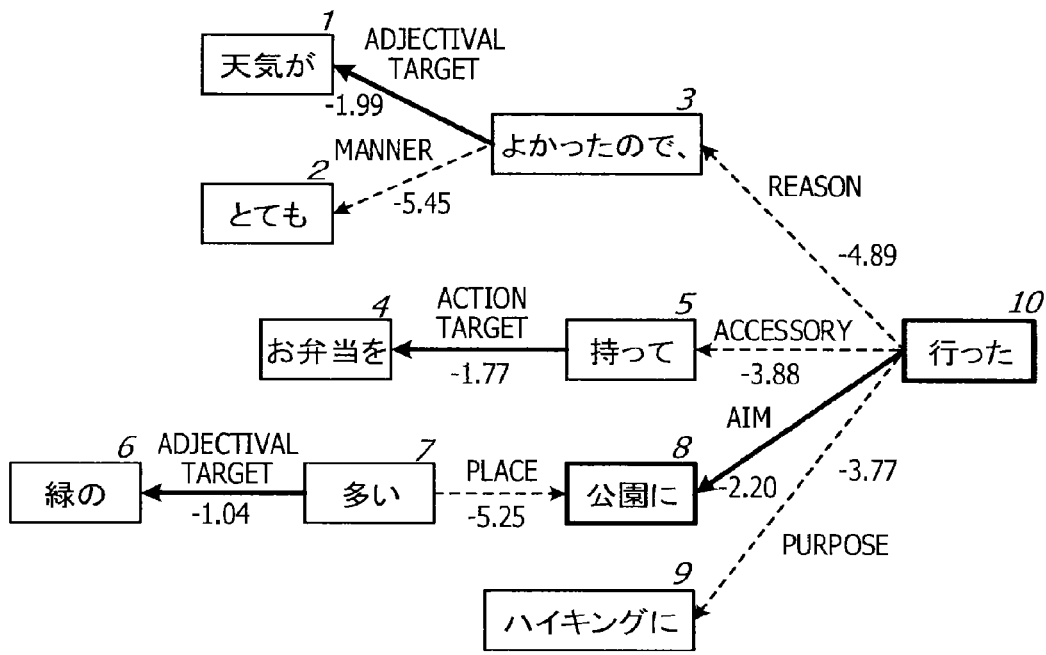
FIG. 24 is a diagram for explaining the contracted sentence candidate generation.

Next, when the contracted sentence candidate generation unit 217 sets "−2.20" as the threshold of the connection probability product at step S43 as illustrated in FIG. 24, a phrase is generated as the contracted sentence candidate (went at a park. "公園に行った。") by combining the phrases in the nodes 8 and 10 in this order. Since this contracted sentence candidate is not stored in the buffer, a negative determination is made at step S46, the contracted sentence candidate thus generated is stored in the buffer, and the flow again returns to step S43.

Figure 25:
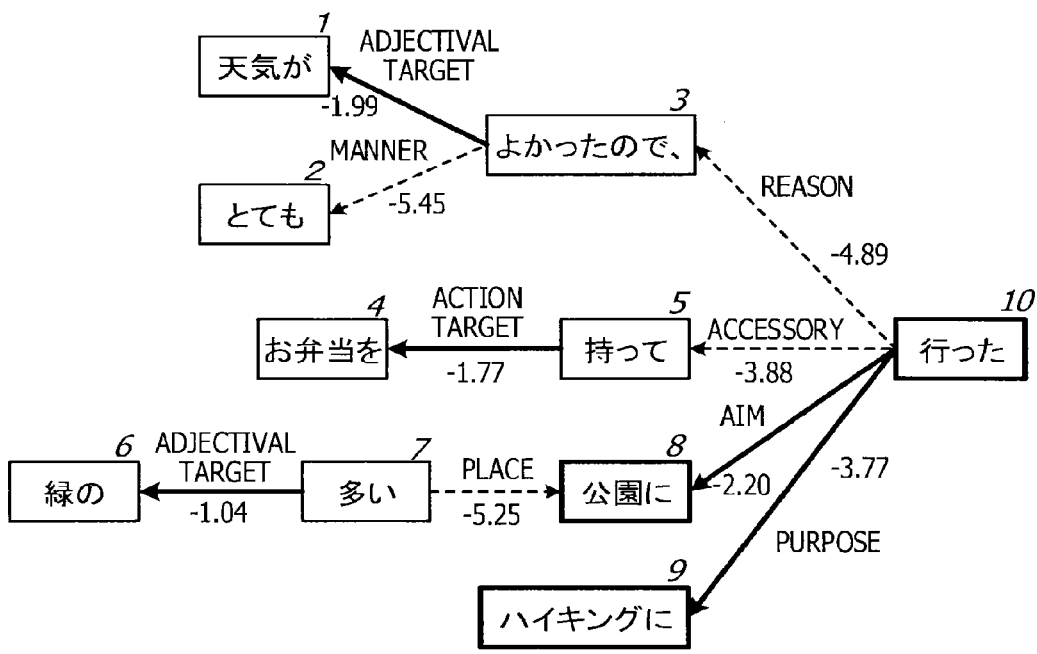
FIG. 25 is a diagram for explaining the contracted sentence candidate generation.

Next, when the contracted sentence candidate generation unit 217 sets "−3.77" as the threshold of the connection probability product at step S43 as illustrated in FIG. 25, a phrase is generated as the contracted sentence candidate (went hiking at a park. "公園にハイキングに行った。") by combining the phrases in the nodes 8, 9, and 10 in this order. Since this contracted sentence candidate is not stored in the buffer, a negative determination is made at step S46, the contracted sentence candidate thus generated is stored in the buffer, and the flow again returns to step S43.

When the loop processing at step S42 is completed for all connection probability products stored in the array, the contracted sentence candidate generation process ends, and the flow returns to the contracted sentence generation process (FIG. 17). FIG. 26 illustrates a list of the contracted sentence candidates stored in the buffer at this stage. Since different connection probability products are set in stages, the contracted sentence candidates having various contracted sentence lengths are obtained in accordance with a set threshold.

Next, at step S50 in the contracted sentence generation process illustrated in FIG. 17, the contracted sentence length setting unit 216 sets the contracted sentence length. Then, the contracted sentence selection unit 18 selects, from among the contracted sentence candidates stored in the buffer, the contracted sentence candidate having the largest contracted sentence length within the contracted sentence length thus set. For example, when the contracted sentence length is set to "30" and the contracted sentence candidates illustrated in FIG. 26 are generated, the contracted sentence candidate (went hiking at a park " 公園にハイキン グに行った。") of 26 bytes having the largest contracted sentence length is selected from among contracted sentence candidates having contracted sentence lengths equal to or smaller than 30.

Next at step S60, the contracted sentence output unit 19 outputs the contracted sentence selected at step S50 above, and this ends the contracted sentence generation process.

As described above, the contracted sentence generation apparatus 210 according to the second embodiment generates a tree structure by connecting the nodes corresponding to phrases based on the conceptual structure of phrases included in the contraction target sentence. Then, the contracted sentence generation apparatus 210 tags, between two connected nodes, the connection probability as the probability that the nodes remain in a contracted sentence with no pruning provided between the nodes at generation of the contracted sentence. Then, the contracted sentence generation apparatus 210 generates a contracted sentence based on nodes extracted by following, from a root node, nodes having connection probabilities equal to or larger than the threshold. In this manner, whether to provide pruning between nodes is determined in accordance with the connection probability between phrases based on the conceptual structure, thereby reducing any pruning that otherwise would result in, for example, lack of an indispensable case, and thus generating a natural contracted sentence.

In addition, different thresholds of the connection probability product are set to generate contracted sentence candidates. From among the contracted sentence candidates thus generated, the contracted sentence candidate having the largest length within a desired contracted sentence length is selected, thereby generating a natural contracted sentence having a larger length within the contracted sentence length thus set.

The second embodiment describes the case in which each connection probability product tagged between nodes included in the tree structure of the contraction target sentence is set as the threshold for generating the contracted sentence candidate, but is not limited thereto. For example, the threshold may be set to gradually different values between the maximum value and minimum value of the connection probability products tagged between nodes included in the tree structure of the contraction target sentence.

The contracted sentence length of the generated candidate increases as the set threshold decreases, like in the second embodiment. In this case, the loop processing at step S42 in the contracted sentence candidate generation process (FIG. 20) may be ended when the length of a contracted sentence candidate thus produced exceeds a contracted sentence length thus set.

In the second embodiment, a tree structure obtained by performing the dependency parsing as in the first embodiment may be used in place of a tree structure obtained by analyzing the conceptual structure. In the first embodiment, a contracted sentence to be outputted may be selected based on a set contracted sentence length from among contracted sentence candidates generated in accordance with a number of thresholds as in the second embodiment. The processing contents of the embodiments may be combined as appropriate.

The first and second embodiments each describe the case in which the probability expressed in Expression (1) is used as the connection probability for each node-pair attribute, but are not limited thereto. For example, a value obtained by multiplying the probability obtained by Expression (1) by a coefficient, or degrees (for example, connection degrees of "high", "middle", and "low") set in stages depending on the probability may be used.

The first and second embodiments each describe the case of using the connection probability product that is the product (addition in logarithm) of the connection probability of each entry in the connection probability table which matches a node-pair attribute, but are not limited thereto. A weighted sum or average of the connection probabilities as an integrated connection probability of all connection probabilities may be used.

The first and second embodiments each describe the case in which the phrases corresponding to nodes extracted by following, from a root node, nodes having connection probability products equal to or larger than the threshold, are arranged in the order of appearance in the contraction target sentence so as to generate a contracted sentence or contracted sentence candidate, but are not limited thereto. Depending on a language and pruned nodes, a more natural sentence may be generated by adopting a word order in the contracted sentence, which is different from that in the contraction target sentence. Specifically, the contracted sentence may be generated by rearranging the phrases corresponding to the extracted nodes with a grammatical or conceptual relation taken into consideration based on how the extracted nodes are connected in the tree structure of the contraction target sentence.

The first and second embodiments each describe the configuration that includes the connection probability table generation unit, but are not limited thereto. A connection probability table generated by an information processing apparatus other than the contracted sentence generation apparatus may be stored in a predetermined storage region of the contracted sentence generation apparatus, or may be read into the contracted sentence generation apparatus at generation of the contracted sentence. In this case, the connection probability table generation unit may be omitted from the configuration of the contracted sentence generation apparatus.

The first and second embodiments each describe the case of analyzing the dependency relation between phrases as elements of the original sentence or the contraction target sentence and the conceptual structure thereof, but are not limited thereto. Words and clauses may be used as the elements of the original sentence or the contraction target sentence, and elements in units appropriate for a target language and a desired contraction ratio may be used.

The first and second embodiments each describe the case in which more than one example sentence 31 is inputted at generation of the connection probability table, but a single example sentence 31 may be inputted.

The first and second embodiments describe the case in which the contracted sentence generation programs 50 and 250 are stored (installed) in advance on the storage device 43, but are not limited thereto. The programs according to the disclosed technique may be provided being recorded in recording media such as a CD-ROM, a DVD-ROM, and a USB memory.

Third Embodiment

Figure 27:
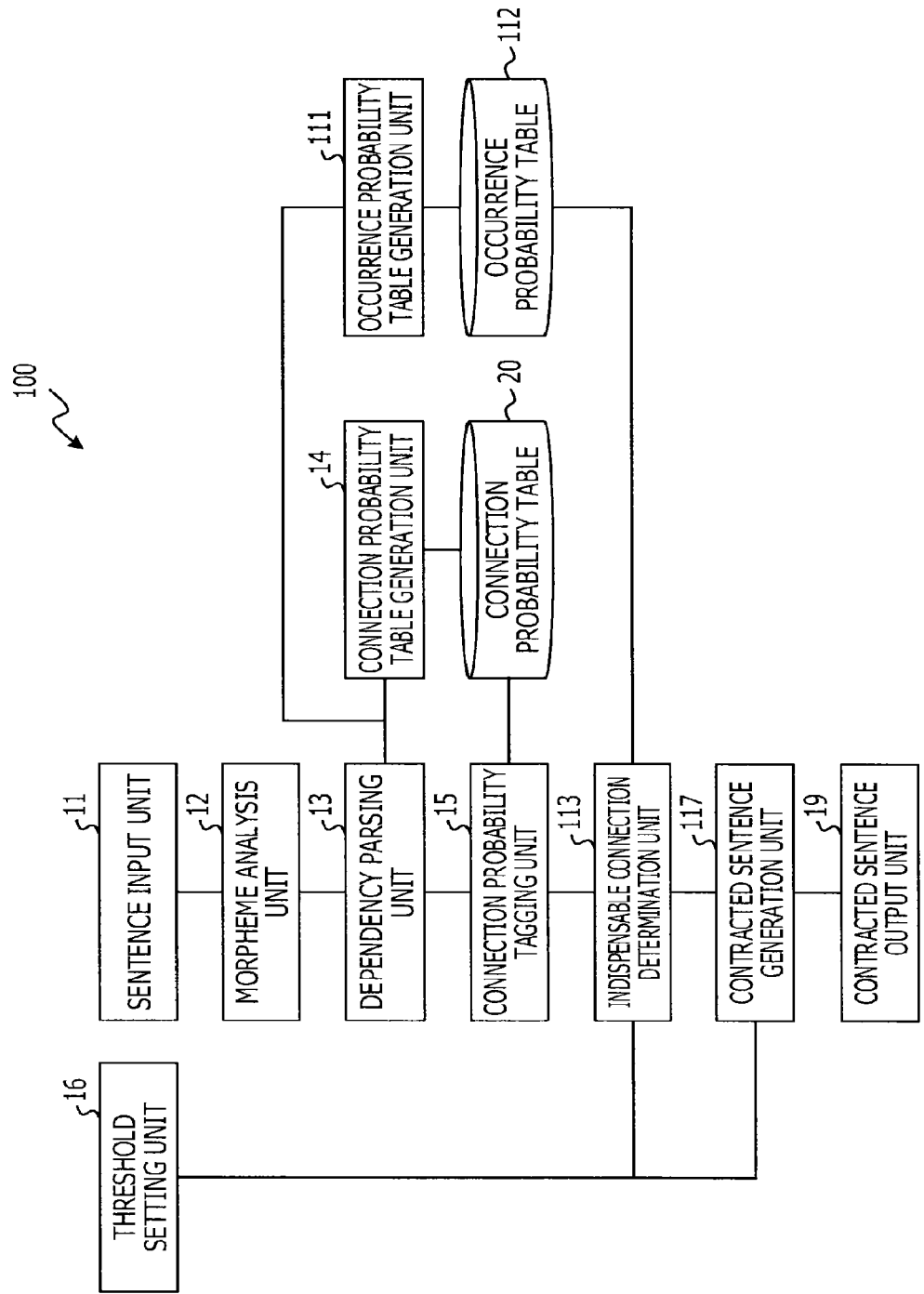
FIG. 27 is a functional block diagram schematically illustrating the configuration of a contracted sentence generation apparatus according to a third embodiment.

FIG. 27 is a functional block diagram schematically illustrating the configuration of a contracted sentence generation apparatus according to a third embodiment. As illustrated in FIG. 27, a contracted sentence generation apparatus 100 according to the third embodiment includes a sentence input unit 11, a morphological analysis unit 12, a dependency parsing unit 13, a connection probability table generation unit 14, a connection probability tagging unit 15, a threshold setting unit 16, and a contracted sentence output unit 19. In addition, the contracted sentence generation apparatus 100 includes an occurrence probability table generation unit 111, an indispensable connection determination unit 113, and a contracted sentence generation unit 117. The contracted sentence generation apparatus 100 stores a connection probability table 20 and an occurrence probability table 112. The contracted sentence generation unit 117 is an exemplary generation unit according to the disclosed technique. The connection probability table 20 is exemplary information stored in a first storage device. Similarly, the occurrence probability table 112 is exemplary information stored in a second storage device.

The contracted sentence generation apparatus 100 receives more than one example sentence which is used for a learning process to be described later or an input sentence (hereinafter, referred to as a "contraction target sentence") from which a contracted sentence is generated in the contracted sentence generation process. The example sentences and the input sentences include more than one word. The contracted sentence is generated by excluding some word from the words configuring the input sentence. The learning process is to generate the connection probability table 20 and the occurrence probability table 112.

Figure 28:
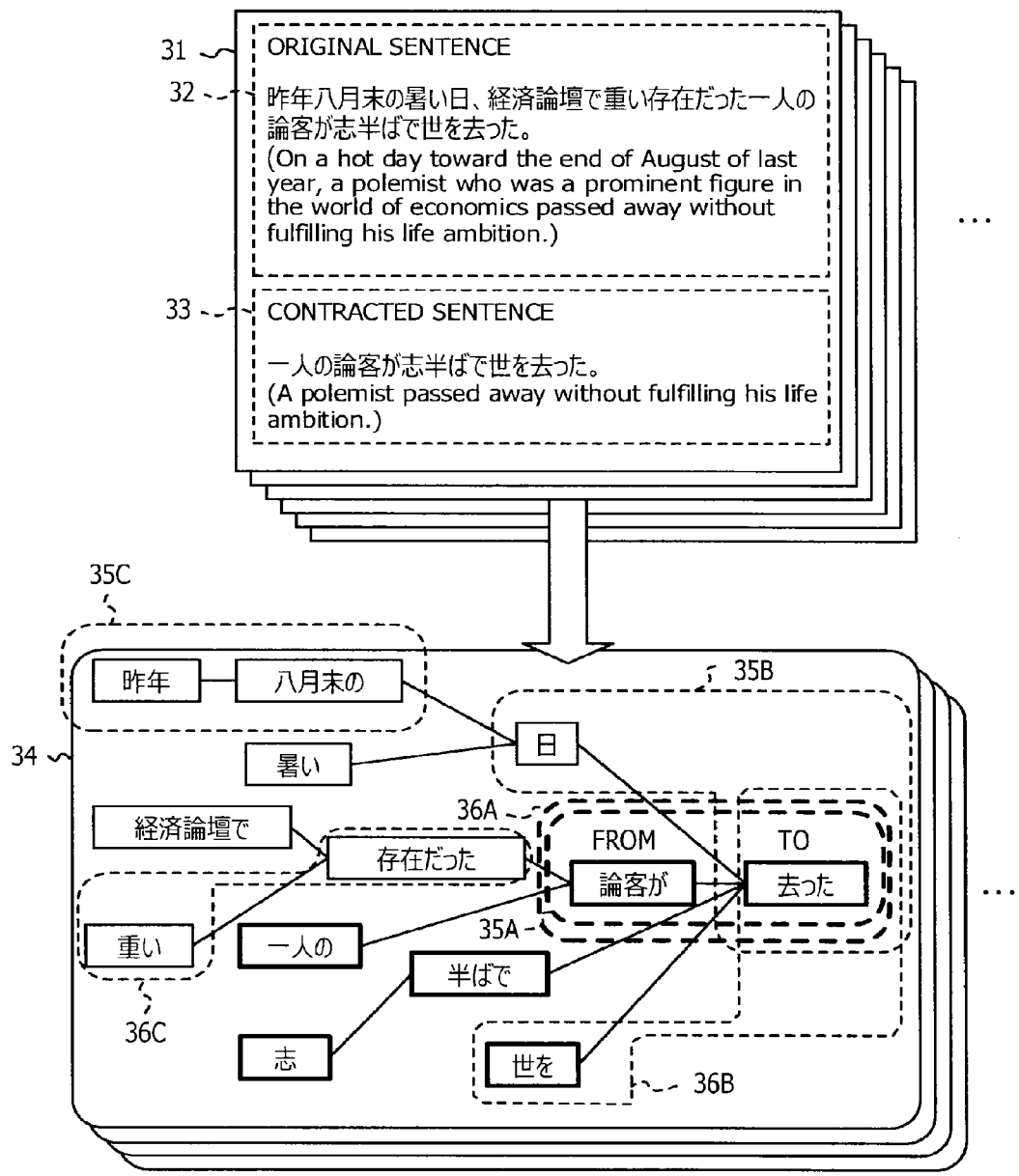
FIG. 28 is a diagram for explaining an example sentence, a tree structure, and a node pair.

FIG. 28 is a diagram for explaining an example sentence, a tree structure and node pairs. As illustrated in FIG. 28, an example sentence 31 is a pair of an original sentence 32 and a contracted sentence 33 obtained by contracting this original sentence 32. This contracted sentence 33 is manually prepared as a natural contracted sentence, for example, without lack of any indispensable case.

The example sentences 31 or the contraction target sentence may be inputted through an input device such as a keyboard connected to the contracted sentence generation apparatus 100, or may be inputted by reading from a storage medium such as a hard disk drive (HDD), a USB memory, or a CD-ROM, or an external storage device connected through a network. Although the present embodiment describes a case in which the example sentences 31 or the contraction target sentence is inputted as text data, the example sentences 31 or the contraction target sentence may be inputted as voice data and converted into text data through voice recognition.

The sentence input unit 11 receives the example sentences 31 inputted to the contracted sentence generation apparatus 100, and passes the example sentences 31 thus inputted to the morphological analysis unit 12. Similarly, when a contraction target sentence is inputted, the sentence input unit 11 passes the inputted contraction target sentence to the morphological analysis unit 12.

The morphological analysis unit 12 breaks down, by referring to a morphological analysis dictionary, an original sentence included in each example sentence 31 into morphemes, to each of which information such as a part-of-speech of the morpheme is tagged. Similarly, when a contraction target sentence is inputted, the morphological analysis unit 12 breaks down the contraction target sentence into morphemes, to each of which information such as a part-of-speech of the morpheme is tagged.

Based on a result of this morphological analysis, the dependency parsing unit 13 analyzes each phrase in the original sentence 32 through processing such as grouping of a noun and a postposition (particle), if input text is Japanese, and analyzes a dependency relation between phrases according to a dependency rule. This allows the original sentence 32 to be represented in a tree structure in which phrases included in the original sentence 32 are connected based on the dependency relation. Similarly, when a contraction target sentence is inputted, the dependency parsing unit 13 analyzes the dependency relation between the phrases based on the result of the morphological analysis.

A method of generating the connection probability table 20 and the occurrence probability table 112 will be described. In FIG. 28, a node represents a phrase included in the original sentence 32 (or the contraction target sentence), and the nodes corresponding to phrases having the dependency relation are connected with a line, thereby representing a tree structure 34.

First, the connection probability table will be described. The connection probability table generation unit 14 is a function unit that functions when more than one example sentence is inputted to the contracted sentence generation apparatus 100, in other words, when the connection probability table 20 is generated. The connection probability table generation unit 14 derives, based on the example sentences 31, a probability that a connection between phrases included in the tree structure 34 representing the original sentence 32 remains in the contracted sentence 33 that corresponds to this original sentence 32, for each attribute of the dependency relation between the phrases. Hereinafter, such a probability is referred to as a connection probability that a connection between phrases included in the tree structure 34 representing the original sentence 32 remains in the contracted sentence 33 corresponding to this original sentence 32. The connection probability is an example of a first index for determining whether the two words connected to each other through a grammatical or conceptual relation, among the words included in a sentence, are left as a pair in the contracted sentence 33, for each characteristic between the two words.

Specifically, the connection probability table generation unit 14 extracts two nodes connected with a line as a node pair 35 from each tree structure 34. The connection probability table generation unit 14 identifies, of the node pair 35, the node corresponding to a modifying phrase in the original sentence 32 as a FROM node, and the node corresponding to a modified phrase in the original sentence 32 as a TO node. For example, in FIG. 28, of a node pair 35A enclosed by a dashed line, the node corresponding to a phrase "論客が (polemist)" is identified as the FROM node, and the node corresponding to a phrase "去った (passed away)" is identified as the TO node. Hereinafter, the node corresponding to a phrase "A" is referred to as a node "A". Individual node pairs are collectively referred to as a "node pair 35" when not distinguished in description, and are referred to with reference numerals to which alphabet letters are appended as in a "node pair 35A", a "node pair 35B", . . . , when distinguished.

The connection probability table generation unit 14 derives, for each node-pair attribute, the connection probability of node pairs 35 having an identical attribute among all node pairs 35 included in the tree structure 34 representing the original sentence 32 of every example sentence 31.

The connection probability for a node-pair attribute is a probability that a node pair having this attribute remains in a contracted sentence without being pruned. The node-pair attribute is a grammatical characteristic of the node pair 35, and is, for example, information such as whether a morpheme of a particular part-of-speech is included in the phrase corresponding to the FROM node or the TO node. Examples of node-pair attributes include "the FROM node includes a particle "が"", "the FROM node does not include the particle "が"", "the TO node includes a verb", and "the TO node does not include a verb". One node pair 35 may have more than one attribute.

The connection probability table generation unit 14 derives the connection probability of node pairs having an attribute i, by Expression (2) below, similarly to the first embodiment, for example.

Connection Probability of Attribute $i$=Number of Node Pairs of Attribute $i$ Remaining in Contracted Sentence/Number of Node Pairs of Attribute $i$ (2)

In Expression (2), "Number of Node Pairs of Attribute i" means the number of node pairs 35 having attribute i among all node pairs 35. "Number of Node Pairs of Attribute i Remaining in Contracted Sentence" means the number of node pairs 35 each having attribute i and including two nodes whose corresponding phrases remain in the contracted sentence 33 obtained by contracting the original sentence 32 including this node pair 35. A higher connection probability is obtained for a larger number of node pairs 35 remaining in the contracted sentence 33, in other words, node pairs 35 whose nodes are not pruned at generation of the contracted sentence 33.

Description will be made of the node pairs 35 remaining in the contracted sentence with reference to FIG. 28. In the tree structure 34 illustrated in FIG. 28, nodes remaining in the contracted sentence are illustrated as nodes with a bold frame. In FIG. 28, both nodes in the node pair 35A (the FROM node "論客が (polemicist)" and the TO node "去った (passed away)") enclosed by a dashed line remain in the contracted sentence. In other words, no pruning is provided between the nodes of the node pair 35A. In other words, pruning is provided between the nodes of the node pair 35A. In contrast, in FIG. 28, of the node pair 35B (the FROM node "日 (day)" and the TO node "去った (passed away)") enclosed by a one-dot dashed line, the TO node remains in the contracted sentence 33, whereas the FROM node does not remain in the contracted sentence. In other words, pruning is provided between the Form node and the TO node. A node pair, both of which are not included in the contracted sentence 33, such as the node pair 35C enclosed by a two-dot dashed line in FIG. 28, is not to be used for the derivation of the connection probability.

The connection probability table generation unit 14 stores in, for example, the connection probability table 20 illustrated in FIG. 29, the connection probability of node pairs for each attribute derived by, for example, Expression (2) using more than one example sentence 31.

FIG. 29 is a diagram illustrating an exemplary connection probability table according to the third embodiment. In the example of FIG. 29, the value of one connection probability for one node-pair attribute is stored as one entry. In the example of FIG. 29, the connection probability is expressed in logarithm. The connection probability table generation unit 14 stores the generated connection probability table 20 in a predetermined storage region.

Next, the occurrence probability table will be described. The occurrence probability table generation unit 111 is a function unit that functions when more than one example sentence is inputted to the contracted sentence generation apparatus 100, in other words, when the occurrence probability table 112 is generated. The occurrence probability table generation unit 111 derives, based on the example sentences 31, a probability that a connection between an inflection node and a case node for the inflection, which is included in the tree structure 34 representing the original sentence 32, remains in the contracted sentence 33 corresponding to this original sentence 32, for each inflection and for each attribute. The occurrence probability is a probability that a connection between an inflection node and a case node for the inflection, which is included in the tree structure 34 representing the original sentence 32, remains in the contracted sentence 33 corresponding to this original sentence 32. In addition, the occurrence probability is an example of a second index, when one of the two words is an inflection and the other is a case for the inflection, for determining whether the two words are left as a pair in the contracted sentence according to the meaning of the inflection. The inflection includes three part-of-speech such as a verb, an adjective, and an adjectival verb in Japanese, and the inflection includes a part-of-speech such as a verb in English.

Specifically, the occurrence probability table generation unit 111 extracts, from the tree structure 34, a node pair, as a node pair 36, having an inflection (any of a verb, adjective, and adjectival verb) as one of the two nodes connected with a line. The occurrence probability table generation unit 111 identifies, of the node pair 36, the node corresponding to a modifying phrase in the original sentence 32 as a FROM node, and the node corresponding to a modified phrase in the original sentence 32 as a TO node.

For example, in FIG. 28, of a node pair 36A (same as the node 35A) enclosed by a dashed line, the node corresponding to a phrase "論客が" is identified as the FROM node, and the node corresponding to a phrase "去った" is identified as the TO node. Individual node pairs are collectively referred to as a "node pair 36" when not distinguished in description, and are referred to with reference numerals to which alphabet letters are appended as in a "node pair 36A", a "node pair 36B", . . . , when distinguished.

The occurrence probability table generation unit 111 derives the occurrence probability for the node pair 36 having identical inflection and attribute from among the node pairs 36 having the inflection as one node, which are included in the tree structure 34 representing the original sentence 32 of every example sentence 31. The occurrence probability for each inflection and for each node-pair attribute is a probability that a node pair having this attribute remains in a contracted sentence without being pruned for certain inflection.

Similarly to the connection probability, the attribute is a grammatical feature included in the node pair 36. For example, in case of the node pair 36A, since the node corresponding to a phrase "論客が" is the FROM node, and the node corresponding to a phrase "去った" is the TO node, the attribute of the node pair 36A is "the case node corresponding to the inflection includes a particle "が"".

The occurrence probability table generation unit 111 derives an occurrence probability of node pairs having an attribute i, by Expression (3) below for each inflection and for each attribute, for example.

Occurrence Probability=Number of Node Pairs of Attribute $i$ Remaining in Contracted Sentence for Certain Inflection/Number of Node Pairs of Attribute $i$ Relating to Certain Inflection  (3)

In Expression (3), "Number of Node Pairs of Attribute i Relating to Certain Inflection" means the number of node pairs 36, among the node pairs 36 having the inflection as one node, in which a specific inflection (for example, "去る (pass away)") and an attribute i are included. "Number of Node Pairs of Attribute i Remaining in Contracted Sentence for Certain Inflection" means the number of node pairs 36 each having a specific inflection (for example, "去る") and an attribute i and including two nodes whose corresponding phrases remain in the contracted sentence 33 obtained by contracting the original sentence 32 including this node pair 36.

A higher occurrence probability of some attribute is obtained for a larger number of node pairs 36 remaining in the contracted sentence 33, in other words, node pairs 36 whose nodes are not pruned at generation of the contracted sentence 33. For example, the occurrence probability for each attribute of each inflection such as a verb "行く(go)", a verb "なる(become)", an adjective "美しい(beautiful)", an adjective "寒い(cold)", or an adjectival verb "きれいだ(beautiful)" is calculated, if it is for Japanese text.

Description will be made of the node pairs 36 remaining in the contracted sentence with reference to FIG. 28. In FIG. 28, both nodes in the node pair 36A (the FROM node "論客が" and the TO node "去った") enclosed by the dashed line remain in the contracted sentence 33. In other words, pruning is provided between the nodes of the node pair 35A. In contrast, in FIG. 28, of the node pair 36B (the FROM node "世を" and the TO node "去った") enclosed by a one-dot dashed line, the node "去った" remains in the contracted sentence 33, whereas the node "世を" does not remain in the contracted sentence 33. In other words, pruning is provided between the node "世を" and the node "去った". A node pair, such as the node pair 36C enclosed by a two-dot dashed line in FIG. 28, both of which are not included in the contracted sentence 33 is not to be used for the derivation of the occurrence probability.

Specifically, the occurrence probability table generation unit 111 counts the total number of the node pairs 36 whose case node for the inflection is an "agent" among the nodes including the verb "去った", for example, in the original sentence 32. The occurrence probability table generation unit 111 further counts the number of the node pairs 36 whose case node for the inflection is an "agent" such as a "論客が" among the node pairs 36 including the verb "去った", for example, in the contracted sentences 33. Then, the occurrence probability table generation unit 111 obtains the occurrence probability of "the case node for the inflection includes a particle "が"" as an attribute for the verb "去った (去る)" by Expression (3) above.

The occurrence probability table generation unit 111 stores in, for example, the occurrence probability table 112 illustrated in FIG. 30, the occurrence probability node pairs for each inflection and for each attribute derived by, for example, Expression (3) using more than one example sentence 31.

There is a case where the example sentence 31 including both the original sentence 32 and the contracted sentence 33 is not sufficiently collected. Specifically, there is a case where a set (an example sentence 31) of the original sentence 32 including various inflections and the contracted sentence 33 is difficult to be collected sufficiently to obtain the occurrence probability for each inflection and for each node-pair attribute. In contrast, since there is often a case where the original sentence 32 exists but the contracted sentence 33 does not exist, the following alternative way to obtain the occurrence probability for each inflection and for each node-pair attribute is found.

In the third embodiment, when there is no contracted sentence 33 but the original sentences 32 are sufficiently collected, the occurrence probability table generation unit 111 may obtain the occurrence probability by Expression (4) in place of Expression (3) above.

Occurrence Probability=Number of Inflections Appearing in Original Sentence Together With Specific Case/Number of Inflections Appearing in Original Sentence　　(4)

The occurrence probability obtained by Expression (4) indicates that "certain inflection is often used along with a certain case (attribute)". This does not unambiguously correspond to the occurrence probability of "the probability that a node pair having the attribute remains in the contracted sentence without being pruned" which is obtained by Expression (3). However, according to the experiments carried out by the inventors, even when sentence examples 31 including both the original sentence 32 and the contracted sentence 33 are not sufficiently collected, the occurrence probability obtained by Expression (4) improves the probability that the contracted sentence thus generated becomes a natural contracted sentence without lack of the indispensable case. Thus, the occurrence probability table generation unit 111 selects either Expression (3) or Expression (4) depending on the state of the collected sentence examples 31, and calculates the occurrence probability substantially corresponding to the probability that "the node pair having the attribute remains in the contracted sentence without being pruned".

FIG. 30 is a diagram illustrating an exemplary occurrence probability table according to the third embodiment. In the example of FIG. 30, the value of one occurrence probability for one node-pair attribute for certain inflection is stored as one entry. In the example of FIG. 30, the occurrence probability is expressed in logarithm. The occurrence probability table generation unit 111 stores the generated occurrence probability table 112 in a predetermined storage region.

The connection probability tagging unit 15, the indispensable connection determination unit 113, the threshold setting unit 16, the contracted sentence generation unit 117, and the contracted sentence output unit 19, which are described below, are function units that function when a contraction target sentence is inputted to the contracted sentence generation apparatus 100, in other words, when a contracted sentence is generated.

The connection probability tagging unit 15 tags, using the connection probability for each node-pair attribute stored in the connection probability table 20, the connection probability between nodes of the tree structure 34 of the contraction target sentence analyzed by the dependency parsing unit 13. Specifically, similarly to the connection probability table generation unit 14, the connection probability tagging unit 15 extracts two nodes connected with a line as the node pair 35 from the tree structure 34 obtained by analyzing the contraction target sentence, and identifies these two nodes as the FROM node and the TO node. Then, the connection probability tagging unit 15 acquires a connection probability for all attributes of the node pair 35 from the connection probability table 20, and tags the products of these probabilities as the connection probability products of this node pair 35.

The indispensable connection determination unit 113 uses the occurrence probability for each inflection and each node-pair attribute for the inflection, which is stored in the occurrence probability table 112, to identify the node pair 36 having the indispensable connection from among the node pairs 36 having the inflection in one node in the tree structure 34 of the contraction target sentence analyzed by the dependency parsing unit 13. When the connection between the node pair 36 is the indispensable connection, it means that the case node for the inflection has an indispensable relation for the inflection node.

Specifically, similarly to the occurrence probability table generation unit 111, the indispensable connection determination unit 113 extracts the node pair 36 having the inflection in one node out of the two nodes connected with a line as the node pair 35 from the tree structure 34 obtained by analyzing the contraction target sentence. Then, the indispensable connection determination unit 113 identifies records which correspond to the inflections included in the node pair 36 and have an identical attribute, from the occurrence probability table 112. When the occurrence probability of the identified record is equal to or larger than a predetermined threshold, the node pair 36 is determined as the indispensable connection.

For example, when the node pair 36 includes a verb "取る (take)" and the case node for the inflection includes a particle "が", the occurrence probability "−0.17" corresponding to the attribute for the verb "取る" of that "the case node for the inflection includes a particle "が"" is obtained from the occurrence probability table 112. When the predetermined threshold is "−0.2" for example, the occurrence probability "−0.17" is larger than the predetermined threshold, thus the connection in the node pair 36 is determined as the indispensable connection.

The threshold setting unit 16 sets, to the contracted sentence generation unit 117, a threshold of the connection probability product, which is inputted through an input device or stored in advance in a predetermined storage region. Furthermore, a predetermined threshold for determining the indispensable connection is set to the indispensable connection determination unit 113. For example, the threshold is inputted by an administrator.

In the tree structure 34 of the contraction target sentence, the contracted sentence generation unit 117 follows, from a root node, nodes having the connection probability products equal to or larger than the threshold set by the threshold setting unit 16 and nodes determined as the indispensable connection, and extracts nodes on a path followed without a stop. The root node in the tree structure representing a dependency structure is the node corresponding to a phrase having no dependency target in the contraction target sentence. The contracted sentence generation unit 117 arranges the phrases corresponding to extracted nodes in an order of appearance in the contraction target sentence to generate a contracted sentence.

The contracted sentence output unit 19 outputs the contracted sentence generated by the contracted sentence generation unit 117, by displaying it on a display apparatus, storing it on the storage medium, and printing it by a printer, for example. Furthermore, when a sentence including contraction target sentences is inputted, the contracted sentence output unit 19 may output the contraction target sentences in combination with the contracted sentences respectively corresponding thereto.

Figure 31:
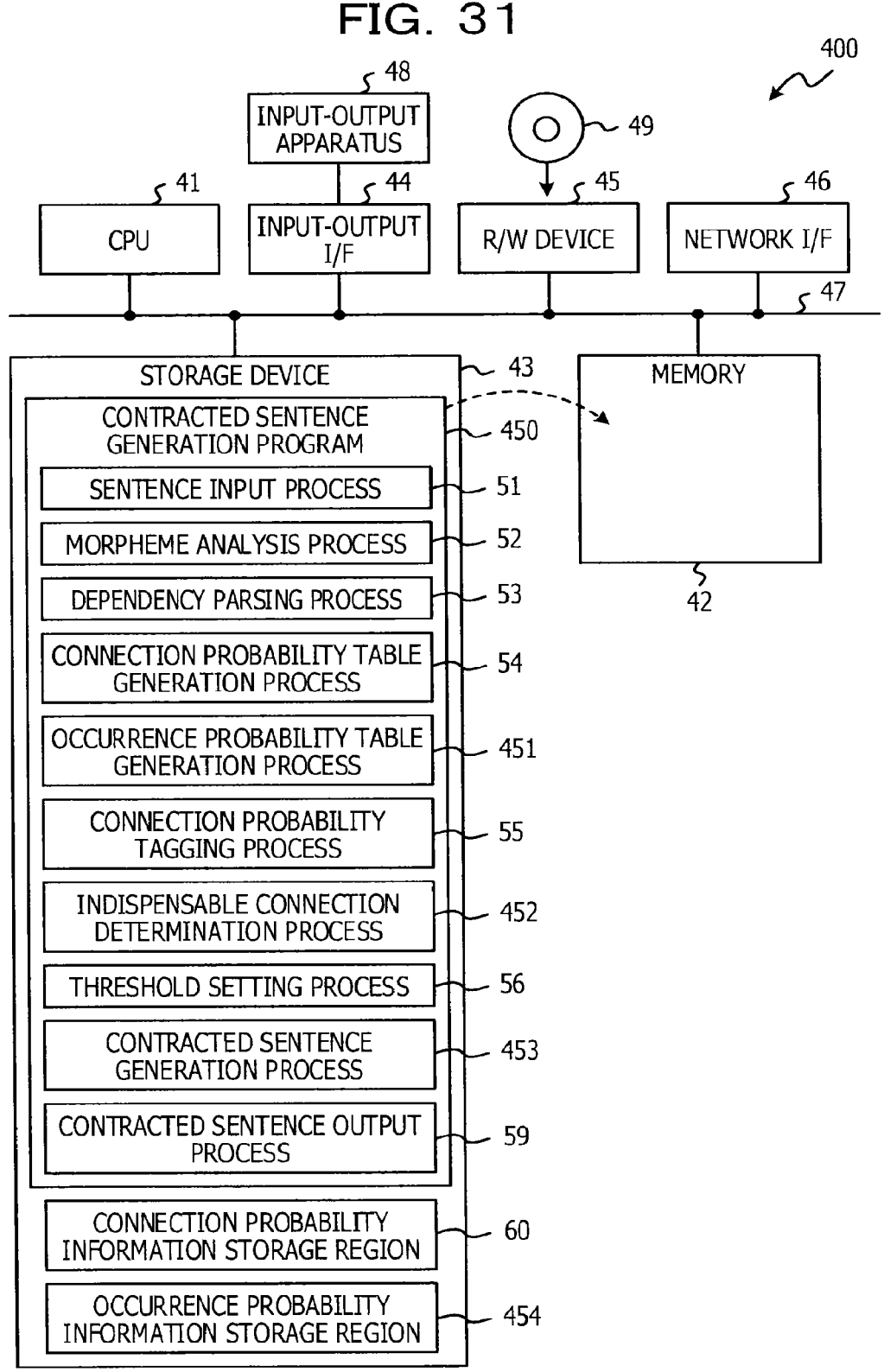
FIG. 31 is a block diagram schematically illustrating the configuration of a computer serving as the contracted sentence generation apparatus according to the third embodiment.

FIG. 31 is a block diagram schematically illustrating the configuration of a computer serving as the contracted sentence generation apparatus according to the third embodiment. The contracted sentence generation apparatus 100 may be, for example, a computer 400 illustrated in FIG. 31. The computer 400 includes a CPU 41, a memory 42 as a temporary storage region, and a non-volatile storage device 43. The computer 400 further includes an input-output interface (I/F) 44 to which an input-output apparatus 48 such as the display apparatus or the input device is connected. The computer 400 further includes a read/write (R/W) device 45 that controls reading and writing of data on a recording medium 49, and a network I/F 46 connected to a network such as the Internet. The CPU 41, the memory 42, the storage device 43, the input-output I/F 44, the R/W device 45, and the network I/F 46 are connected to each other through a bus 47.

The storage device 43 may be a hard disk drive (HDD), a solid state drive (SSD), or a flash memory, for example. The storage device 43 as a storage medium stores a contracted sentence generation program 450 that causes the computer 400 to function as the contracted sentence generation apparatus 100. The storage device 43 includes a connection probability information storage region 60 in which information included in the connection probability table 20 is stored and an occurrence probability information storage region 454 in which information included in the occurrence probability table 112 is stored.

The CPU 41 reads out the contracted sentence generation program 450 from the storage device 43, loads the contracted sentence generation program 450 into the memory 42, and sequentially executes processes included in the contracted sentence generation program 450. The CPU 41 reads out the information from the connection probability information storage region 60 and the occurrence probability information storage region 454 to load the connection probability table 20 and the occurrence probability table 112 into the memory 42.

The contracted sentence generation program 450 includes a sentence input process 51, a morphological analysis process 52, a dependency parsing process 53, a connection probability table generation process 54, an occurrence probability table generation process 451, a connection probability tagging process 55, an indispensable connection determination process 452, and a threshold setting process 56. The contracted sentence generation program 450 further includes a contracted sentence generation process 453 and a contracted sentence output process 59.

The CPU 41 executes the sentence input process 51 to serve as the sentence input unit 11 illustrated in FIG. 27. The CPU 41 executes the morphological analysis process 52 to serve as the morphological analysis unit 12 illustrated in FIG. 27. The CPU 41 executes the dependency parsing process 53 to serve as the dependency parsing unit 13 illustrated in FIG. 27. The CPU 41 executes the connection probability table generation process 54 to serve as the connection probability table generation unit 14 illustrated in FIG. 27.

The CPU 41 executes the occurrence probability table generation process 541 to serve as the occurrence probability table generation unit 111 illustrated in FIG. 27. The CPU 41 executes the connection probability tagging process 55 to serve as the connection probability tagging unit 15 illustrated in FIG. 27. The CPU 41 executes the indispensable connection determination process 452 to serve as the indispensable connection determination unit 113 illustrated in FIG. 27. The CPU 41 executes the threshold setting process 56 to serve as the threshold setting unit 16 illustrated in FIG. 27. The CPU 41 executes the contracted sentence generation process 453 to serve as the contracted sentence generation unit 117 illustrated in FIG. 27. The CPU 41 executes the contracted sentence output process 59 to serve as the contracted sentence output unit 19 illustrated in FIG. 27. In this manner, the computer 400 executes the contracted sentence generation program 450 to serve as the contracted sentence generation apparatus 100.

The CPU 41 is an exemplary processor as hardware. Then, the functions achieved by the contracted sentence generation program 450 are achieved by a processor as hardware such as CPU or MPU. Functions achieved by the contracted sentence generation program 450 may be achieved by, for example, a semiconductor integrated circuit, or more specifically, an application specific integrated circuit (ASIC).

Figure 32:
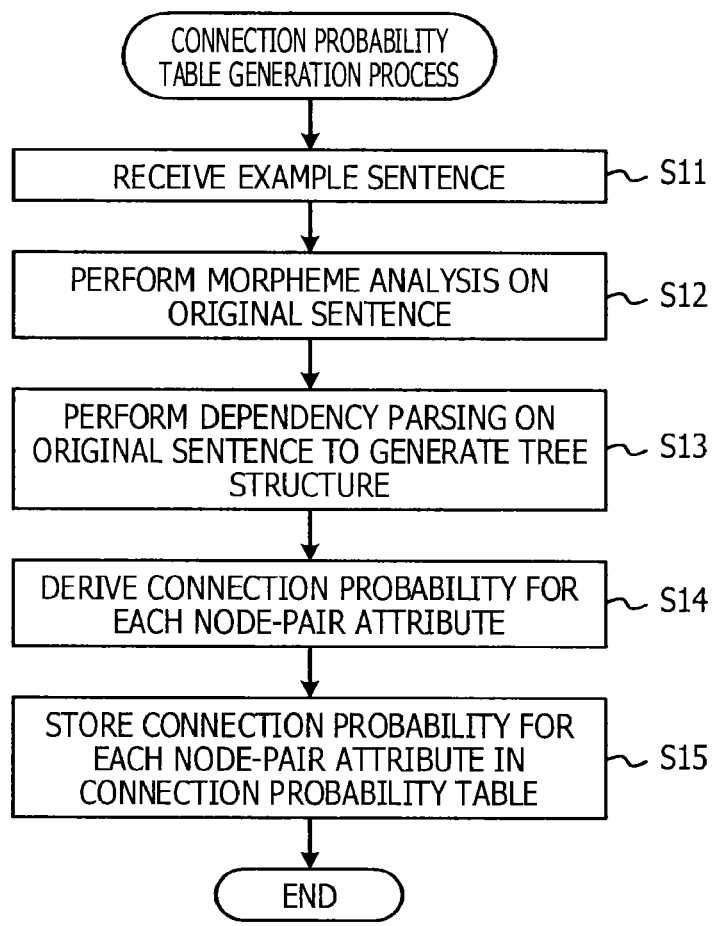
FIG. 32 is a flowchart of an exemplary connection probability table generation process.
Figure 33:
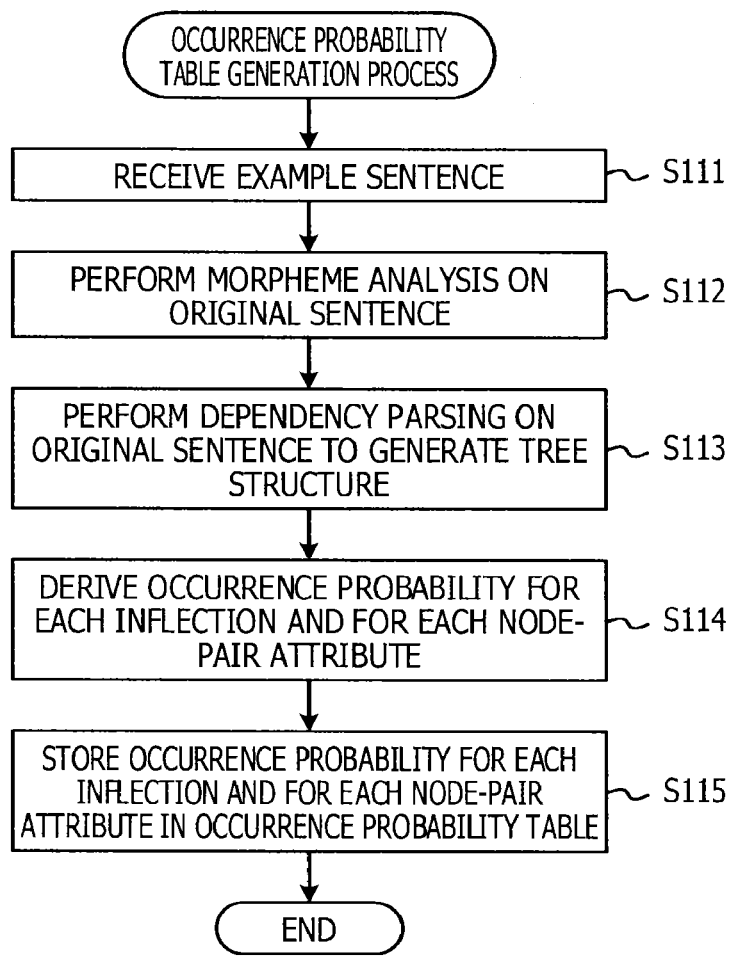
FIG. 33 is a flowchart of an exemplary occurrence probability table generation process.
Figure 34A:
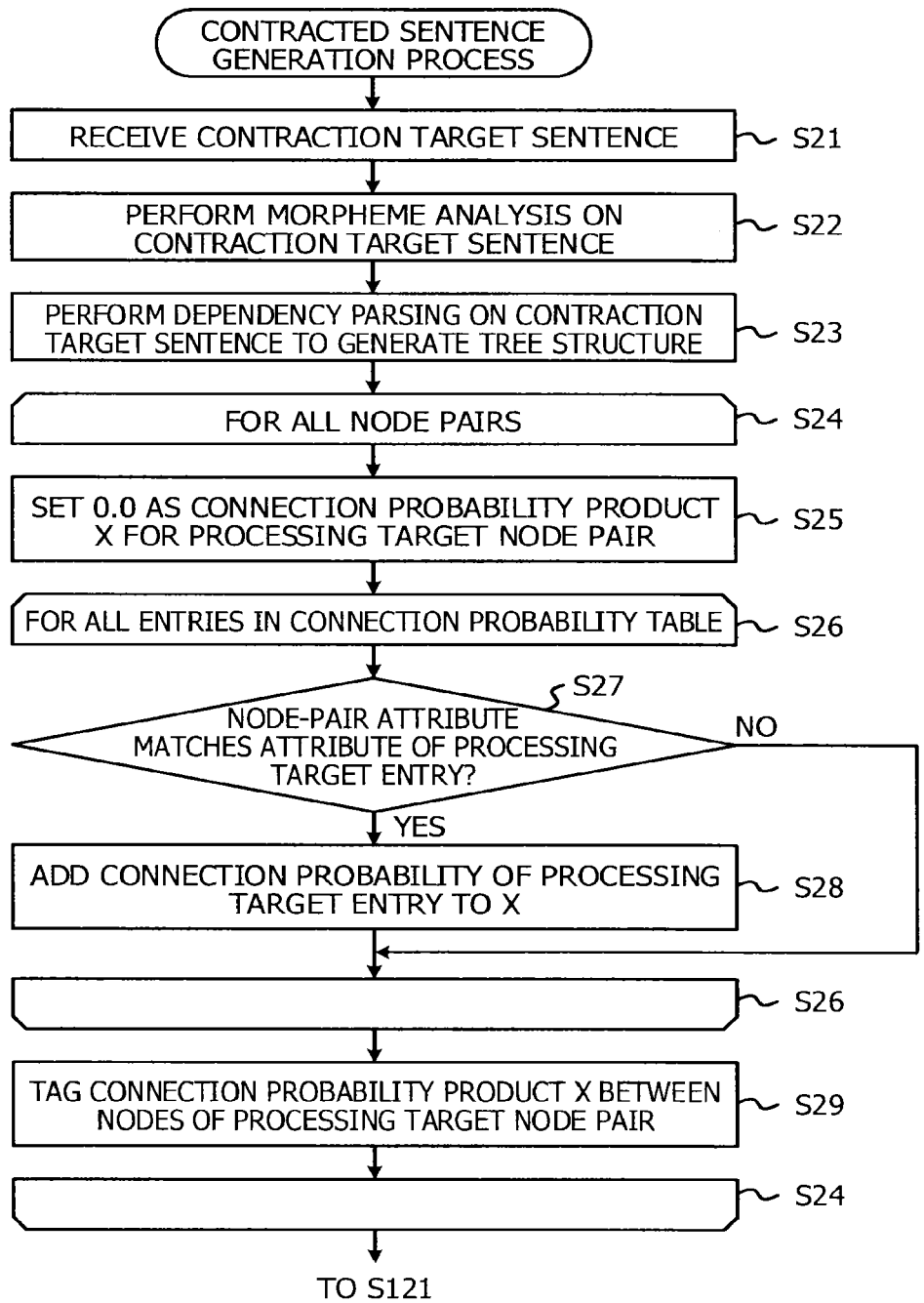
FIG. 34A is a flowchart of an exemplary contracted sentence generation process according to the third embodiment.
Figure 34B:
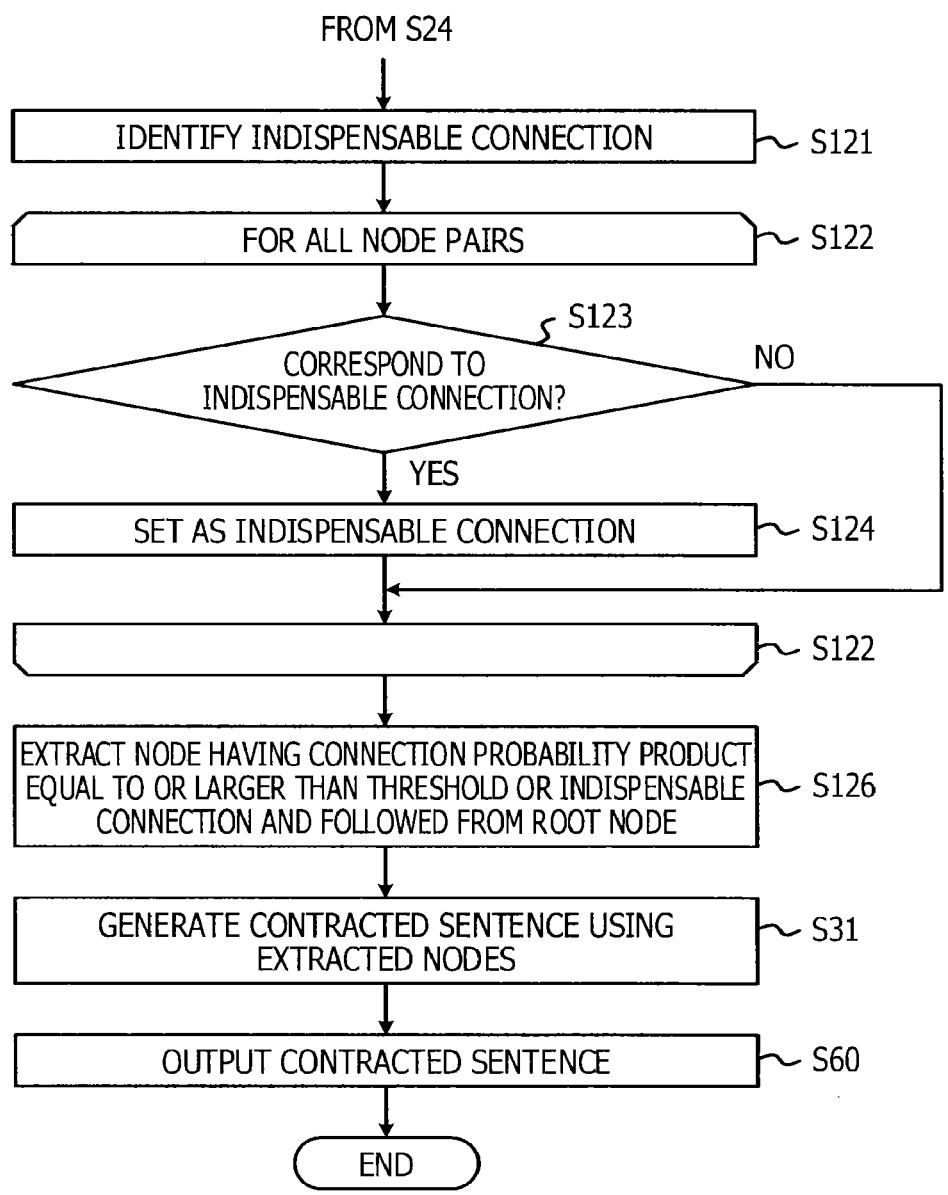
FIG. 34B is a flowchart of an exemplary contracted sentence generation process according to the third embodiment.

Next, an effect of the contracted sentence generation apparatus 100 according to the third embodiment will be described. When more than one example sentence 31 is inputted to the contracted sentence generation apparatus 100 at generation of the connection probability table 20, the connection probability table generation process illustrated in FIG. 32 and the occurrence probability table generation process illustrated in FIG. 33 are executed. When the contraction target sentence is inputted to the contracted sentence generation apparatus 100 at generation of a contracted sentence, the contracted sentence generation process illustrated in FIGS. 34A and 34B are executed. The contracted sentence generation process executed by the contracted sentence generation apparatus 100 is an exemplary contracted sentence generating method according to the disclosed technique. The processes will be described below.

First, the connection probability table generation process will be described. FIG. 32 is a flowchart of an exemplary connection probability table generation process.

At step S11 in the connection probability table generation process illustrated in FIG. 32, the sentence input unit 11 receives more than one input example sentence 31. Next at step S12, the morphological analysis unit 12 performs the morphological analysis on the original sentence 32 included in each example sentence 31. Next at step S13, the dependency parsing unit 13 performs the dependency parsing on each original sentence 32 based on a result of this morphological analysis so as to generate a tree structure 34 representing the dependency relation between phrases in each original sentence 32, as illustrated in FIG. 28.

Next at step S14, the connection probability table generation unit 14 extracts all node pairs 35 from the tree structure 34 of each original sentence 32, and identifies the FROM node and the TO node of each node pair. Then, the connection probability table generation unit 14 derives the connection probability for each node-pair attribute by, for example, Expression (2) above based on an attribute of each node pair 35 and on whether this node pair 35 remains in a contracted sentence or are pruned at contraction.

Next at step S15, the connection probability table generation unit 14 stores the connection probability for each node-pair attribute derived at step S14 above in, for example, the connection probability table 20 as illustrated in FIG. 3, and in a predetermined storage region, which ends the connection probability table generation process.

Next, the occurrence probability table generation process will be described. FIG. 33 is a flowchart of an exemplary occurrence probability table generation process.

At step S111 in the connection probability table generation process illustrated in FIG. 33, the sentence input unit 11 receives more than one input example sentence 31. Next at step S112, the morphological analysis unit 12 performs the morphological analysis on the original sentence 32 included in each example sentence 31. Next at step S113, the dependency parsing unit 13 performs the dependency parsing on each original sentence 32 based on a result of this morphological analysis so as to generate a tree structure 34 representing the dependency relation between phrases in each original sentence 32, as illustrated in FIG. 28. When the occurrence probability table generation process and the connection probability table generation process are simultaneously executed, steps S111 to S113 are integrated into steps S11 to S33.

Next at step S114, the occurrence probability table generation unit 111 extracts all node pairs 35 from the tree structure 34 of each original sentence 32, and identifies the node pair 36 having the inflection in one node.

Then, the occurrence probability table generation unit 111 derives the occurrence probability for each inflection and for each node-pair attribute, for example, by Expression (3) or Expression (4) above, for each inflection included in the node pair 36 and node-pair attribute.

Next at step S115, the occurrence probability table generation unit 111 stores the occurrence probability of the node pair for each inflection and each attribute, which are derived at step S114 above in, for example, the occurrence probability table 112 as illustrated in FIG. 30, and in a predetermined storage region, which ends the occurrence probability table generation process.

Next, the contracted sentence generation process will be described. FIGS. 34A and 34B are each a flowchart of an exemplary contracted sentence generation process according to the third embodiment.

At step S21 in the contracted sentence generation process, the sentence input unit 11 receives the contraction target sentence inputted to the contracted sentence generation apparatus 100.

Next at step S22, the morphological analysis unit 12 performs the morphological analysis on the contraction target sentence. At step S23, the dependency parsing unit 13 performs the dependency parsing on the contraction target sentence based on a result of this morphological analysis to generate the tree structure 34 representing the dependency relation between phrases in the contraction target sentence.

Next, in the loop processing at step S24, the connection probability tagging unit 15 sets each node pair included in the tree structure 34 generated at step S23 above as a processing target, and executes processing at step S25, loop processing at step S26, and processing at step S29.

At step S25, the connection probability tagging unit 15 sets "0.0" as the initial value of a variable x representing the connection probability product of the processing target node pair 35.

Next, in the loop processing at step S26, the connection probability tagging unit 15 sets each entry included in the connection probability table 20 as a processing target and executes processing at steps S27 and S28 below.

At step S27, the connection probability tagging unit 15 identifies the FROM node and the TO node based on the order of appearance, in the contraction target sentence, of the phrase corresponding to each node included in the processing target node pair 35. Then, the connection probability tagging unit 15 determines whether an attribute of the processing target node pair 35 matches the attribute of the processing target entry. The flow proceeds to step S28 if the attributes match, or skips processing at step S28 if the attributes do not match. For example, the node-pair attribute of the processing target entry is "the FROM node includes a particle "が"". In this example, when the FROM node of the processing target node pair 35 includes the particle "が", it is determined that the attributes match, and then the flow proceeds to step S28.

At step S28, the connection probability of the processing target entry is added to the variable x. In this example, the connection probability "−0.12" of the processing target entry is added to an initial value of "0.0" to yield the variable x of "−0.12". In the present embodiment, the connection probability of the entry having the matching node-pair attribute is added to the variable x since the connection probability is converted to a logarithm, but the connection probability of the matching node-pair attribute entry is multiplied by the variable x when the connection probability is used as an antilogarithm.

When the loop processing at step S26 is completed for all entries included in the connection probability table 20, the flow proceeds to step S29. At this stage, the connection probability product x is obtained as the product (addition in logarithm) of the connection probabilities for node-pair attributes of the processing target node pair 35. At step S29, the connection probability tagging unit 15 tags variable x as the connection probability product of two nodes included in the processing target node pair 35.

When the loop processing at step S24 ends for all the node pairs, the dispensable connection determination unit 113 identifies the indispensable connection at step S121. The indispensable connection determination unit 113 identifies an entry with an occurrence probability larger than the threshold for determining the indispensable connection among the entries included in the occurrence probability table 112. The threshold is inputted by the threshold setting unit 16.

However, the processing at step S121 may be performed prior to the contracted sentence generation process. In other words, when the threshold is fixed, the indispensable connection determination unit 113 tags in advance a flag indicating the indispensable connection to the entry with the occurrence probability equal to or larger than the threshold. When the indispensable connection is identified, processing at step S121 is omitted in the contracted sentence generation process.

Next, in the loop processing at step S122, each node pair 35 included in the tree structure 34 generated at step S23 above is set as a processing target, and the processing at step S123 and the processing at step S124 are executed.

At step S123, the dispensable connection determination unit 113 determines whether or not the processing target node pair 35 is the indispensable connection. In other words, the indispensable connection determination unit 113 determines whether the node pair 35 is the node pair 36 including an inflection node and the combination of the inflection and the attribute in the node pair 36 is identified as the indispensable connection at step S121.

When the node pair 35 is determined as the node pair 36 including the inflection node and the attribute combination of the inflection node and the case node for the inflection is identified as the indispensable connection at step S121, a positive determination is made at step S123 and the indispensable connection determination unit 113 sets the node pair 36 as the indispensable connection at step S124. In contrast, when a negative determination is made at step S123, step S124 is skipped.

When the loop processing at step S122 is completed for all the node pairs, the flow proceeds to step S126. In this stage, among the node pairs 35 included in the tree structure 34, the information indicating that the node pair is connected by the indispensable connection is tagged for the node pair which is the node pair 36 including the inflection and whose combination of the attributes of the inflection node and the case node for the inflection in the node pair 36 is identified as the indispensable connection at step S121.

Next at step S126, the threshold setting unit 16 sets the threshold of the connection probability product. Then, in the tree structure 34 of the contraction target sentence, the contracted sentence generation unit 117 follows, from a root node, nodes connected by the connection probability products equal to or larger than the threshold thus set or the nodes connected by the indispensable connection, and extracts nodes on a path followed without a stop.

Next at step S31, the contracted sentence generation unit 117 arranges the phrases corresponding to the nodes extracted at step S126 above in the order of appearance in the contraction target sentence so as to generate a contracted sentence.

Next at step S60, the contracted sentence output unit 19 outputs the contracted sentence generated at step S31 above, which ends the contracted sentence generation process.

As described above, the contracted sentence generation apparatus 100 according to the third embodiment allows the dependency relation between phrases included in the contraction target sentence to be represented by a tree structure connecting the nodes corresponding to the respective phrases. Then, the contracted sentence generation apparatus 100 tags, between two connected nodes, the connection probability as the probability that the nodes remain in a contracted sentence with no pruning provided between the nodes at generation of the contracted sentence. Furthermore, when one node of the connected two nodes is an inflection node, it is determined that the connection between the two nodes is the indispensable connection according to the attributes of the inflection node and the case node for the inflection, for each inflection. In other words, it is determined that the other node is the indispensable case for the inflection.

Then, the contracted sentence generation apparatus 100 generates a contracted sentence based on nodes extracted by following, from a root node, nodes having connection probabilities equal to or larger than the threshold or the indispensable connection. In this manner, whether to provide pruning between nodes is determined in accordance with the connection probability between the corresponding phrases based on the dependency relation, thereby reducing any pruning that otherwise would result in, for example, lack of an indispensable case, and thus generating a natural contracted sentence.

Fourth Embodiment

Next, a fourth embodiment of the disclosed technique will be described. An identical reference numeral is given to any component of a contracted sentence generation apparatus according to the fourth embodiment, which is the same as that of the contracted sentence generation apparatus 100 according to the third embodiment, and a detailed description thereof will be omitted.

Figure 35:
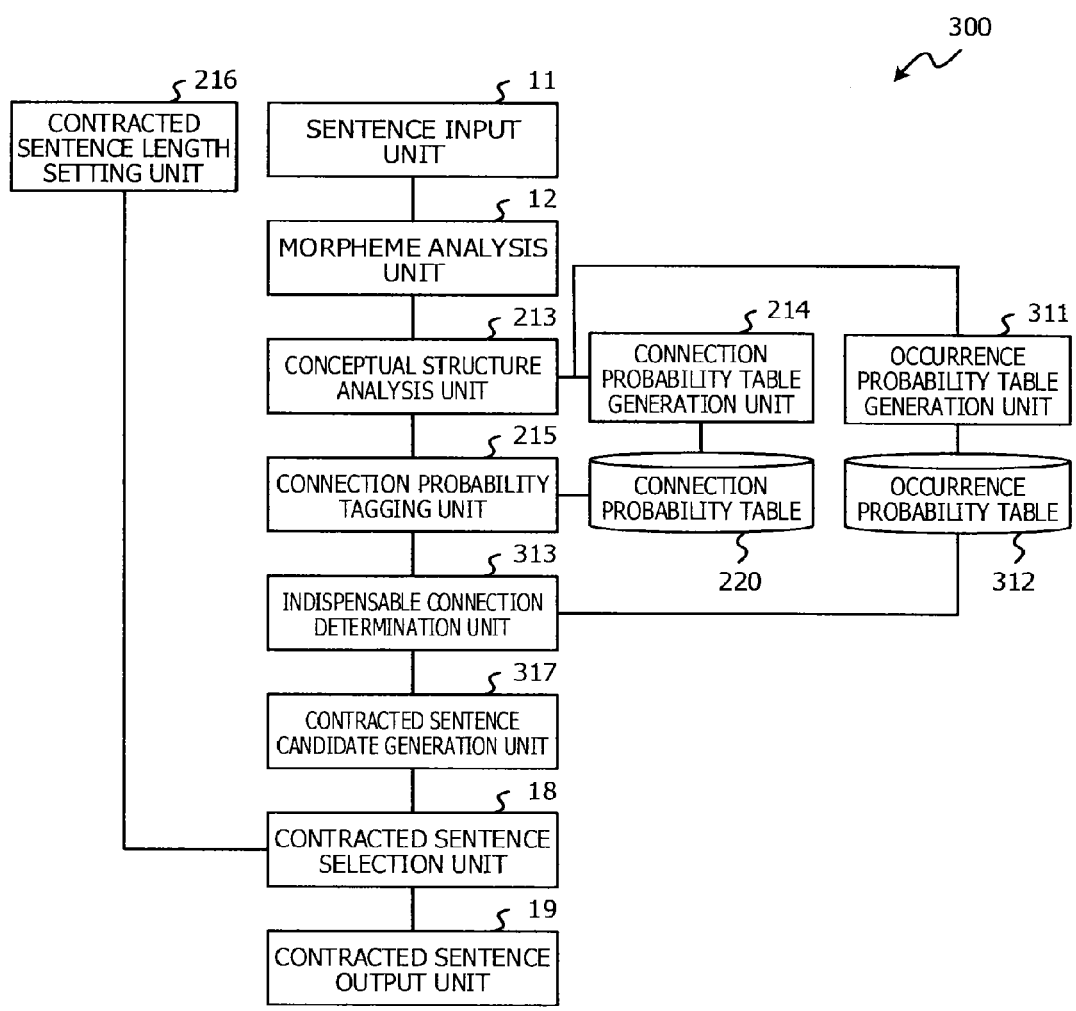
FIG. 35 is a functional block diagram schematically illustrating the configuration of a contracted sentence generation apparatus according to a fourth embodiment.

FIG. 35 is a functional block diagram schematically illustrating the configuration of a contracted sentence generation apparatus according to a fourth embodiment. As illustrated in FIG. 35, a contracted sentence generation apparatus 300 according to the fourth embodiment includes a sentence input unit 11, a morphological analysis unit 12, a conceptual structure analysis unit 213, a connection probability table generation unit 214, a connection probability tagging unit 215, and a contracted sentence length setting unit 216. The contracted sentence generation apparatus 300 further includes a contracted sentence selection unit 18 and the contracted sentence output unit 19. In addition, the contracted sentence generation apparatus 300 includes an occurrence probability table generation unit 311, an indispensable connection determination unit 313, and a contracted sentence candidate generation unit 317.

The contracted sentence generation apparatus 300 stores a connection probability table 220 and an occurrence probability table 312. The contracted sentence candidate generation unit 317 is an exemplary generation unit according to the disclosed technique. The connection probability table 220 is exemplary information stored in a first storage device. Similarly, the occurrence probability table 312 is exemplary information stored in a second storage device.

The conceptual structure analysis unit 213 analyzes each phrase in the original sentence 32 or the contraction target sentence based on a result of the morphological analysis by the morphological analysis unit 12, identifies a semantic relation between phrases by referring to a lexis conceptual structure dictionary, and analyzes a conceptual structure of the original sentence 32 or the contraction target sentence. This allows the original sentence 32 or the contraction target sentence to be represented by a tree structure connecting phrases included in the original sentence 32 or the contraction target sentence based on the conceptual structure.

Figure 36:
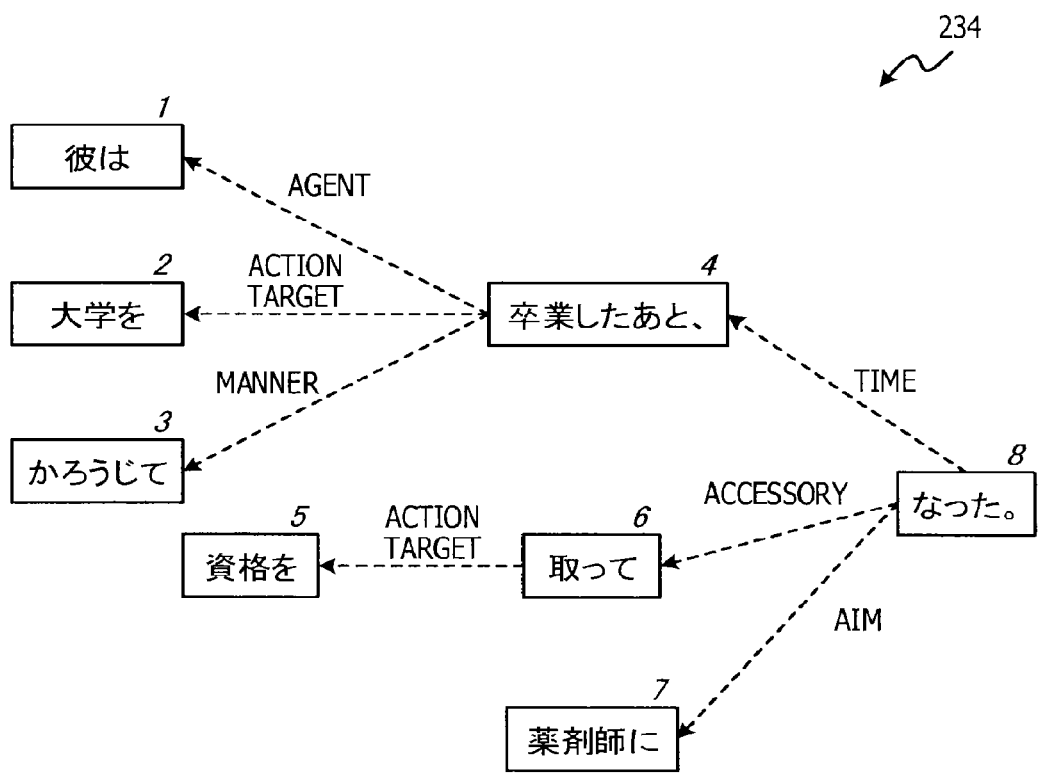
FIG. 36 is a diagram illustrating an exemplary tree structure by a conceptual structure analysis.

FIG. 36 is a diagram illustrating an exemplary tree structure obtained by analyzing the conceptual structure of the original sentence 32. FIG. 36 is a diagram illustrating an exemplary tree structure obtained by a conceptual structure analysis. FIG. 36 illustrates an example of the tree structure 234 of "彼は大学をかろうじて卒業したあと、資格を取って薬剤師になった。(He took a license and became a pharmacist after having managed to graduate the university.)".

As illustrated in FIG. 36, a node represents a phrase included in the original sentence (or the contraction target sentence), and an arrow connects the nodes corresponding to phrases having a semantic relation, thereby representing a tree structure 234. In addition, a relation type indicating the type of a relation between the nodes connected by the arrow is tagged between the nodes thus connected. In the example in FIG. 36, the relation type between the node "彼は (He)" and the node "卒業したあと、(after graduation)" is indicated as an "agent".

The relation type when one node is an inflection (a verb, adjective, and adjective verb) may be expressed as a predicate case in particular. The direction of the arrow between nodes represents the relation between the nodes, and the arrow in this example indicates that the node "彼は" at the end point of the arrow is the "agent" of the node "卒業したあと、" at the start point of the arrow.

Similarly to the connection probability table generation unit 14 according to the third embodiment, the connection probability table generation unit 214 derives the connection probability for each node-pair attribute. In the following, any difference from the connection probability table generation unit 14 according to the third embodiment will be described.

The connection probability table generation unit 214 according to the fourth embodiment additionally uses the relation type between nodes in the conceptual structure as a node-pair attribute to generate the connection probability table 220. The connection probability table generation unit 214 identifies, of the node pair 35 of two nodes connected by an arrow, the node at the start point of the arrow as the FROM node, and the node at the end point of the arrow as the TO node.

Figure 37:
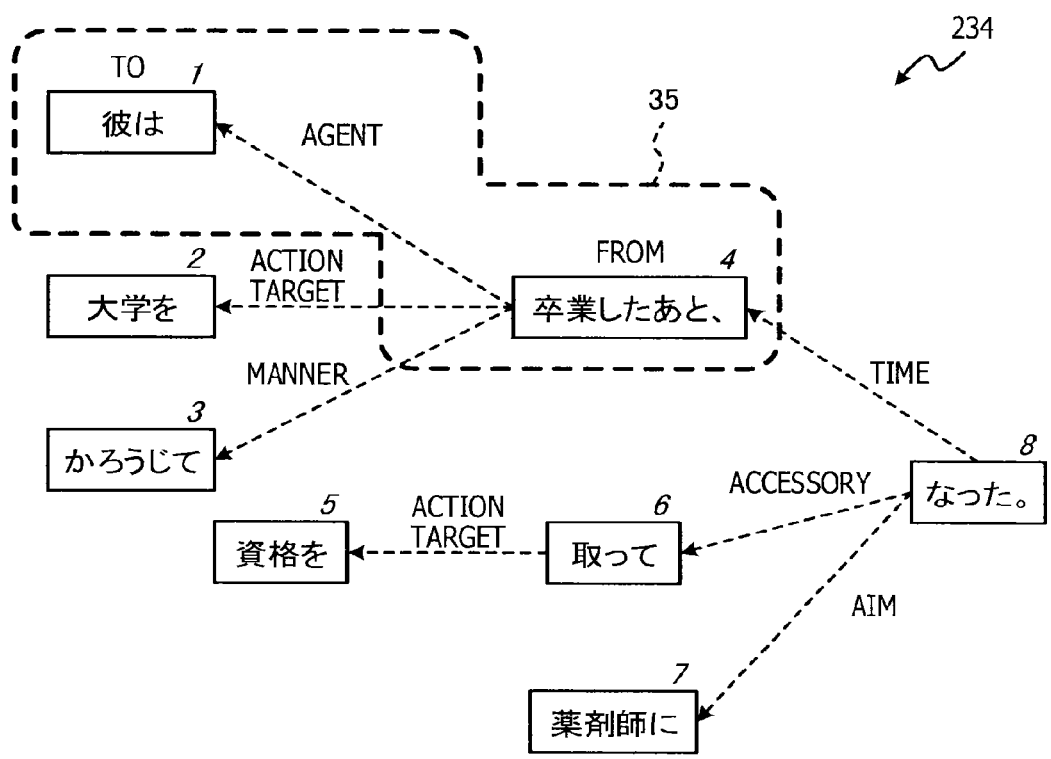
FIG. 37 is a diagram (No. 1) for explaining setting of node pairs.

FIG. 37 is a diagram for explaining setting of a node pair. For example, of a node pair 35 enclosed by a dashed line in FIG. 37, the node "卒業 したあと" is identified as the FROM node, and the node "彼は" is identified as the TO node.

FIG. 38 illustrates an exemplary connection probability table according to the fourth embodiment. The same method as that of the third embodiment is applied to derive the connection probability for each node-pair attribute.

Similarly to the occurrence probability table generation unit 111 according to the third embodiment, the occurrence probability table generation unit 311 derives the connection probability for each inflection and for each node-pair attribute. In the following, any difference from the occurrence probability table generation unit 111 according to the third embodiment will be described.

Figure 39:
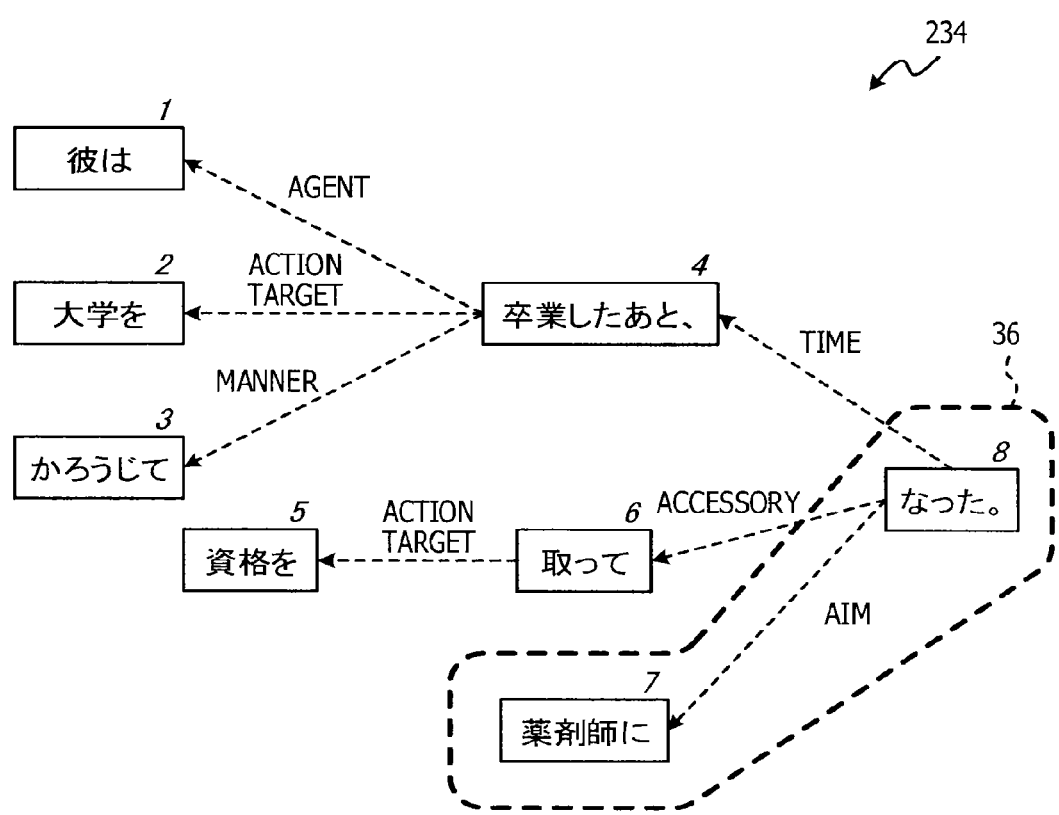
FIG. 39 is a diagram (No. 2) for explaining setting of node pairs.

The occurrence probability table generation unit 311 according to the fourth embodiment uses the relation type between nodes in the conceptual structure as a node-pair attribute to generate the occurrence probability table 312. Specifically, the occurrence probability table generation unit 311 identifies, from among the node pairs 35 including the two nodes connected by the arrow, the node pair 36 including an inflection in one node. FIG. 39 is a diagram for explaining setting of a node pair. In FIG. 39, for example, the node pair 36 including an inflection "なった (became)" in one node is identified.

FIG. 40 is an exemplary occurrence probability table according to the fourth embodiment. The occurrence probability table 312 manages the occurrence probability according to the relation type (attribute) for each inflection. In other words, the occurrence probability according to the predicate case is managed. The same method as that of the third embodiment is applied to derive the occurrence probability for each inflection and for each node-pair attribute.

The connection probability tagging unit 215 tags, using the connection probability for each node-pair attribute stored in the connection probability table 220, the connection probability product between nodes in the tree structure 234 of the contraction target sentence analyzed by the conceptual structure analysis unit 213. The connection probability tagging unit 215 differs from the connection probability tagging unit 15 of the third embodiment in that the FROM node and the TO node are each identified based on which of the start point and end point of the arrow of the arrow of the node pair 35, and the connection probability in accordance with the relation type between the nodes is reflected on the connection probability product tagged between the nodes. Other aspects of the connection probability tagging unit 215 are the same as those of the connection probability tagging unit 15 according to the third embodiment.

The indispensable connection determination unit 313 uses the occurrence probability for each inflection and each node-pair attribute for the inflection, which is stored in the occurrence probability table 312, to identify the node pair 36 having the indispensable connection from among the node pairs 36 having the inflection in one node in the tree structure 234 of the contraction target sentence analyzed by the conceptual structure analysis unit 213. The method of identifying the indispensable connection is same as that of the indispensable connection determination unit 313 according to the third embodiment.

The contracted sentence length setting unit 216 sets, to the contracted sentence selection unit 18, a contracted sentence length inputted through the input device or a desired contracted sentence length stored in advance in a predetermined storage region. The contracted sentence length is the length of a contracted sentence to be outputted and may be set as the number of characters, bytes, words, or phrases of the contracted sentence. The ratio (contraction ratio) of the length of the contracted sentence to the length of the contraction target sentence may be set in place of the contracted sentence length.

The contracted sentence candidate generation unit 317 sets different first thresholds and generates a contracted sentence candidate for each first threshold thus set. The contracted sentence candidate generation unit 317 follows, during sequentially changing the first threshold, the nodes having the connection probability products equal to or larger than the first threshold or the nodes determined as the indispensable connection, and extracts the nodes on a path followed without a stop, thereby generating a contracted sentence candidate for each first threshold. The contracted sentence candidate is generated while the first threshold is sequentially changed, so that contracted sentence candidates with various lengths are generated as described below. In the present embodiment, the threshold used for generating the contracted sentence candidates is referred to as the first threshold and the threshold used for determining the indispensable connection is referred to as the second threshold.

The different first thresholds may be each, for example, the connection probability product tagged to the node pair 35 included in the tree structure 234 of the contraction target sentence. In this case, the contracted sentence candidate generation unit 317 sorts the connection probability products tagged to the node pairs 35 in descending order and sequentially sets the connection probability product having a larger value to be the threshold so as to generate the contracted sentence candidate in accordance with the threshold.

A root node for extracting nodes to be included in the contracted sentence candidate is a node not placed at the end point of any arrow in the tree structure 234. The contracted sentence candidate generation unit 317 stores each contracted sentence candidate thus generated and the contracted sentence length of the contracted sentence candidate in a buffer.

The contracted sentence selection unit 18 selects, from among the contracted sentence candidates stored in the buffer, the contracted sentence candidate having the largest contracted sentence length within the contracted sentence length set by the contracted sentence length setting unit 216. The contracted sentence selection unit 18 passes the contracted sentence candidate thus selected to the contracted sentence output unit 19 as a contracted sentence to be outputted.

Figure 41:
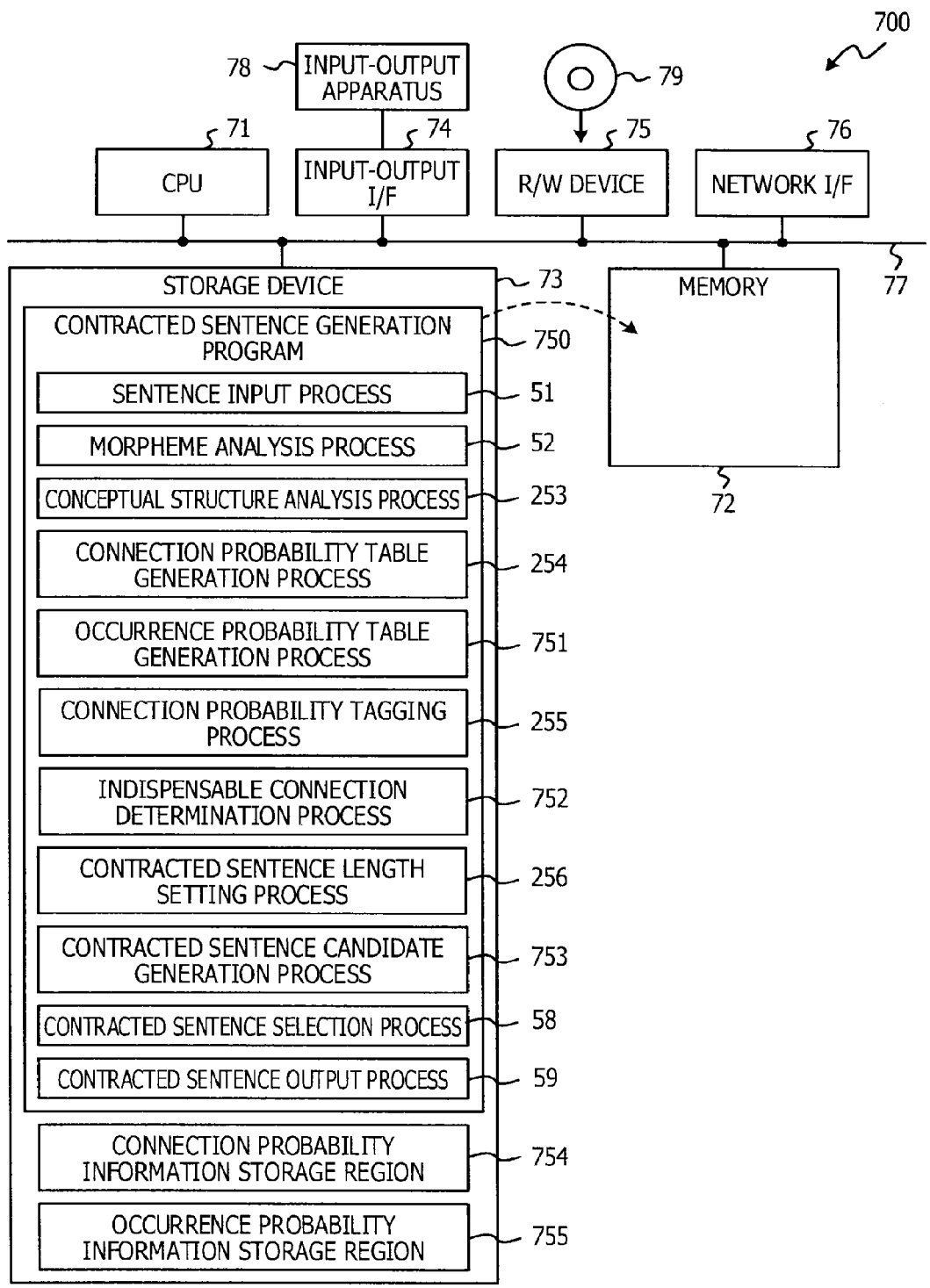
FIG. 41 is a block diagram schematically illustrating the configuration of a computer serving as the contracted sentence generation apparatus according to the fourth embodiment.

The contracted sentence generation apparatus 300 may be, for example, a computer 700 illustrated in FIG. 41. FIG. 41 is a block diagram schematically illustrating the configuration of a computer serving as the contracted sentence generation apparatus according to the fourth embodiment. The computer 700 includes a CPU 71, a memory 72, and a non-volatile storage device 73. The computer 700 further includes an input-output I/F 74 to which an input-output apparatus 78 is connected, a R/W device 75 that controls reading and writing of data on a recording medium 79, and a network I/F 76 The CPU 71, the memory 72, the storage device 73, the input-output I/F 74, the R/W device 75, and the network I/F 76 are connected to each other through a bus 77.

The storage device 73 may be a HDD, an SSD, or a flash memory, for example. The storage device 73 as a storage medium stores a contracted sentence generation program 750 that causes the computer 700 to function as the contracted sentence generation apparatus 300. The storage device 73 includes a connection probability information storage region 754 in which information in the connection probability table 220 is stored and an occurrence probability information storage region 755 in which information in the occurrence probability table 312 is stored.

The CPU 71 reads out the contracted sentence generation program 750 from the storage device 73, loads the contracted sentence generation program 750 into the memory 72, and sequentially executes processes included in the contracted sentence generation program 750. The CPU 71 reads out information from the connection probability information storage region 754 to load the connection probability table 220 into the memory 72. Furthermore, the CPU 71 reads out information from the occurrence probability information storage region 755 to load the occurrence probability table 312 into the memory 72.

The contracted sentence generation program 750 includes a sentence input process 51, a morphological analysis process 52, a conceptual structure analysis process 253, a connection probability table generation process 254, an occurrence probability table generation process 751, a connection probability tagging process 255, an indispensable connection determination process 752, and a contracted sentence length setting process 256. The contracted sentence generation program 750 further includes a contracted sentence candidate generation process 753, a contracted sentence selection process 58, and the contracted sentence output process 59.

The CPU 71 executes the conceptual structure analysis process 253 to serve as the conceptual structure analysis unit 213 illustrated in FIG. 35. The CPU 71 executes the connection probability table generation process 254 to serve as the connection probability table generation unit 214 illustrated in FIG. 35. The CPU 71 executes the occurrence probability table generation process 751 to serve as the occurrence probability table generation unit 311 illustrated in FIG. 35.

The CPU 71 executes the connection probability tagging process 255 to serve as the connection probability tagging unit 215 illustrated in FIG. 35. The CPU 71 executes the indispensable connection determination process 752 to serve as the indispensable connection determination unit 313 illustrated in FIG. 35. The CPU 71 executes the contracted sentence length setting process 256 to serve as the contracted sentence length setting unit 216 illustrated in FIG. 35. The CPU 71 executes the contracted sentence candidate generation process 753 to serve as the contracted sentence candidate generation unit 317 illustrated in FIG. 35. The CPU 71 executes the contracted sentence selection process 58 to serve as the contracted sentence selection unit 18 illustrated in FIG. 35.

Other processes are the same as those of the contracted sentence generation program 450 according to the third embodiment. In this manner, the computer 700 executes the contracted sentence generation program 750 to serve as the contracted sentence generation apparatus 300.

The CPU 71 is an exemplary processor as hardware. Thus, the functions achieved by the contracted sentence generation program 750 are achieved by a processor as hardware such as CPU or MPU. Functions achieved by the contracted sentence generation program 750 may be achieved by, for example, a semiconductor integrated circuit, or more specifically, an ASIC.

Next, an effect of the contracted sentence generation apparatus 300 according to the fourth embodiment will be described. When more than one example sentence 31 is inputted to the contracted sentence generation apparatus 300 at generation of the connection probability table 220, a connection probability table generation process illustrated in FIG. 32 is executed. However, the connection probability table generation process according to the fourth embodiment is different from the process according to the third embodiment in the following points.

At step S13, the conceptual structure analysis unit 213 generates the tree structure 234 obtained by analyzing the conceptual structure of each original sentence 32.

At step S14, the FROM node and the TO node of a node pair are each identified based on which of the start point and end point of the arrow connecting two nodes included in the node pair. The relation type between nodes obtained by the conceptual structure analysis is also used as a node-pair attribute to derive the connection probability for each node-pair attribute.

Next, when more than one example sentence 31 is inputted to the contracted sentence generation apparatus 300 at generation of the occurrence probability table 312, a connection probability table generation process illustrated in FIG. 33 is executed. However, the connection probability table generation process according to the fourth embodiment is different from the process according to the third embodiment in the following points.

At step S113, the conceptual structure analysis unit 213 generates the tree structure 234 obtained by analyzing the conceptual structure of each original sentence 32.

At step S114, in the tree structure 234 of all the original sentences 32, the occurrence probability table generation unit 311 deals the relation type between the nodes as a node-pair attribute for the node pair 36 having an inflection in one node. In other words, the occurrence probability table generation unit 311 calculates, for each inflection, an occurrence probability for each attribute whether the relation type between the nodes is "agent".

Figure 42A:
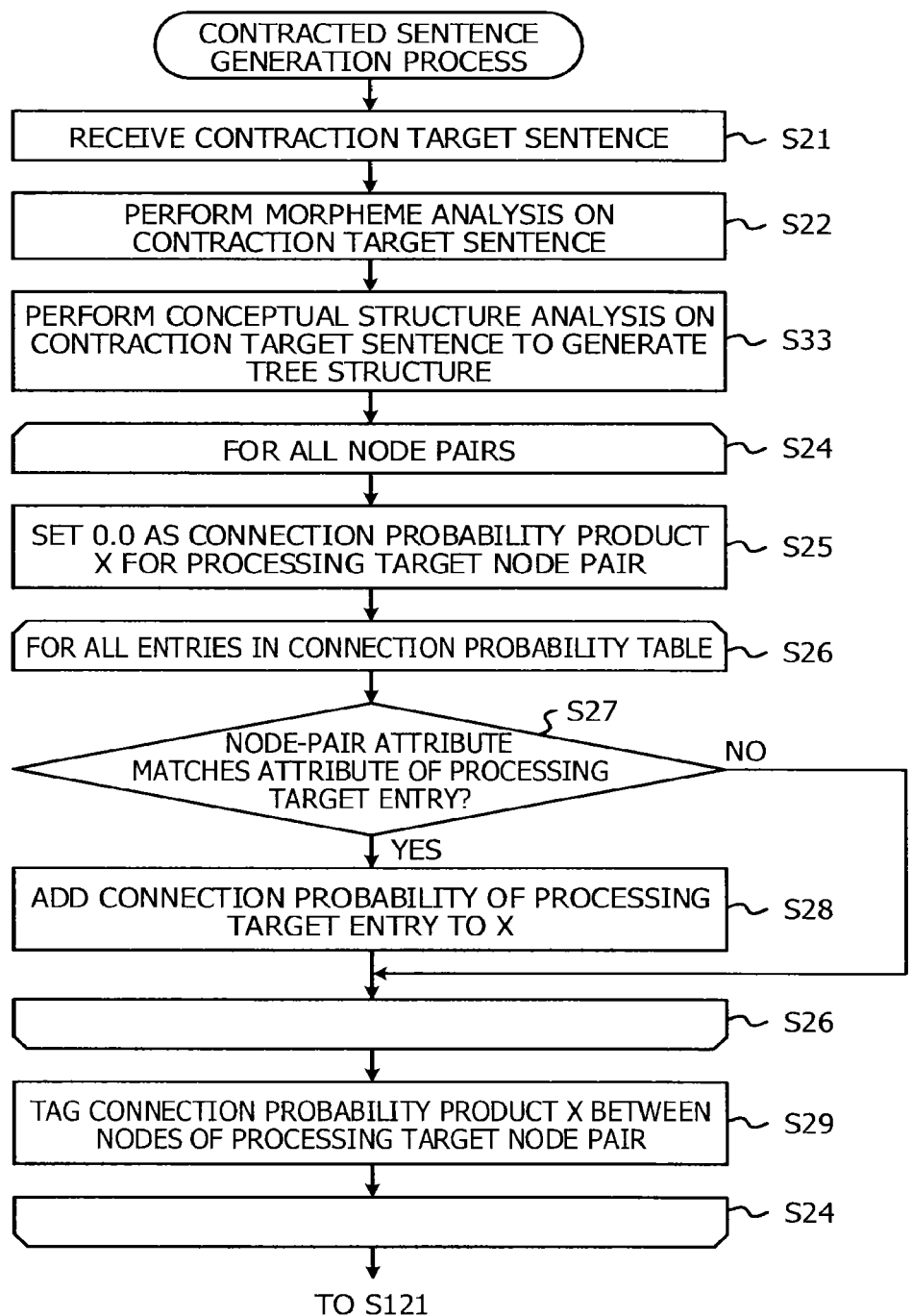
FIG. 42A is a flowchart of an exemplary contracted sentence generation process according to the fourth embodiment.
Figure 42B:
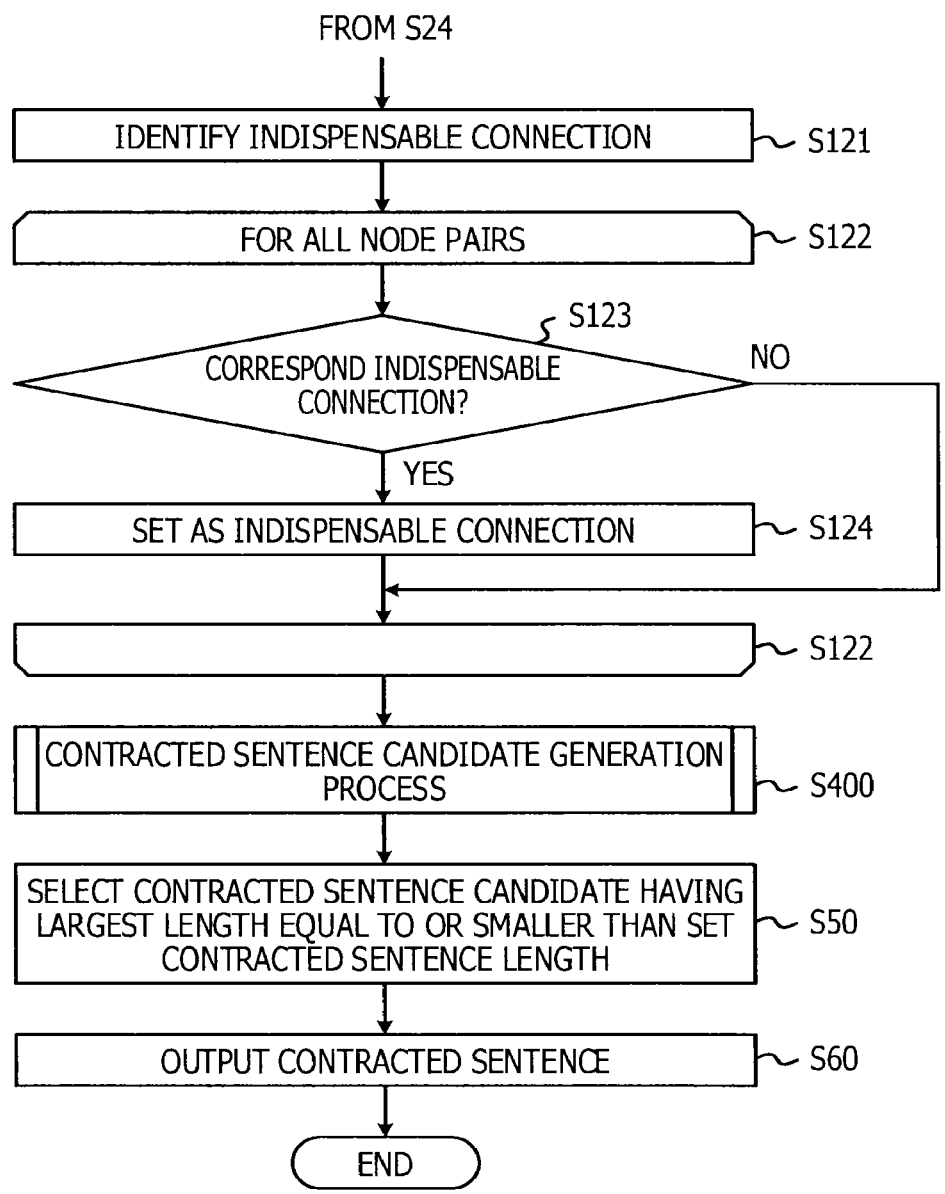
FIG. 42B is a flowchart of an exemplary contracted sentence generation process according to the fourth embodiment.

Next, when the contraction target sentence is inputted to the contracted sentence generation apparatus 300 at generation of a contracted sentence, a contracted sentence generation process illustrated in FIGS. 42A and 42B according to the second embodiment is executed. FIGS. 42A and 42B are each a flowchart of an exemplary contracted sentence generation process according to the fourth embodiment. The contracted sentence generation process executed by the contracted sentence generation apparatus 300 is an exemplary contracted sentence generating method according to the disclosed technique. The processes will be described below. However, an identical reference numeral is given to any step of the same processing as that in the contracted sentence generation process according to the third embodiment, and a detailed description thereof will be omitted.

At step S21, the sentence input unit 11 receives the contraction target sentence inputted to the contracted sentence generation apparatus 300. It is assumed here that the sentence input unit 11 receives the contracted sentence candidate of "彼は大学をかろう じて卒業したあと、資格を取って薬剤師になった。".

Next at step S22, the morphological analysis unit 12 performs the morphological analysis on the contraction target sentence. Next at step S33, the conceptual structure analysis unit 213 analyzes the conceptual structure of the contraction target sentence based on a result of this morphological analysis to generate the tree structure 234 representing the conceptual structure of the contraction target sentence. In the tree structure 234, the relation type between the nodes is depicted on the arrow indicating the connection between the nodes. In this example, the tree structure 234 as illustrated in FIG. 36 is generated.

Next, in the loop processing at step S24, the connection probability tagging unit 215 sets each node pair included in the tree structure 234 generated at step S33 above as a processing target, and executes the processing at step S25, the loop processing at step S26, and the processing at step S29. In this example, as illustrated in FIG. 37, the node pair 35 (the node 1 and the node 4) enclosed by a dashed line is set as the processing target node pair 35.

At step S25, the connection probability tagging unit 215 sets "0.0" as the initial value of a variable x representing the connection probability product of the processing target node pair 35.

Next, in the loop processing at step S26, the connection probability tagging unit 215 sets each entry included in the connection probability table 220 as a processing target and executes processing at step S27 and step S28 below.

At step S27, the connection probability tagging unit 215 identifies the FROM node and the TO node based on the direction of an arrow connecting two nodes included in the processing target node pair 35. In this example, the node "彼が" is identified as the TO node, and the node "卒業したあと、" is identified as the FROM node. Then, the connection probability tagging unit 215 determines whether a node-pair attribute of the processing target matches the attribute of the processing target entry. The flow proceeds to step S28 if the attributes match, or skips processing at step S28 if the attributes do not match. For example, the node-pair attribute of the processing target entry is "the relation type between nodes is an "agent". In this example, since an "agent" is tagged to the processing target node pair 35 as a relation type, it is determined that the attributes match, and then the flow proceeds to step S28. At step S28, the connection probability of the processing target entry is added to the variable x.

When the loop processing at step S26 is completed for all entries included in the connection probability table 220, the flow proceeds to step S29. At this stage, a variable x indicating the connection probability product is obtained as the product (addition in logarithm) of the connection probabilities for node-pair attributes of the processing target node pair 35, as illustrated in FIG. 43. FIG. 43 is a diagram for explaining derivation of a connection probability product.

At step S29, the connection probability tagging unit 215 tags the value of the variable x as the connection probability product of two nodes included in the processing target node pair 35.

When the tagging of the connection probability product is completed for all node pairs 35 included in the tree structure 234 generated at step S33 above, the loop processing at step S24 ends.

Figure 44:
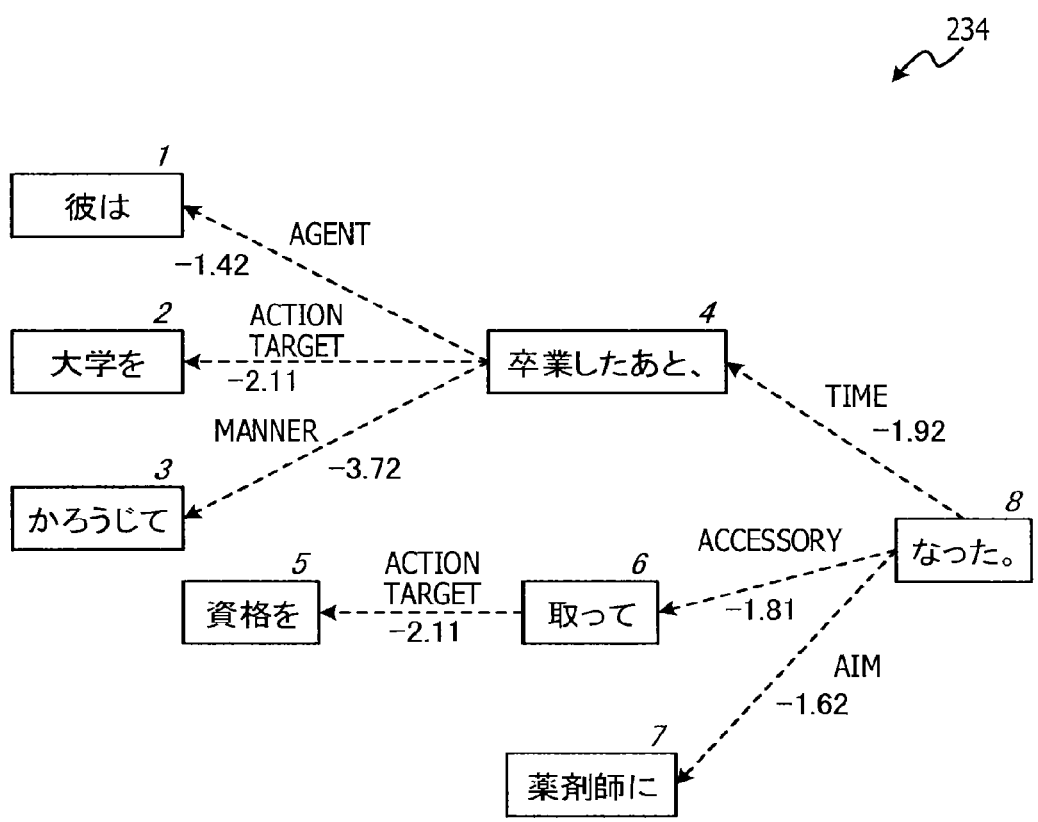
FIG. 44 is a schematic diagram illustrating a tree structure after the connection probability products are tagged.

FIG. 44 is a schematic diagram illustrating a tree structure after the connection probability products are tagged. At this stage of completing the loop processing at step S24, as illustrated in FIG. 44, the connection probability product is tagged between nodes included in the tree structure 234. In FIG. 44, a number put beside an arrow connecting nodes is the connection probability product.

Next, at step S121, the indispensable connection determination unit 313 identifies the indispensable connection. The indispensable connection determination unit 313 identifies, as the indispensable connection, the entry having the occurrence probability larger than the second threshold for determining the indispensable connection among the entries in the occurrence probability table 312. However, similarly to the third embodiment, the processing at step S121 may be performed prior to the contracted sentence generation process. Similarly to the third embodiment, when the indispensable connection is identified in advance, the processing at step S121 is omitted in the contracted sentence generation process.

FIG. 45 is an example of an identified result of an indispensable connection when the second threshold is set as "−0.2". As illustrated in FIG. 45, a flag "1" indicating the indispensable connection is set to the entry having the occurrence probability larger than the second threshold "−0.2". In contrast, a flag "0" indicating non-indispensable connection is set to the entry having the occurrence probability equal to or smaller than the second threshold "−0.2".

Next, in the loop processing at step S122, the indispensable connection determination unit 313 sets each node pair 35 included in the tree structure 234 generated at step S33 above as a processing target, and executes the processing at step S123 and the processing at step S124.

At step S123, the indispensable connection determination unit 313 determines whether the processing target node pair 35 is the indispensable connection. In other words, the indispensable connection determination unit 313 determines whether the node pair 35 is the node pair 36 including an inflection node and whether the combination of the inflection and the attribute in the node pair 36 is identified as the indispensable connection at step S121.

When the node pair 35 is determined as the node pair 36 including the inflection node and the combination of the attributes of the inflection node in the node pair 36 and the case node for the inflection is determined as the indispensable connection at step S121, the indispensable connection determination unit 313 sets the node pair 35 as the indispensable connection at step S124. In contrast, when it is determined the node pair 35 is not the node pair 36 including the inflection node or the combination of the attributes of the inflection node in the node pair 36 and the case node for the inflection is not determined as the indispensable connection at step S121, the indispensable connection determination unit 313 skips step S124.

When the loop processing at step S122 ends for all the node pairs, the flow proceeds to step S400. In this stage, tagged is the information indicating that the node pairs among the node pairs 35 included in the tree structure 234, which are the node pairs 36 including the inflection node, and whose combination of the attributes of the inflection node in the node pair 36 and the case node for the inflection is identified as the indispensable connection at step S121.

Figure 46:
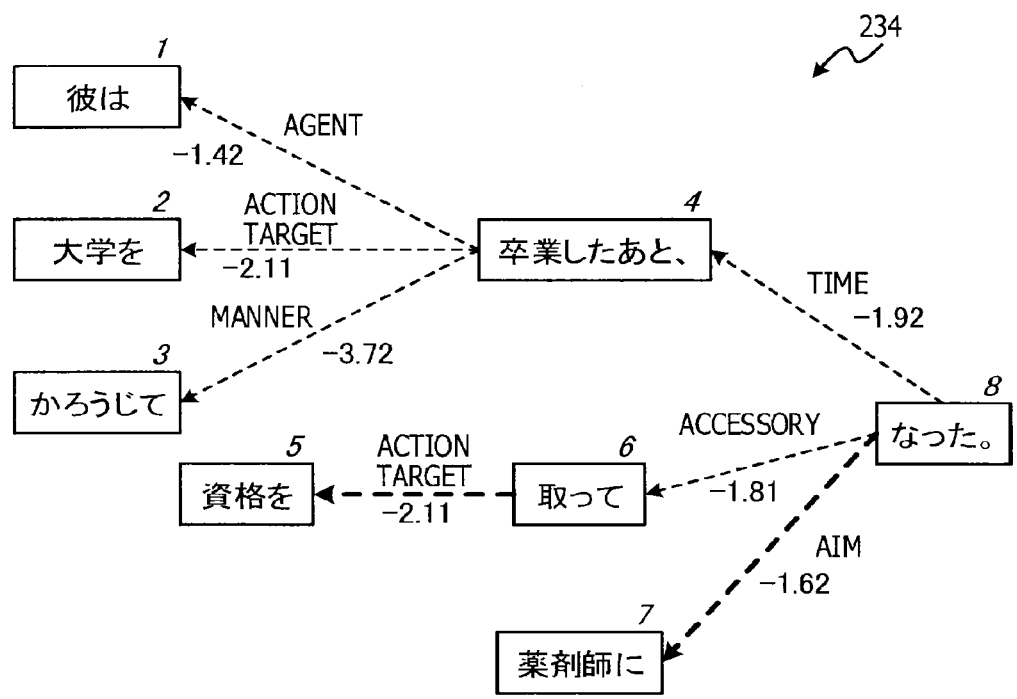
FIG. 46 is a schematic diagram of a tree structure after the indispensable connections are set.

FIG. 46 is a schematic diagram of a tree structure after the indispensable connection is set. As illustrated in FIG. 46, the connection probability product is tagged between the nodes included in the tree structure 234 and the indispensable connection is set. In FIG. 46, a number beside an arrow connecting nodes is the connection probability product and among the arrows drawing connections between the nodes, the arrow having the indispensable connection is drawn by a bold line.

For example, it is identified that the node pair 36 including a case corresponding to the relation type "action target" for the inflection "取る" has the indispensable connection in FIG. 45. Since the connection between the inflection node "取って (took)" and the case node "資格を (license)" for the inflection is set as the indispensable connection, in FIG. 46, the connection between the inflection node "取って" and the case node "資格を" for the inflection is indicated by a bold arrow.

Figure 47:
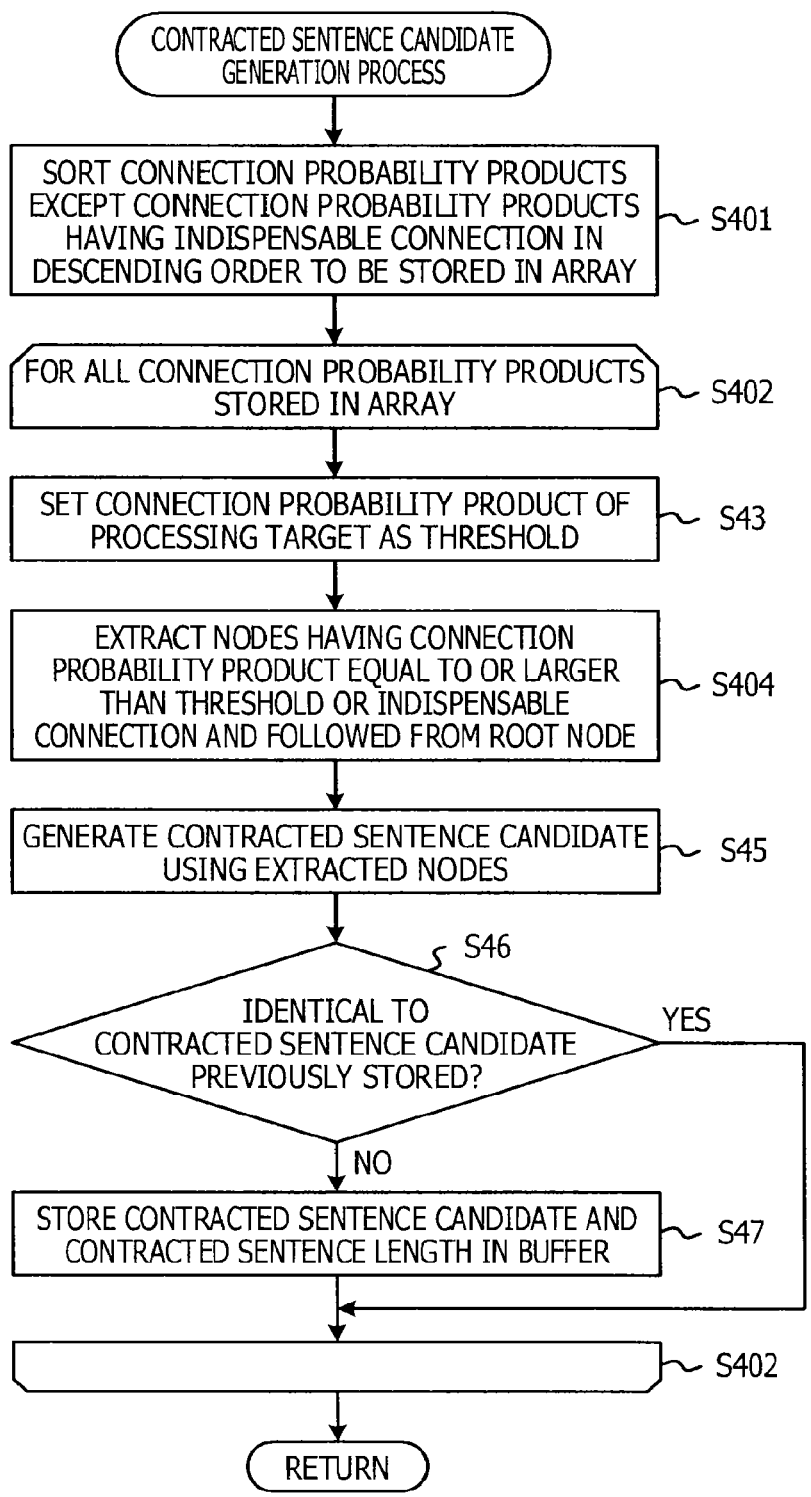
FIG. 47 is a flowchart of an exemplary contracted sentence candidate generation process according to the fourth embodiment.

Next at step S400, the contracted sentence candidate generation process illustrated in detail in FIG. 47 is executed. FIG. 47 is a flowchart of an exemplary contracted sentence candidate generation process according to the fourth embodiment.

At step S401 in the contracted sentence candidate generation process illustrated in FIG. 47, the contracted sentence candidate generation unit 317 sorts the connection probability products, except the connection probability products tagged to the node pairs set as the indispensable connection, among the connection probability products tagged to the node pairs 35 included in the tree structure 234 of the contraction target sentence in descending order. Then, the contracted sentence candidate generation unit 317 stores the connection probability products thus sorted in an array.

Figure 48:
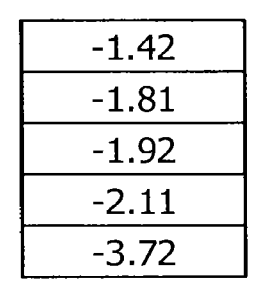

FIG. 48 is a diagram of the connection probability products stored in an array. As illustrated in FIG. 48, values of "−1.42", "−2.11", "−3.72", "−1.92", and "−1.81", which are respectively tagged to the node pairs 35, are sorted in descending order from the connection probability products "−1.42", "−2.11" (two pairs), "−3.72", "−1.92", "−1.81", and "−1.62" by excluding the connection probability products "−2.11" and "−1.62" of the node pairs 36 having the indispensable connection.

Next, in the loop processing at step S402, the contracted sentence candidate generation unit 317 sets each connection probability product stored in the array as a processing target, and executes processing at step S43, step S404, step S45, step S46, and step S47.

At step S43, the contracted sentence candidate generation unit 317 sets the connection probability product of the processing target as the first threshold. Next, at steps S404 and S45, the contracted sentence candidate generation unit 317 performs the same processing as that of steps S126 and S31 in the contracted sentence generation process (FIG. 34) according to the third embodiment so as to generate a contracted sentence candidate in accordance with the first threshold set at step S43.

Next at step S46, the contracted sentence candidate generation unit 317 determines whether the contracted sentence candidate generated at step S45 above is identical to any contracted sentence candidate stored in advance in the buffer. If these contracted sentence candidates are not identical, the flow proceeds to step S47. At step S47, the contracted sentence candidate generation unit 317 stores the contracted sentence candidate thus generated and the contracted sentence length of this contracted sentence candidate in the buffer. In contrast, if the contracted sentence candidate thus generated is identical to any contracted sentence candidate stored in advance in the buffer, the flow skips this processing at step S47.

Figure 49:
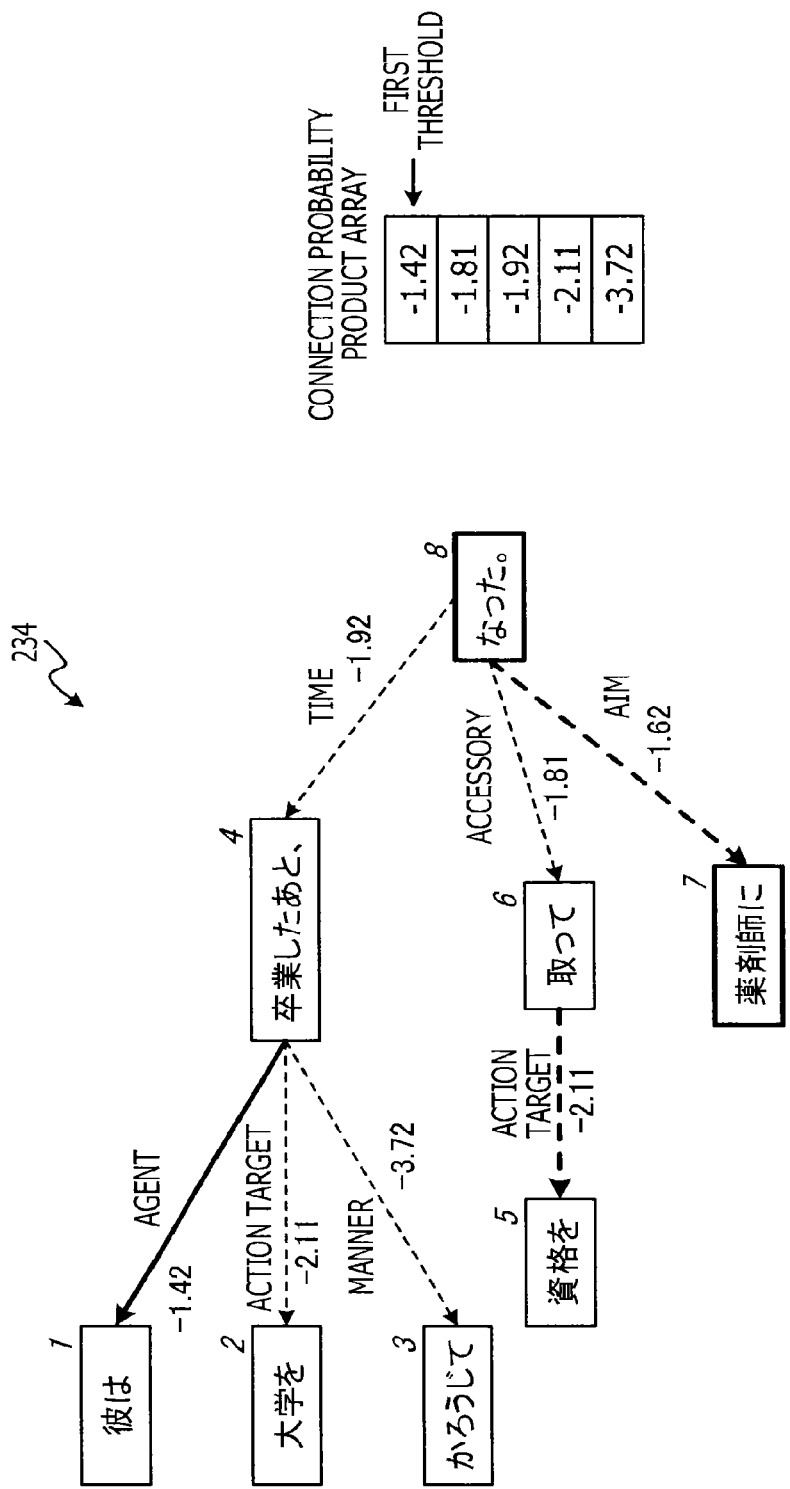
FIG. 49 is a diagram for explaining the contracted sentence candidate generation when the connection probability product "−1.42" is set as a first threshold.

It is assumed here that the connection probability product "−1.42" is set as the first threshold. FIG. 49 is a diagram for explaining the contracted sentence candidate generation when the connection probability product "−1.42" is set as a first threshold.

In FIG. 49, a bold solid arrow is drawn between nodes having a connection probability product equal to or larger than the first threshold "−1.42", and a dashed line is drawn between nodes having a connection probability product less than the threshold. In addition, the connection between the nodes having the indispensable connection is drawn by a bold solid arrow.

For example, in the example in FIG. 49, there is no node, among the nodes connected with the root node "なった。(became)", whose connection probability product between nodes, which is equal to or larger than the threshold. In contrast, there is a node "薬剤師に (pharmacist)" connected by the indispensable connection. The root node "なった。" and the node "薬剤 師に" are extracted and the contracted sentence candidate "薬剤師になった。(became a pharmacist)" is generated according to the occurrence order in the contraction target sentence. The buffer, which is empty at this stage, stores the contracted sentence candidate (薬剤師になった。) thus generated. In the buffer FIG. 49 illustrates an extracted node with a bold frame.

Next, when the flow returns to step S43 by the loop processing, the contracted sentence candidate generation unit 317 sets the next largest connection probability product among the connection probability products stored in the array to be the first threshold. For example, as illustrated in FIG. 50, the first threshold is set to "−1.81".

Figure 50:
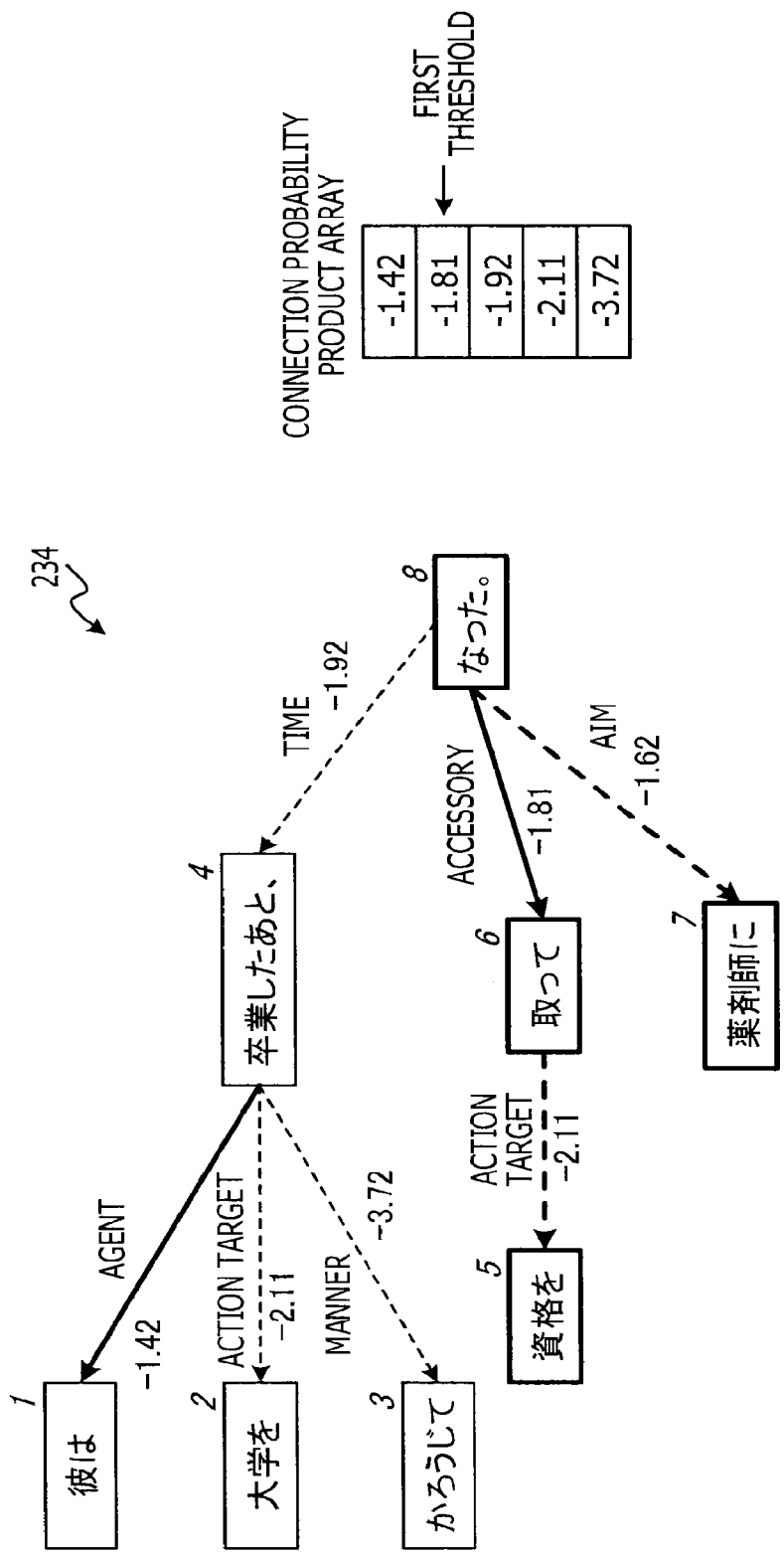
FIG. 50 is a diagram for explaining the contracted sentence candidate generation when the connection probability product "−1.81" is set as a first threshold.

FIG. 50 is a diagram for explaining the contracted sentence candidate generation when the connection probability product "−1.81" is set as the first threshold. In FIG. 50, a bold solid arrow is drawn between nodes having a connection probability product equal to or larger than the first threshold "−1.81", and a dashed line is drawn between nodes having a connection probability product less than the threshold. In addition, the connection between the nodes having the indispensable connection is drawn by a bold solid arrow.

In this case, among the nodes connected with the root node "なっ た。", there exists the node "取って" which has the connection probability product equal to or larger than the threshold between the nodes. In addition, there exists the node "資格を" having the indispensable connection with the node "取って". Also, among the nodes connected with the root node "なった。", there exists the node "薬剤師に" having the indispensable connection.

Accordingly, the root node "なった。", the node "取って", the node "資格を", and the node "薬剤師に" are extracted according to the appearance order in the contraction target sentence, so that the contracted sentence candidate "資格を取って 薬剤師になった。(took a license and became a pharmacist)" is generated. Since the contracted sentence candidate "資格を取 って薬剤師 になった。" is a contracted sentence candidate different from the contracted sentence candidate "薬剤師になった。" which is already stored in the buffer, a negative determination is made at step S47, and the generated contracted sentence candidate is stored in the buffer, and then the flow returns to step S43 again.

Figure 51:
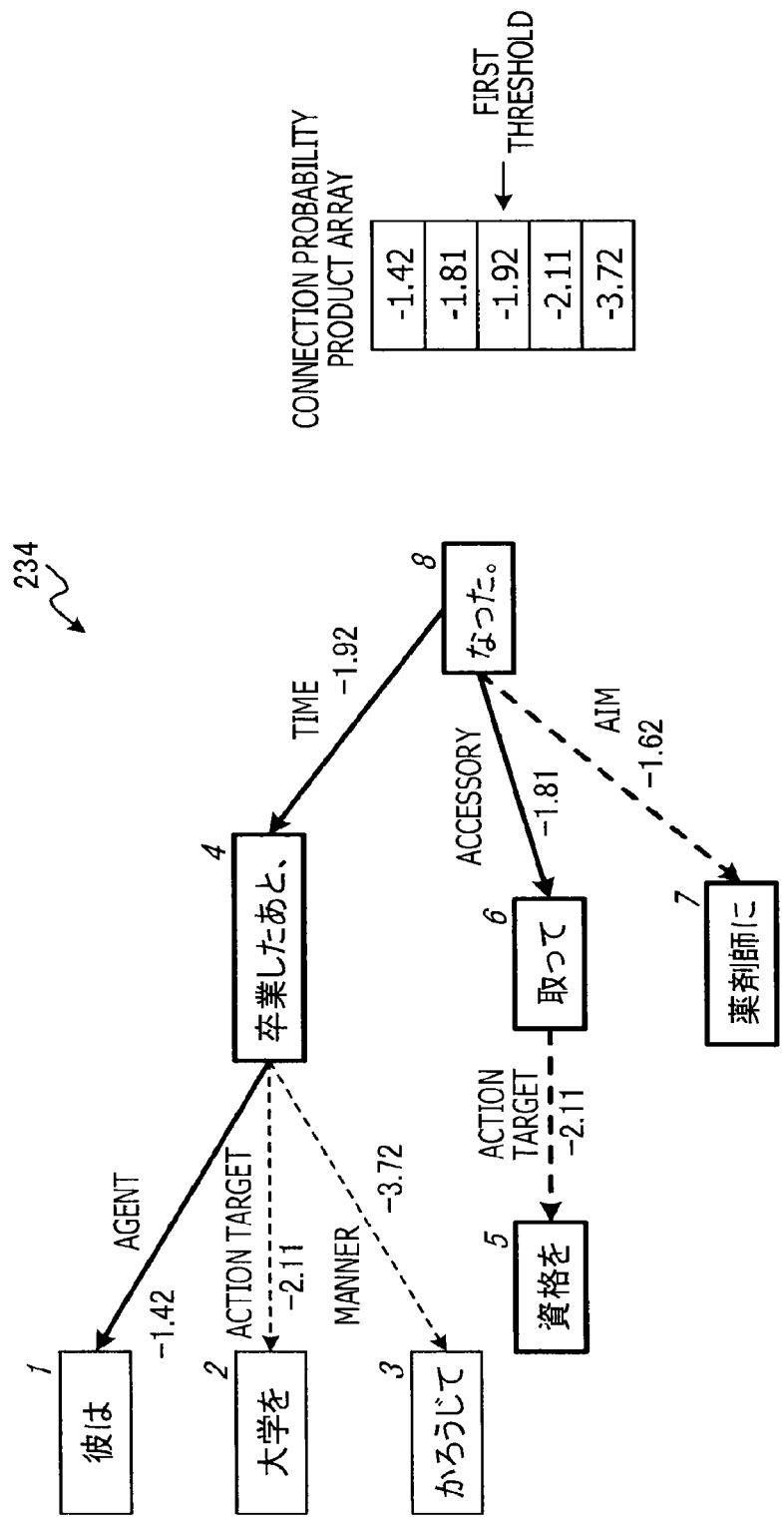
FIG. 51 is a diagram for explaining the contracted sentence candidate generation when the connection probability product "−1.92" is set as a first threshold.

Next, at step S43, as illustrated in FIG. 51, when the contracted sentence candidate generation unit 317 sets "−1.92" as the threshold of the connection probability product, the contracted sentence candidate "彼は卒業した あと、資格を取って 薬剤師になった。(He took a license and became a pharmacist after graduation)" is generated. FIG. 51 is a diagram for explaining the contracted sentence candidate generation when the connection probability product "−1.92" is set to the first threshold. Since this contracted sentence candidate is not stored in the buffer, a negative determination is made at step S46, and the contracted sentence candidate thus generated is stored in the buffer, and the flow again returns to step S43.

When the loop processing at step S402 ends by sequentially setting all the connection probability products stored in the array to the first threshold, the contracted sentence candidate generation process ends, and the flow returns to the contracted sentence generation process (FIG. 42B). FIG. 52 illustrates a list of the contracted sentence candidates stored in the buffer at this stage.

FIG. 52 illustrates a list of contracted sentence candidates stored in a buffer.

As illustrated in FIG. 52, since different connection probability products are set in stages as first thresholds, the contracted sentence candidates having various contracted sentence lengths are obtained.

Next, at step S50 in the contracted sentence generation process illustrated in FIG. 42B, the contracted sentence length setting unit 216 sets the contracted sentence length. Then, the contracted sentence selection unit 18 selects, from among the contracted sentence candidates stored in the buffer, the contracted sentence candidate having the largest contracted sentence length within the contracted sentence length thus set. For example, when the contracted sentence length is set to "30" and the contracted sentence candidates illustrated in FIG. 52 are generated, the contracted sentence candidate (資格を 取って薬剤 師になった。) of the largest contracted sentence length is selected from among contracted sentence candidates having contracted sentence lengths equal to or smaller than 30. However, when the contracted sentence candidates within the range of the contracted sentence length thus set do not exist, the contracted sentence candidate with the smallest length is selected.

Next at step S60, the contracted sentence output unit 19 outputs the contracted sentence selected at step S50 above, and this ends the contracted sentence generation process.

As described above, the contracted sentence generation apparatus 300 according to the fourth embodiment generates a tree structure by connecting the nodes corresponding to phrases based on the conceptual structure of phrases included in the contraction target sentence. Then, the contracted sentence generation apparatus 300 tags, between two connected nodes, the connection probability as the probability that the nodes remain in a contracted sentence with no pruning provided between the nodes at generation of the contracted sentence. Furthermore, when one node of the connected two nodes is an inflection node, it is determined that the connection between the two nodes is the indispensable connection according to the attributes of the inflection node and the case node for the inflection, for each inflection. In other words, it is determined that the other node is the indispensable case of the inflection.

Then, the contracted sentence generation apparatus 300 generates a contracted sentence candidate based on the nodes having the connection probability equal to or larger than the threshold from a root node or the nodes extracted by following the indispensable connection. In this manner, whether to provide pruning between nodes is determined in accordance with the connection probability between phrases based on the conceptual structure and the indispensable connection based on the occurrence probability, thereby reducing any pruning that otherwise would result in, for example, lack of an indispensable case, and thus generating a natural contracted sentence.

The contracted sentence generation apparatus 300 generally sets different connection probability products as third thresholds and generate more than one contracted sentence candidate. Thus, the contracted sentence candidate having the largest length within the user desired contracted sentence length is possible, so that a longer and more natural contracted sentence may be outputted within the set contracted sentence length.

However, the fourth embodiment describes the case in which each connection probability product tagged between nodes included in the tree structure of the contraction target sentence is set as the first threshold for generating the contracted sentence candidate, but is not limited thereto. For example, the first threshold may be sequentially set to gradually different values between the maximum value and minimum value of the connection probability products tagged between nodes included in the tree structure of the contraction target sentence.

The contracted sentence length of the generated candidate increases as the set first threshold decreases, like in the fourth embodiment. In this case, the loop processing at step S402 in the contracted sentence candidate generation process (FIG. 47) may be ended when the length of a contracted sentence candidate thus produced exceeds a contracted sentence length thus set.

Fifth Embodiment

Next, a fifth embodiment of the disclosed technique will be described. An identical reference numeral is given to any component of a contracted sentence generation apparatus according to the fifth embodiment, which is the same as that of the contracted sentence generation apparatus 100 according to the third embodiment and the contracted sentence generation apparatus 300 according to the fourth embodiment, and a detailed description thereof will be omitted. In the fifth embodiment, an example of English contraction target sentence is described. However, similarly to the third and fourth embodiments, the fifth embodiment is applicable to other language such as Japanese.

In addition, the fifth embodiment is different from the third and fourth embodiments in that evaluation values based on the connection probability and the occurrence probability are used to generate a contracted sentence. The fifth embodiment describes an embodiment in which more than one contracted sentence candidate is generated, like in the fourth embodiment, and then evaluation values are used therein, but like in the third embodiment, an embodiment using the evaluation values may be applied to the contracted sentence generation method of generating a contracted sentence based on a fixed threshold.

Figure 53:
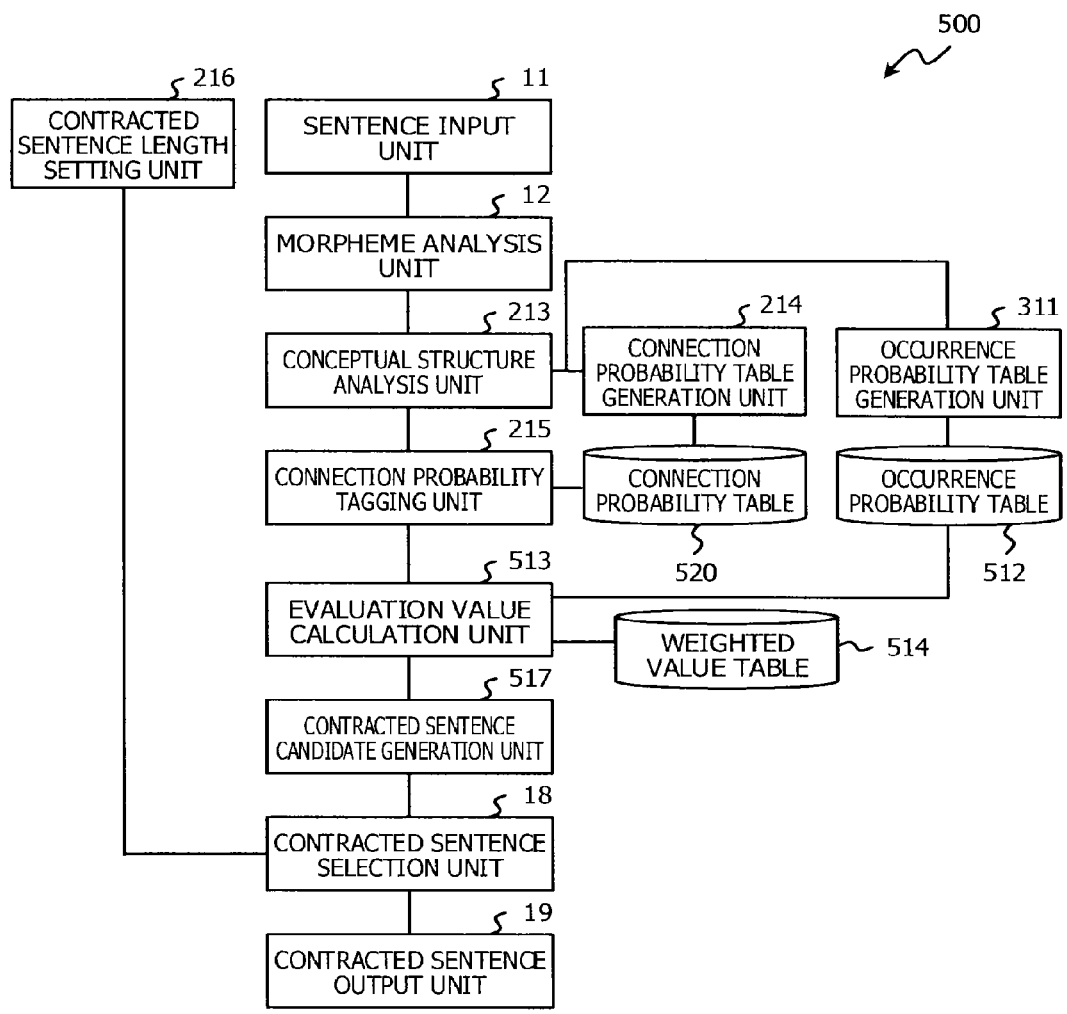
FIG. 53 is a functional block diagram schematically illustrating the configuration of a contracted sentence generation apparatus according to a fifth embodiment of the disclosed technique.

FIG. 53 is a functional block diagram schematically illustrating the configuration of a contracted sentence generation apparatus according to the fifth embodiment. As illustrated in FIG. 53, a contracted sentence generation apparatus 500 according to the fifth embodiment includes a sentence input unit 11, a morphological analysis unit 12, a conceptual structure analysis unit 213, a connection probability table generation unit 214, a connection probability tagging unit 215, and a contracted sentence length setting unit 216. The contracted sentence generation apparatus 500 further includes a contracted sentence selection unit 18 and the contracted sentence output unit 19. In addition, the contracted sentence generation apparatus 500 includes an occurrence probability table generation unit 311, an evaluation value calculation unit 513, and a contracted sentence candidate generation unit 517.

The contracted sentence generation apparatus 500 stores a connection probability table 520, an occurrence probability table 512, and a weighted value table 514. The contracted sentence candidate generation unit 517 is an exemplary generation unit according to the disclosed technique. The connection probability table 520 is exemplary information stored in a first storage device. Similarly, the occurrence probability table 512 is exemplary information stored in a second storage device.

Similarly to the fourth embodiment, the connection probability table generation unit 214 derives the connection probability for each node-pair attribute. FIG. 54 illustrates an example of the connection probability table 520 when the target language is English. FIG. 54 is an exemplary data configuration of a connection probability table when the target language is English. The method of generating the connection probability table 520 is same as that of the third and fourth embodiments.

Similarly to the fourth embodiment, the occurrence probability table generation unit 311 derives the occurrence probability for each inflection and for each node-pair attribute. FIG. 55 illustrates an example of the occurrence probability table 512 when the target language is English. FIG. 55 is an exemplary data configuration of an occurrence probability table when a target language is English. The method of generating the occurrence probability table 512 is same as that of the third and fourth embodiments.

The evaluation value calculation unit 513 calculates an evaluation value for each node pair 35. The evaluation value calculation unit 513 calculates the evaluation value of the node pair by Expression (5) below, for example.

$$\text{Evaluation Value} = \text{Connection Probability Product} \times \text{Weight } A + \text{Occurrence Probability} \times \text{Weight } B \quad (5)$$

In other words, the evaluation value calculation unit 513 calculates the evaluation value by weighting both the connection probability product of each node pair 35, which is calculated by the connection probability tagging unit 215, and the occurrence probability when the node pair 35 is the node pair 36 including the inflection and by combining the weighted values. Moreover, since the weight B, which is used for weighing the occurrence probability, is set to a value larger than the weight A, which is used for weighing the connection probability product, it is possible to suppress the pruning of the node pair 36 in a case where the node pair 36 including the inflection is of an indispensable connection.

Figure 56:
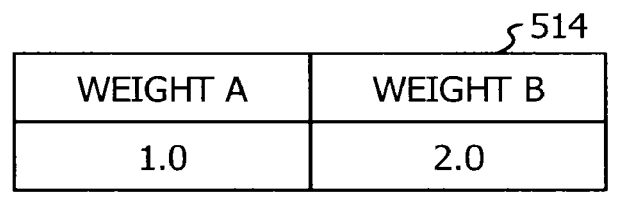

The weighted value table 514 stores weighted values. FIG. 56 is an exemplary data configuration of the weighted value table. As illustrated in FIG. 56, the value of the weight A applied to the connection probability product and the value of the weight B applied to the occurrence probability are stored. The evaluation value calculation unit 513 calculates the evaluation value by referring to the weighted value table 514 and by using Expression (5) above, for example. The evaluation value is set in advance by an administrator, for example.

Similarly to the second embodiment, the contracted sentence candidate generation unit 517 sets different first thresholds and generates a contracted sentence candidate for each first threshold thus set. However, different from the second embodiment, the contracted sentence candidate generation unit 517 follows the nodes having the evaluation value equal to or larger than the first threshold and extracts the nodes on the path followed without a stop, thereby generating the contracted sentence candidate for each first threshold. In other words, since the indispensable connection is not set in the fifth embodiment, the nodes having the evaluation value equal to or larger than the first threshold are followed, so that the contracted sentence candidate is generated.

Figure 57:
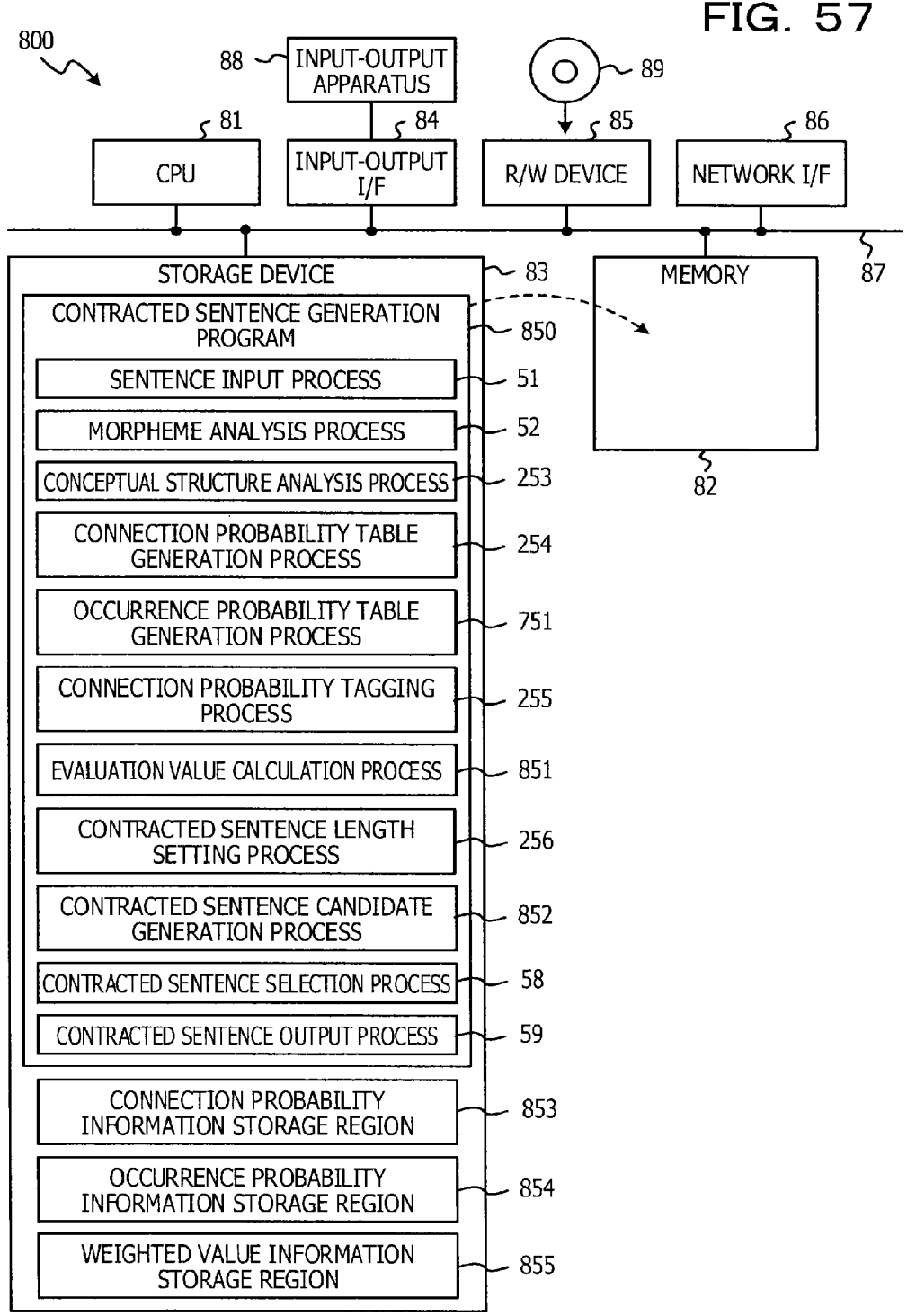
FIG. 57 is a block diagram schematically illustrating the configuration of a computer serving as the contracted sentence generation apparatus according to the fifth embodiment.

The contracted sentence generation apparatus 500 may be, for example, a computer 800 illustrated in FIG. 57. FIG. 57 is a block diagram schematically illustrating the configuration of a computer serving as the contracted sentence generation apparatus according to the fifth embodiment. The computer 800 includes a CPU 81, a memory 82, and a non-volatile storage device 83. The computer 800 further includes an input-output I/F 84 to which an input-output apparatus 88 is connected, a R/W device 85 that controls reading and writing of data on a recording medium 89, and a network I/F 86. The CPU 81, the memory 82, the storage device 83, the input-output I/F 84, the R/W device 85, and the network I/F 86 are connected to each other through a bus 87.

The storage device 83 may be an HDD, an SSD, or a flash memory, for example. The storage device 83 as a storage medium stores a contracted sentence generation program 850 that causes the computer 800 to function as the contracted sentence generation apparatus 500. In addition, the storage device 83 includes a connection probability information storage region 853 in which information included in the connection probability table 520 is stored, an occurrence probability information storage region 854 in which information included in the occurrence probability table 512 is stored, and a weighted value storage region 855 in which information included in the weighted value table 514 is stored.

The CPU 81 reads out the contracted sentence generation program 850 from the storage device 83, loads the contracted sentence generation program 850 into the memory 82, and sequentially executes processes included in the contracted sentence generation program 850. The CPU 81 reads out information from the connection probability information storage region 853 to load the connection probability table 520 into the memory 82. In addition, the CPU 81 reads out information from the occurrence probability information storage region 854 to load the occurrence probability table 512 into the memory 82.

The contracted sentence generation program 850 includes a sentence input process 51, a morphological analysis process 52, a conceptual structure analysis process 253, a connection probability table generation process 254, an occurrence probability table generation process 751, a connection probability tagging process 255, an evaluation value calculation process 851, and a contracted sentence length setting process 256. The contracted sentence generation program 850 further includes a contracted sentence candidate generation process 852, a contracted sentence selection process 58, and the contracted sentence output process 59.

The CPU 81 executes the evaluation value calculation process 851 to serve as the evaluation value calculation unit 513 illustrated in FIG. 53. The CPU 81 executes the contracted sentence candidate generation process 852 to serve as the contracted sentence candidate generation unit 517 illustrated in FIG. 53.

The CPU 81 is an exemplary processor as hardware. Thus, the functions achieved by the contracted sentence generation program 850 are achieved by a processor as hardware such as a CPU or an MPU. Functions achieved by the contracted sentence generation program 850 may be achieved by, for example, a semiconductor integrated circuit, or more specifically, an ASIC.

Next, an effect of the contracted sentence generation apparatus 500 according to the fifth embodiment will be described. When more than one example sentence 31 is inputted to the contracted sentence generation apparatus 500 at generation of the connection probability table 520, a connection probability table generation process illustrated in FIG. 32 is executed. The method of generating the connection probability table 520 according to the fifth embodiment is same as that of the fourth embodiment.

Next, when more than one example sentence 31 is inputted to the contracted sentence generation apparatus 500 at generation of the occurrence probability table 512, an occurrence probability table generation process illustrated in FIG. 33 is executed. The method of generating the occurrence probability table 512 according to the fifth embodiment is same as that of the fourth embodiment.

Figure 58A:
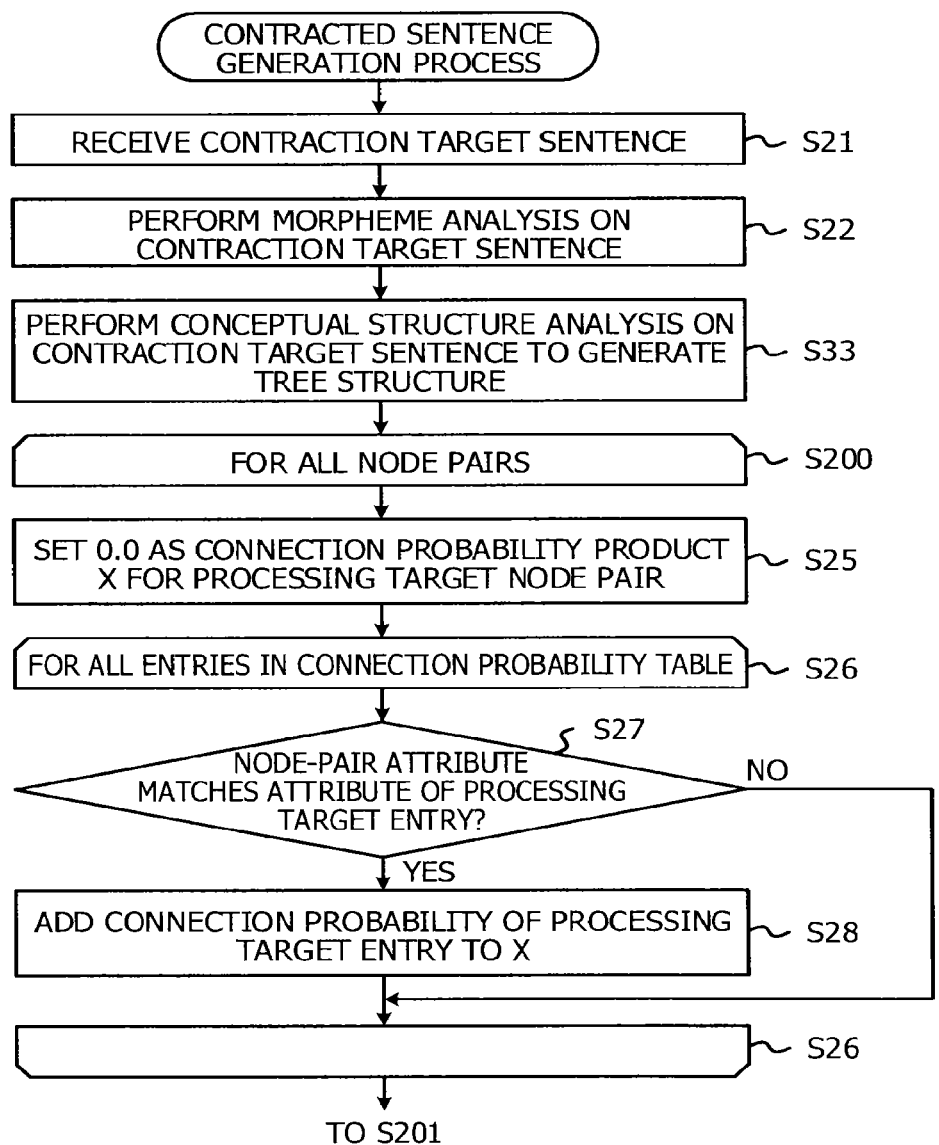
FIG. 58A is a flowchart of an exemplary contracted sentence generation process according to the fifth embodiment.
Figure 58B:
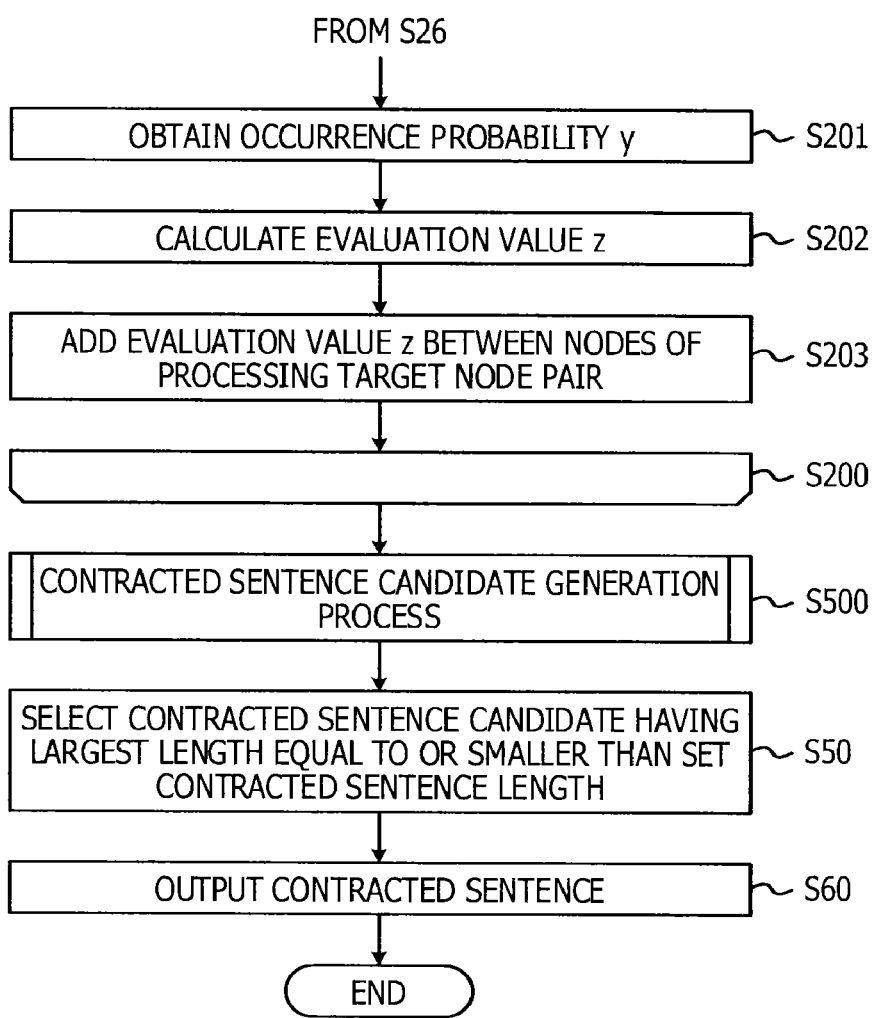
FIG. 58B is a flowchart of an exemplary contracted sentence generation process according to the fifth embodiment.

Next, when the contraction target sentence is inputted to the contracted sentence generation apparatus 500 at generation of a contracted sentence, a contracted sentence generation process illustrated in FIGS. 58A and 58B according to the fifth embodiment is executed. FIGS. 58A and 58B are each a flowchart of an exemplary contracted sentence generation process according to the fifth embodiment.

The contracted sentence generation process executed by the contracted sentence generation apparatus 500 is an exemplary contracted sentence generating method according to the disclosed technique. The processes will be described below. An identical reference numeral is given to any step of the same processing as that in the contracted sentence generation process according to the third and fourth embodiments, and a detailed description thereof will be omitted.

At step S21, the sentence input unit 11 receives the contraction target sentence inputted to the contracted sentence generation apparatus 500. The sentence input unit 11 receives the contraction target sentence "I went hiking to a park which has many trees with a box lunch because the weather was very good".

Figure 59:
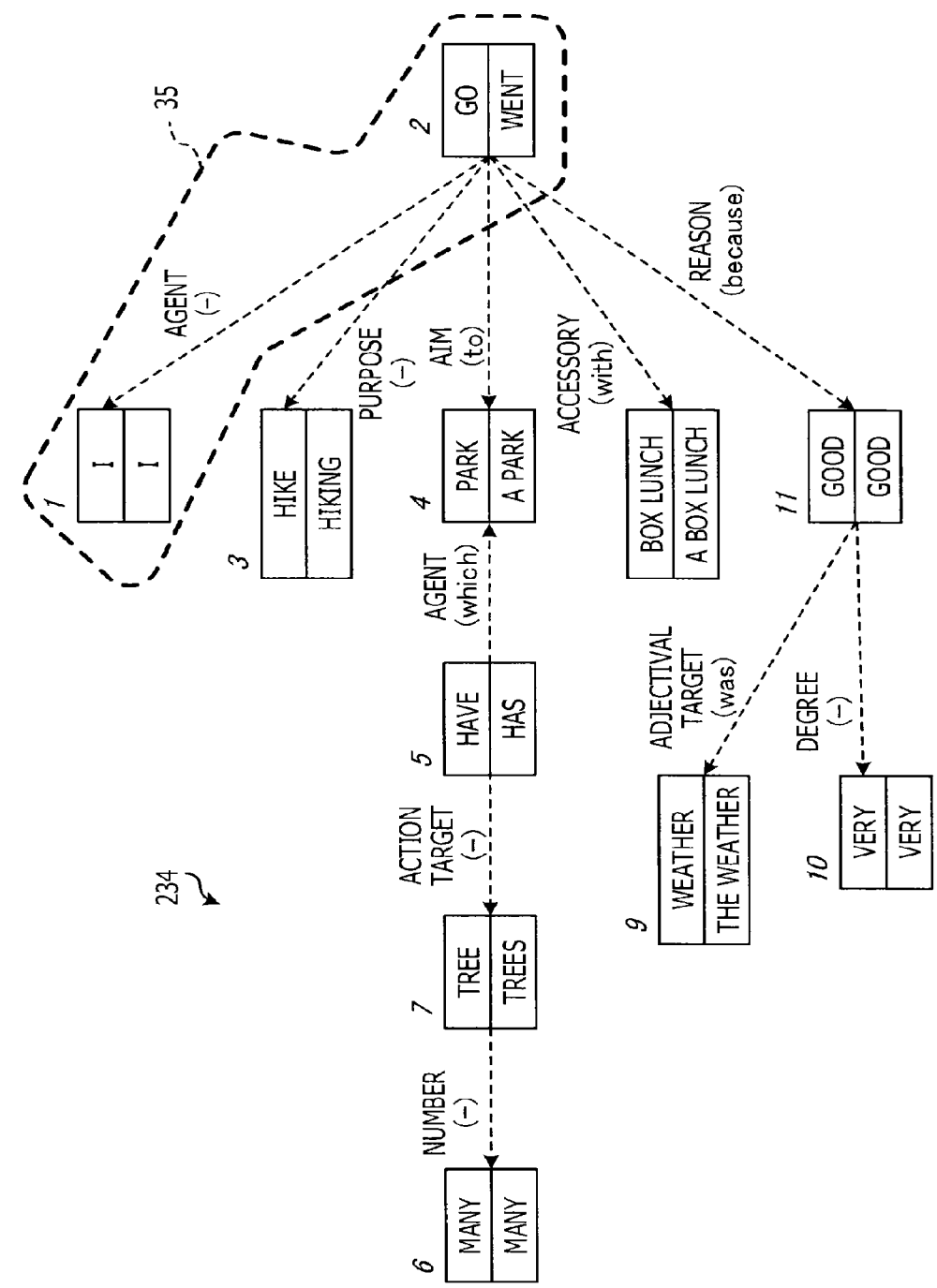
FIG. 59 is a diagram illustrating an exemplary tree structure by a conceptual structure analysis.

Next at step S22, the morphological analysis unit 12 performs the morphological analysis on the contraction target sentence. Next at step S33, the conceptual structure analysis unit 213 analyzes the conceptual structure of the contraction target sentence based on a result of this morphological analysis to generate the tree structure 234 representing the conceptual structure of the contraction target sentence. In the tree structure 234, the relation type between the nodes is depicted on the arrow indicating the connection between the nodes. In this example, the tree structure 234 as illustrated in FIG. 59 is generated. FIG. 59 is a diagram illustrating an exemplary tree structure obtained by a conceptual structure analysis.

As illustrated in FIG. 59, the phrase corresponding to an adjunct may be depicted on the arrow indicating the connection between the nodes. In other words, a phrase corresponding to a substantive is dealt as a node. In addition, a phrase used in the contraction target sentence may be depicted together with the corresponding original type.

Even in the Japanese tree structure, only a substantive is dealt as a node and an adjunct is depicted on the arrow indicating the connection between the nodes, and the phrase used in the contraction target sentence may be depicted together with a corresponding original type.

Next, in the loop processing at step S200, the connection probability tagging unit 215 sets each node pair included in the tree structure 234 generated at step S33 above as a processing target, and executes the processing at step S25, the loop processing at step S26.

In this example, as illustrated in FIG. 59, a node pair 35 (the node "I" and the node "go (went)") enclosed by a dashed line is set as the processing target node pair 35.

At step S25, the connection probability tagging unit 215 sets "0.0" as the initial value of a variable x representing the connection probability product of the processing target node pair 35.

Next, in the loop processing at step S26, the connection probability tagging unit 215 sets each entry included in the connection probability table 520 as a processing target and executes processing at step S27 and step S28 below similarly to the fourth embodiment.

When the loop processing at step S26 ends for all entries included in the connection probability table 520, the flow proceeds to step S201.

As illustrated in FIG. 59, when the node pair 35 including the TO node "I" and the FROM node "go (went)" is a processing target, a variable x indicating the connection probability product is obtained as the product (addition in logarithm) of the connection probabilities for node-pair attributes of the processing target node pair 35, as illustrated in FIG. 60. The connection probability product indicated by the variable x is "−0.46". FIG. 60 is a diagram for explaining derivation of an evaluation value.

Next, at step S201, the evaluation value calculation unit 513 obtains an occurrence probability y for the processing target node pair 35 by referring to the occurrence probability table 512. For example, as illustrated in FIG. 59, when the node pair 35 including the TO node "I" and the FROM node "go (went)" is the processing target, the node-pair attribute is an "agent", so that the occurrence probability y "−0.16" is obtained.

Next, at step S202, the evaluation value calculation unit 513 calculates an evaluation value z based on the weight A, the weight B, the connection probability product x, and the occurrence probability y. For example, the evaluation value calculation unit 513 calculates the evaluation value z by Expression (5). Subsequently, at step S203, the evaluation value calculation unit 513 tags the calculated evaluation value as the evaluation value of two nodes included in the processing target node pair 35.

When the tagging of the evaluation value z is completed for all node pairs 35 included in the tree structure 234 generated at step S33 above, the loop processing at step S200 ends.

Figure 61:
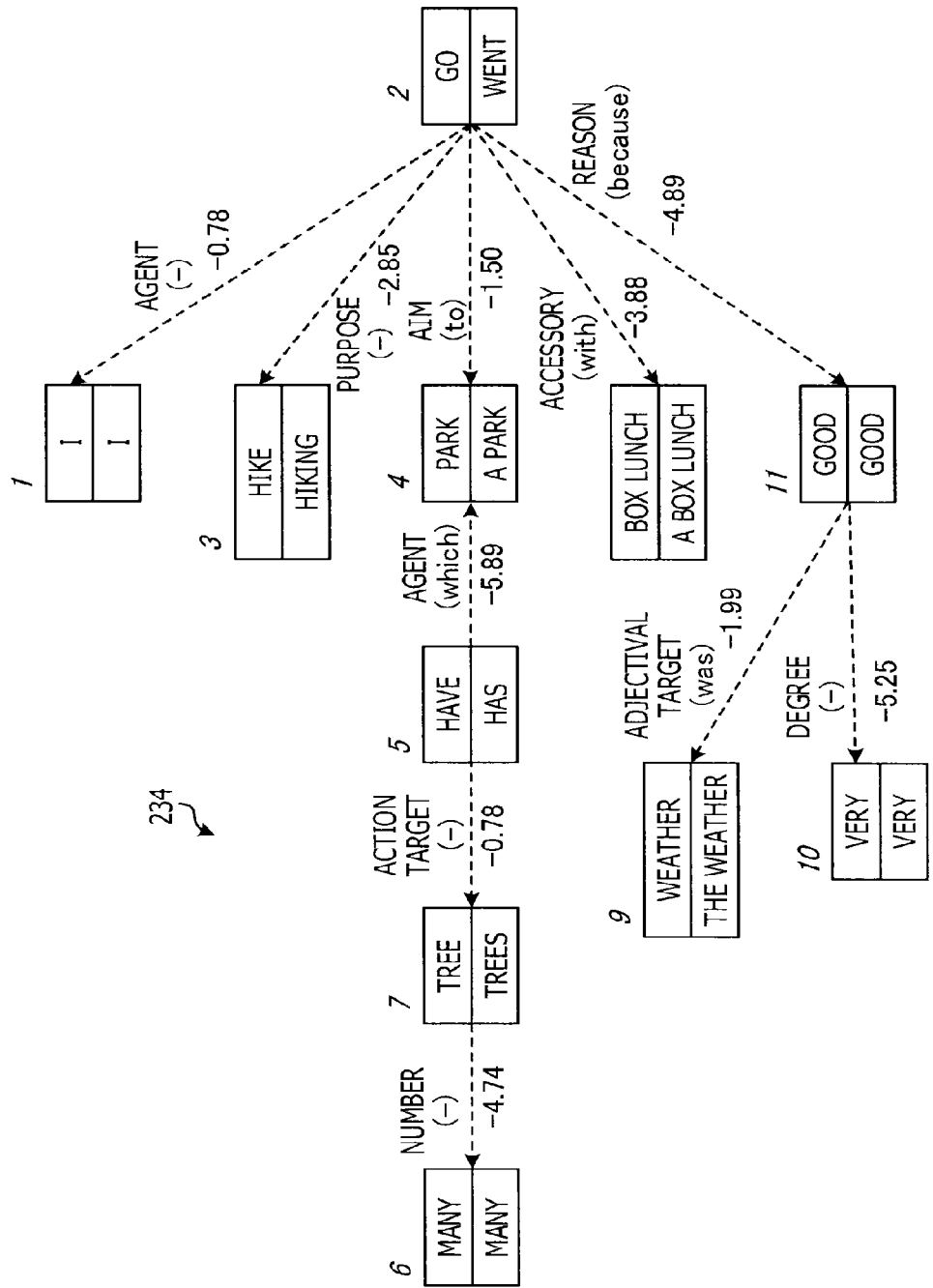
FIG. 61 is a schematic diagram of a tree structure after the evaluation values are tagged.

FIG. 61 is a schematic diagram of a tree structure after the evaluation value is tagged. At this stage of completing the loop processing at step S200, as illustrated in FIG. 61, the evaluation value is tagged between nodes included in the tree structure 234. In FIG. 61, a number beside an arrow connecting nodes is the evaluation value.

Figure 62:
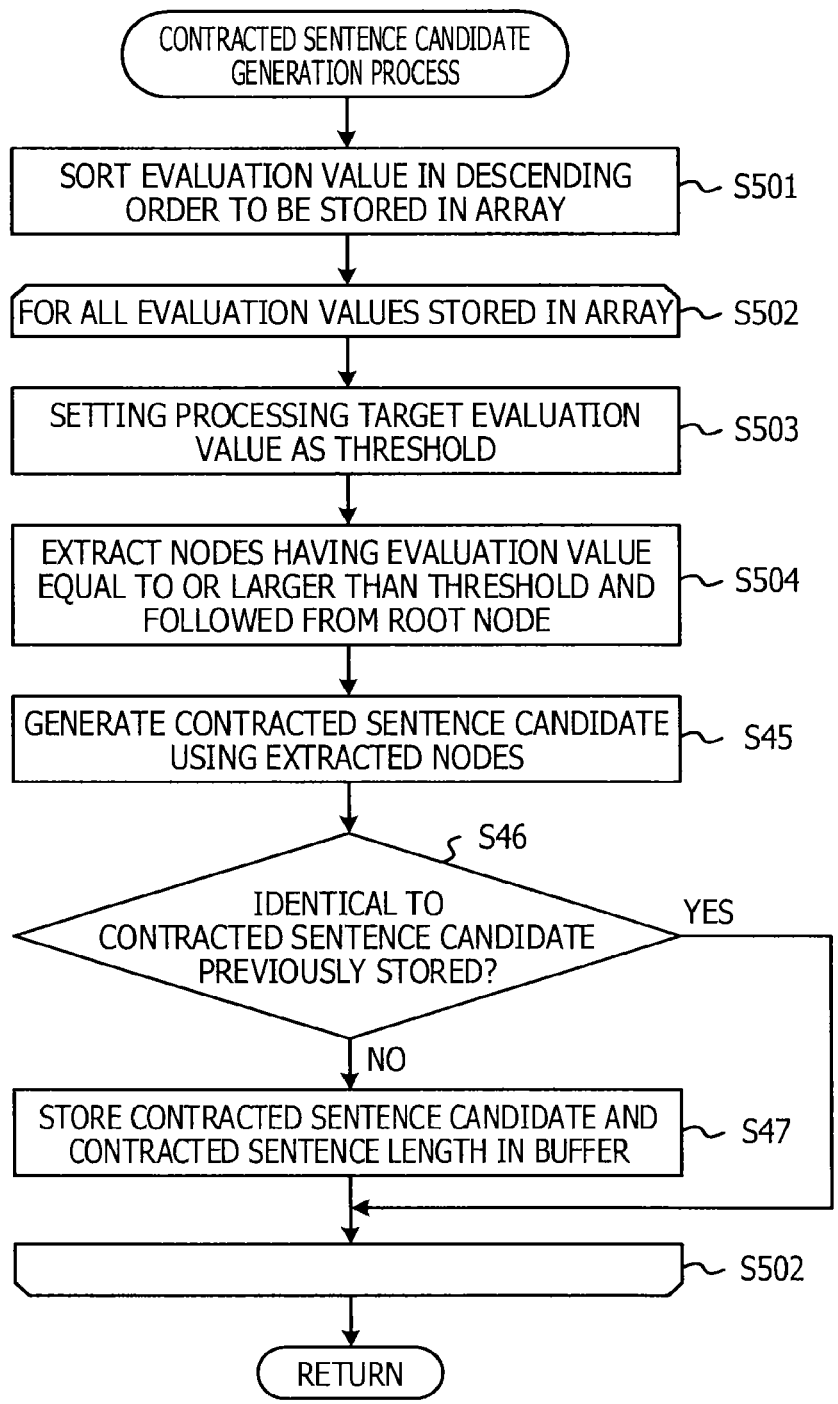
FIG. 62 is a flowchart of an exemplary contracted sentence candidate generation process according to the fifth embodiment.

Next at step S500, the contracted sentence candidate generation process illustrated in detail in FIG. 62 is executed. FIG. 62 is a flowchart of an exemplary contracted sentence candidate generation process according to the fifth embodiment.

Figure 63:
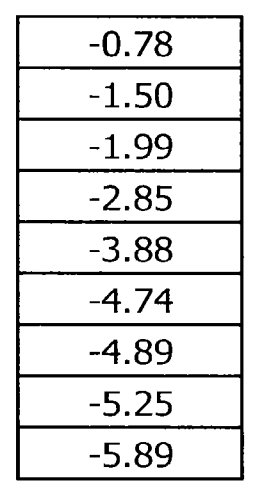

At step S501 in the contracted sentence candidate generation process illustrated in FIG. 62, the contracted sentence candidate generation unit 517 sorts the evaluation values tagged to the node pairs 35 included in the tree structure 234 of the contraction target sentence in descending order. Then, the contracted sentence candidate generation unit 517 stores the evaluation values thus sorted in an array. FIG. 63 is a diagram illustrating the evaluation values stored in an array.

Next, in the loop processing at step S502, the contracted sentence candidate generation unit 517 sets each evaluation value stored in the array as a processing target, and executes processing at step S503, step S504, step S45, step S46, and step S47. In the fifth embodiment, the first threshold is set not to the connection probability product but to each evaluation value.

At step S503, the contracted sentence candidate generation unit 517 sets the evaluation value of the processing target as the first threshold. Next, at step S504 and step S45, the contracted sentence candidate generation unit 517 generates a contraction candidate according to the first threshold set at step S43. However, different from the third and fourth embodiments, at step S504, the contracted sentence candidate generation unit 517 extracts nodes whose evaluation value is equal to or larger than the threshold and which are capable of being followed from the root node. In other words, in the fifth embodiment, the indispensable connection is not extracted together with the nodes, as is the case in the third and fourth embodiments.

Next at step S46, the contracted sentence candidate generation unit 517 determines whether the contracted sentence candidate generated at step S45 above is identical to any contracted sentence candidate stored in advance in the buffer. If these contracted sentence candidates are not identical, the flow proceeds to step S47. At step S47, the contracted sentence candidate generation unit 517 stores the contracted sentence candidate thus generated and the contracted sentence length of this contracted sentence candidate in the buffer. In contrast, if the contracted sentence candidate thus generated is identical to any contracted sentence candidate stored in advance in the buffer, the flow skips this processing at step S47.

When the loop processing at step S502 ends by sequentially setting all the evaluation values stored in the array to the first threshold, the contracted sentence candidate generation process ends, and the flow returns to the contracted sentence generation process (FIG. 58B).

FIG. 64 illustrates a list of contracted sentence candidates stored in a buffer. As illustrated in FIG. 64, since different evaluation values are set in stages as a first threshold, the contracted sentence candidates having various contracted sentence lengths are obtained.

Next, at step S50 in the contracted sentence generation process illustrated in FIG. 58B, the contracted sentence length setting unit 216 sets the contracted sentence length. Then, the contracted sentence selection unit 18 selects, from among the contracted sentence candidates stored in the buffer, the contracted sentence candidate having the largest contracted sentence length within the contracted sentence length thus set. However, when the contracted sentence candidates within the range of the contracted sentence length thus set do not exist, the contracted sentence candidate with the smallest length is selected. Further, at step S60, the contracted sentence output unit 19 outputs the contracted sentence selected at step S50 above, and this ends the contracted sentence generation process.

As described above, the contracted sentence generation apparatus 500 according to the fifth embodiment generates a tree structure by connecting the nodes corresponding to phrases based on the conceptual structure of phrases included in the contraction target sentence. Then, the contracted sentence generation apparatus 500 tags, between two connected nodes, the connection probability as the probability that the nodes remain in a contracted sentence with no pruning provided between the nodes at generation of the contracted sentence. Furthermore, an evaluation value based on the connection probability and the occurrence probability is calculated. At this time, the occurrence probability is more weighted, so that the indispensable connection is kept away from being pruned.

Then, the contracted sentence generation apparatus 500 generates a contracted sentence candidate based on nodes having the evaluation value equal to or larger than the threshold from the route node. In this manner, whether to provide pruning between nodes is determined in accordance with the connection probability between phrases based on the conceptual structure and the occurrence probability, thereby reducing any pruning that otherwise would result in, for example, lack of an indispensable case, and thus generating a natural contracted sentence.

The contracted sentence generation apparatus 500 may generate contracted sentence candidates by sequentially setting the different evaluation values to the first threshold. In this manner, a contracted sentence candidate with the largest length within the user desired contracted sentence length may be selected, so that the longer and more natural contracted sentence may be outputted.

However, the fifth embodiment describes the case in which each evaluation value tagged between nodes included in the tree structure of the contraction target sentence is sequentially set as the first threshold for generating the contracted sentence candidate, but is not limited thereto. For example, the first thresholds may be sequentially set to gradually different values between the maximum value and minimum value of the evaluation values tagged between nodes included in the tree structure of the contraction target sentence.

The contracted sentence candidate length of the generated candidate increases as the set first threshold decreases, like in the fifth embodiment. In this case, the loop processing at step S502 in the contracted sentence candidate generation process (FIG. 62) may be ended when the length of a contracted sentence candidate thus produced exceeds a contracted sentence candidate length thus set.

<Modifications>
<Modification 1>

In the fourth and fifth embodiments, a tree structure obtained by performing the dependency parsing as in the third embodiment may be used in place of a tree structure obtained by analyzing the conceptual structure. In the third embodiment, a tree structure obtained by analyzing the conceptual structure as in the fourth and fifth embodiments may be used in place of a tree structure obtained by performing the dependency parsing. The processing contents of the embodiments may be combined as appropriate.

<Modification 2>

The above embodiments describe the case in which the probability expressed in Expression (2) is used as the connection probability for each node-pair attribute, but are not limited thereto. For example, a value obtained by multiplying the probability obtained by Expression (2) by a coefficient, or degrees (for example, connection degrees of "high", "middle", and "low") set in stages depending on the probability may be used. The same is true to the occurrence probability.

<Modification 3>

The embodiments above describe the case of using the connection probability product that is the product (addition in logarithm) of the connection probability of each entry in the connection probability table which matches a node-pair attribute, but are not limited thereto. A weighted sum or average of the connection probabilities as an integrated connection probability of all connection probabilities may be used.

<Modification 4>

The third and fourth embodiments each describe the case in which the words corresponding to nodes extracted by following, from a root node, nodes having connection probability products equal to or larger than the threshold or nodes having the indispensable connection, are arranged in the order of appearance in the contraction target sentence so as to generate a contracted sentence or contraction sentence candidate, but are not limited thereto. Depending on a language and pruned nodes, a more natural sentence may be generated by adopting a word order in the contracted sentence, which is different from that in the contraction target sentence. Specifically, the contracted sentence may be generated by rearranging the words corresponding to the extracted nodes with a grammatical or conceptual relation taken into consideration based on how the extracted nodes are connected in the tree structure of the contraction target sentence.

Similarly, the fifth embodiment describes the case in which the words corresponding to nodes extracted by following, from a root node, nodes having the evaluation values equal to or larger than the threshold, are arranged in the order of appearance in the contraction target sentence so as to generate a contracted sentence or a contracted sentence candidate, but is not limited thereto. Depending on a language and pruned nodes, a more natural sentence may be generated by adopting a word order in the contracted sentence, which is different from that in the contraction target sentence. Specifically, the contracted sentence may be generated by rearranging the words corresponding to the extracted nodes with a grammatical or conceptual relation taken into consideration based on how the extracted nodes are connected in the tree structure of the contraction target sentence.

<Modification 5>

The embodiments above describe the configuration including the connection probability table generation unit 14 or the connection probability table generation unit 214, but are not limited thereto. A connection probability table generated by an information processing apparatus other than the contracted sentence generation apparatus may be stored in a predetermined storage region of the contracted sentence generation apparatus, or may be read into the contracted sentence generation apparatus at generation of the contracted sentence. In this case, the connection probability table generation unit 14 or the connection probability table generation unit 214 may be omitted from the configuration of the contracted sentence generation apparatus.

In addition, the embodiments above describe the configuration including the occurrence probability table generation unit 111 or the occurrence probability table generation unit 311, but are not limited thereto. An occurrence probability table generated by an information processing apparatus other than the contracted sentence generation apparatus may be stored in a predetermined storage region of the contracted sentence generation apparatus, or may be read into the contracted sentence generation apparatus at generation of the contracted sentence. In this case, the occurrence probability table generation unit 111 or the occurrence probability table generation unit 311 may be omitted from the configuration of the contracted sentence generation apparatus.

<Modification 6>

The third and fourth embodiments each describe the case of analyzing the dependency relation between phrases as words of the original sentence or the contraction target sentence and the conceptual structure thereof, but are not limited thereto. Similarly to the fifth embodiment, words and clauses may be used as words of the original sentence or the contraction target sentence, and words in units appropriate for a target language and a desired contraction ratio may be used.

<Modification 7>

The embodiments above describe the case in which more than one example sentence 31 is inputted at generation of the connection probability table or the occurrence probability table, but a single example sentence 31 may be inputted.

<Modification 8>

The embodiments above describe the case in which the contracted sentence generation programs 450, 750, and 850 are stored (installed) in advance, but are not limited thereto. The programs according to the disclosed technique may be provided being recorded in recording media such as a CD-ROM, a DVD-ROM, and a USB memory.

<Modification 9>

In the fourth embodiment, when there is no contracted sentence candidate within the set contracted sentence length, the contracted sentence candidate having the largest contracted sentence length is selected. However, when there is no contracted sentence candidate within the set contracted sentence length, an additional process illustrated in FIG. 65 may be executed.

Figure 65:
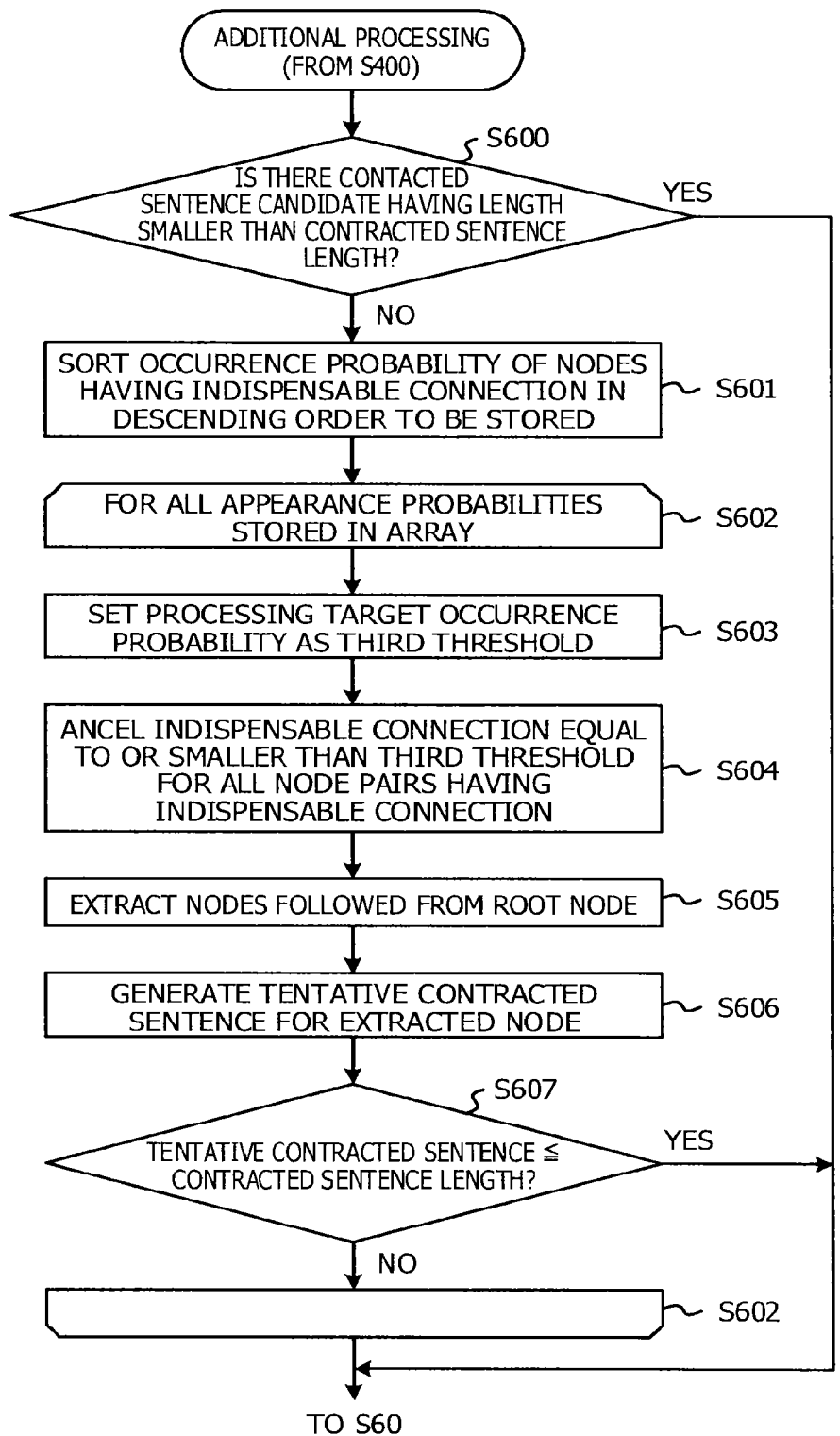
FIG. 65 is a flowchart of an exemplary additional process.

FIG. 65 is a flowchart of an exemplary additional process. At step S600, the contracted sentence selection unit 18 determines whether the contracted sentence candidate within the set contracted sentence length exists. If there is the contracted sentence candidate within the set contracted sentence length, a positive determination is made at step S600 and then step S60 is executed.

In contrast, if there exists no contracted sentence candidate within the set contracted sentence length, a negative determination is made at step S600, and at step S601, the contracted sentence selection unit 18 sorts the occurrence probabilities of the node pairs 36 having the indispensable connection in descending order, and stores the occurrence probabilities in an array.

Next, the loop processing step S602 is executed for all the occurrence probabilities stored in the array. At step S603, the contracted sentence selection unit 18 sets the processing target occurrence probability to a third threshold. Then, at step S604, the contracted sentence selection unit 18 cancels the indispensable connection equal to or smaller than the third threshold for the node pairs 36 having the indispensable connection.

At step S605, the contracted sentence selection unit 18 extracts nodes which may be followed from the root node in the tree structure in which the indispensable connection is at least partially canceled. At step S606, the contracted sentence selection unit 18 generates a tentative contracted sentence including the extracted nodes. At step S607, the contracted sentence selection unit 18 determines whether the length of tentative contracted sentence is equal to or smaller than the set contracted sentence length. If the tentative contracted sentence length is equal to or smaller than the set contracted sentence length, at step S607, a positive determination is made, and then the flow returns to step S60 after passing through the loop processing step S602, and the tentative contracted sentence is outputted as the contracted sentence. In contrast, if the tentative contracted sentence length is larger than the set contracted sentence length, at step S607, a negative determination is made, and then the processes from step S603 to step S607 are repeated for a new processing target occurrence probability.

In this manner, if there exists no contracted sentence candidate within the set contracted sentence length for the contracted sentence length, the additional processing allows the tentative contracted sentence within the set contracted sentence length to be generated and then provided to users.

Effects According to Embodiments

Lastly, effects of the embodiments above will be described using specific examples. The specific examples are described by using the sentence examples used in the second embodiment and the method of the second embodiment, but other embodiments have same effects.

Figure 66:
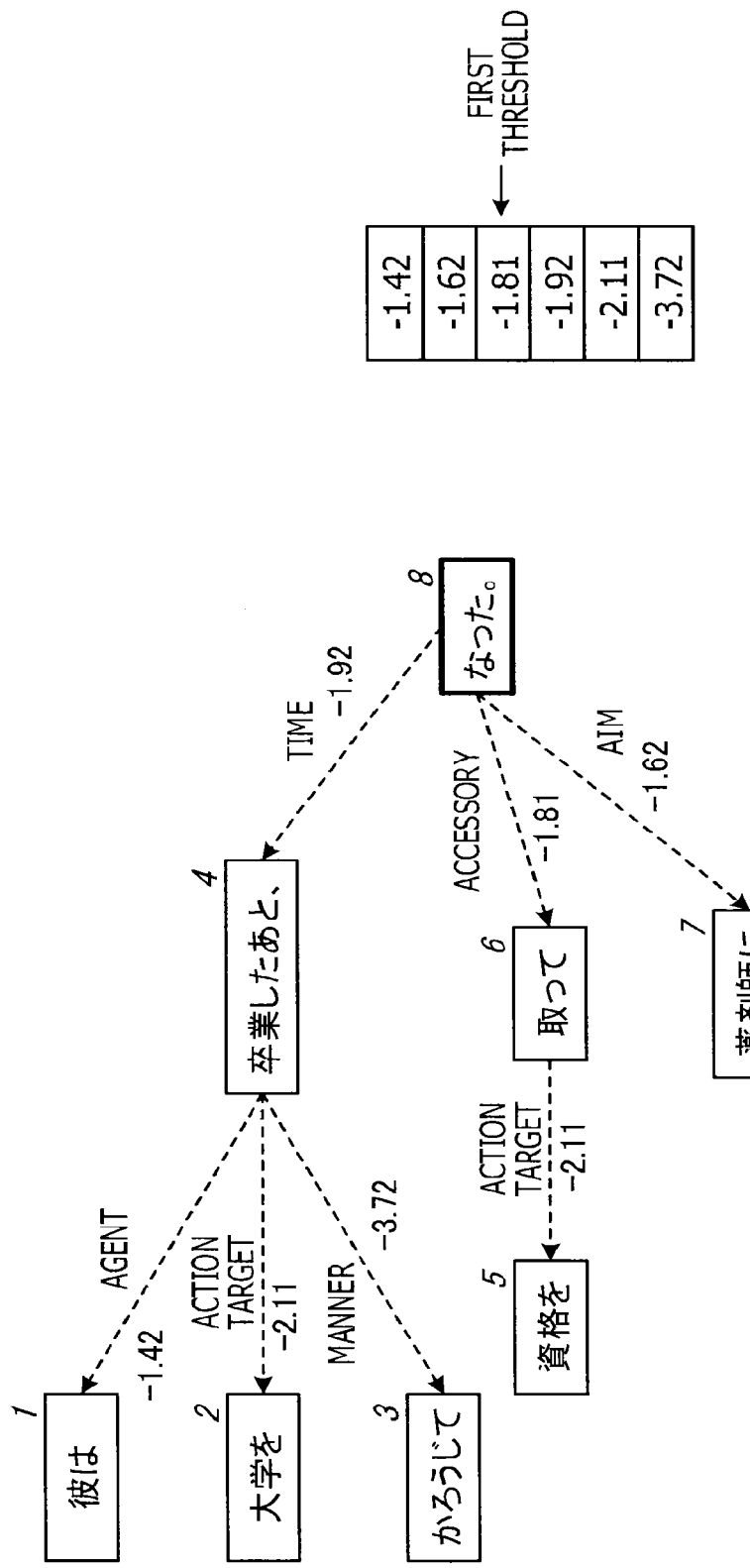
FIG. 66 is a diagram (No. 1) for explaining a comparative example.
Figure 67:
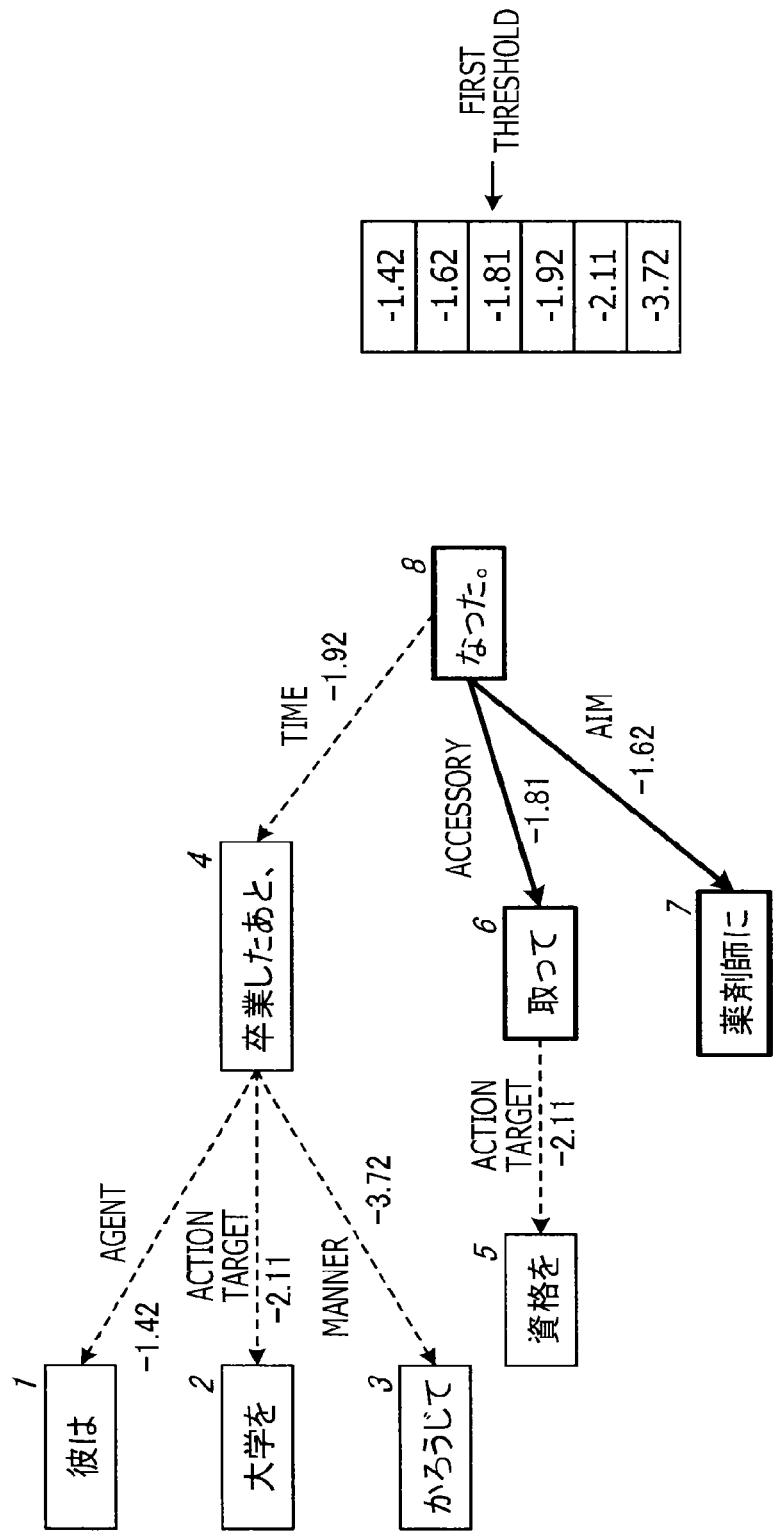
FIG. 67 is a diagram (No. 2) for explaining a comparative example.

FIGS. 66 and 67 are each a diagram for explaining a comparative example. FIGS. 66 and 67 each illustrates an example of generating a contracted sentence candidate when an indispensable connection based on an occurrence probability is not considered. In other words, only a connection probability product is tagged between nodes included in the tree structure. Accordingly, in FIGS. 66 and 67, when each of connection probability products is set as a first threshold and a contracted sentence candidate is generated, the following contracted sentence candidate is generated.

In FIG. 66, when the connection probability "−1.42" is set as the first threshold, for example, only the root node "なった。(became)" is extracted as a node included in the contracted sentence candidate. In comparison with FIG. 49, the indispensable connection is not set and thus the node "薬剤師に (a pharmacist)" is not extracted. Thus, the contracted sentence candidate at this time yields only "なった。(became)".

In FIG. 67, for example, when the connection probability "−1.81" is set as the first threshold, the root node "なった。(became)", the node "取って (took)" connected with the root node with the connection probability equal to or larger than the first threshold, and the node "薬剤師に (a pharmacist)" connected with the root node with the connection probability equal to or larger than the first threshold are extracted as nodes to be included in the contracted sentence candidate. Thus, the contracted sentence candidate yields "取って薬 剤師になった。(took and became a pharmacist)".

FIG. 68 is a list of contracted sentence candidates generated by the comparative examples. FIG. 68 includes sentences in which the indispensable cases such as "なった。(became)", "取って薬剤師 になった。(took and became a pharmacist)", and "彼は卒業したあと、取って薬剤師になった。(He took and became a pharmacist after the graduation)" are lacked. Thus, when the occurrence probability is not considered, an unnatural contracted sentence with the lack of the indispensable cases may be outputted.

As described in the embodiments above, the probability of pruning the indispensable connection is reduced by using the occurrence probability for each inflection and for each attribute, so that a more natural contracted sentence may be generated as compared with the cases in the embodiments above in which the occurrence probability for each inflection and for each attributes is not used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A generation apparatus that generates a contracted sentence in which one part of a plurality of words included in a sentence is removed, the generation apparatus comprising:
   a memory configured to store a first index for determining whether two words are left as a pair in the contracted sentence, for each characteristic between the two words being connected to each other in the sentence through a grammatical or conceptual relation; and
   a processor coupled to the memory and configured to:
   generate the contracted sentence by removing the one part of the plurality of words based on the first index corresponding to every pair of two words connected to each other with the grammatical or conceptual relation, and
   output the contracted sentence.

2. The generation apparatus according to claim 1, wherein the memory is configured to store a second index for determining whether the two words are left as a pair in the contracted sentence according to a meaning of an inflection, when one of the two words is the inflection and another is a case for the inflection.

3. The generation apparatus according to claim 2, wherein the contracted sentence is generated based on the second index.

4. The generation apparatus according to claim 3, wherein
   the processor is configured to determine that a connection between the pair of two words of which second index is equal to or larger than a threshold is an indispensable connection, and
   the contracted sentence is generated based on the indispensable connection.

5. The generation apparatus according to claim 4, wherein the processor is configured to:
   generate a tree structure in which the plurality of words is represented based on the grammatical or conceptual relation, and
   generate the contracted sentence by sequentially connecting the words of which first index is equal to or larger than another threshold or the words having the indispensable connection from a starting point word of the tree structure.

6. The generation apparatus according to claim 5, wherein the processor is configured to:
   set the another threshold in states,
   generate a plurality of contracted sentences including the contracted sentence according to the another threshold set in states, and
   select the contracted sentence from among the plurality of contracted sentences based on a length which is designated.

7. The generation apparatus according to claim 3, wherein
   the processor is configured to calculate an evaluation value based on the first index and the second index for every pair of two words, and
   the contracted sentence is generated based on the evaluation value.

8. The generation apparatus according to claim 7, wherein the processor is configured to:
   generate a tree structure in which the plurality of words is represented based on the grammatical or conceptual relation, and
   generate the contracted sentence by sequentially connecting the words of which evaluation value is equal to or larger than a threshold from a starting point word of the tree structure.

9. The generation apparatus according to claim 5, wherein the processor is configured to:
   set the threshold in states,
   generate a plurality of contracted sentences including the contracted sentence according to the threshold set in states, and
   select the contracted sentence from among the plurality of contracted sentences based on a length which is designated.

10. The generation apparatus according to claim 7, wherein the evaluation value is a value in which the second index is weighted more than the first index.

11. The generation apparatus according to claim 1, wherein the processor is configured to:
generate a tree structure in which the plurality of words is represented based on the grammatical or conceptual relation, and
generate the contracted sentence by sequentially connecting the words of which first value corresponding to the first index is equal to or larger than a threshold from a starting point word of the tree structure.

12. The generation apparatus according to claim 11, wherein the processor is configured to:
set the threshold in states,
generate a plurality of contracted sentences including the contracted sentence according to the threshold set in states, and
select the contracted sentence from among the plurality of contracted sentences based on a length which is designated.

13. A generation method for generating a contracted sentence in which one part of a plurality of words included in a sentence is removed, the generation method comprising:
acquiring, from a memory, a first index for determining whether two words are left as a pair in the contracted sentence, for each characteristic between the two words being connected to each other in the sentence through a grammatical or conceptual relation;
generating, by a processor coupled to the memory, the contracted sentence by removing the one part of the plurality of words based on the first index corresponding to every pair of two words connected to each other with the grammatical or conceptual relation; and
outputting the contracted sentence.

14. The generation method according to claim 13, further comprising:
acquiring, from the memory, a second index for determining whether the two words are left as a pair in the contracted sentence according to a meaning of an inflection, when one of the two words is the inflection and another is a case for the inflection.

15. The generation method according to claim 14, wherein the contracted sentence is generated based on the second index.

16. The generation method according to claim 15, further comprising:
determining, by the processor, that a connection between the pair of two words of which second index is equal to or larger than a threshold is an indispensable connection, and
wherein the contracted sentence is generated based on the indispensable connection.

17. The generation method according to claim 16, further comprising:
generating a tree structure in which the plurality of words is represented based on the grammatical or conceptual relation; and
generating, by the processor, the contracted sentence by sequentially connecting the words of which first index is equal to or larger than the threshold or the words having the indispensable connection from a starting point word of the tree structure.

18. The generation method according to claim 13, further comprising:
generating a tree structure in which the plurality of words is represented based on the grammatical or conceptual relation; and
generating, by the processor, the contracted sentence by sequentially connecting the words of which first value corresponding to the first index is equal to or larger than a threshold from a starting point word of the tree structure.

19. The generation method according to claim 18, further comprising:
setting the threshold in states;
generating, by the processor, a plurality of contracted sentences including the contracted sentence according to the threshold set in states; and
selecting the contracted sentence from among the plurality of contracted sentences based on a length which is designated.

20. A non-transitory computer-readable storage medium storing a generation program for generating a contracted sentence in which one part of a plurality of words included in a sentence is removed, the generation program causing a computer to execute a process, the process comprising:
acquiring a first index for determining whether two words are left as a pair in the contracted sentence, for each characteristic between the two words being connected to each other in the sentence through a grammatical or conceptual relation;
generating the contracted sentence by removing the one part of the plurality of words based on the first index corresponding to every pair of two words connected to each other with the grammatical or conceptual relation; and
outputting the contracted sentence.

* * * * *